United States Patent
Luo et al.

(10) Patent No.: US 11,882,430 B2
(45) Date of Patent: Jan. 23, 2024

(54) CHANNEL SENSING PROCEDURES FOR COMMUNICATIONS AT AN INTEGRATED ACCESS AND BACKHAUL NODE

(71) Applicant: QUALCOMM Incorporated, San Diego, CA (US)

(72) Inventors: Jianghong Luo, Skillman, NJ (US); Tao Luo, San Diego, CA (US); Xiaoxia Zhang, San Diego, CA (US); Jing Sun, San Diego, CA (US); Navid Abedini, Basking Ridge, NJ (US); Junyi Li, Franklin Park, NJ (US); Luca Blessent, Whitehouse Station, NJ (US); Karl Georg Hampel, Hoboken, NJ (US)

(73) Assignee: QUALCOMM Incorporated, San Diego, CA (US)

(*) Notice: Subject to any disclaimer, the term of this patent is extended or adjusted under 35 U.S.C. 154(b) by 45 days.

(21) Appl. No.: 17/235,037

(22) Filed: Apr. 20, 2021

(65) Prior Publication Data
US 2021/0400720 A1    Dec. 23, 2021

Related U.S. Application Data

(60) Provisional application No. 63/042,493, filed on Jun. 22, 2020.

(51) Int. Cl.
*H04W 74/08* (2009.01)

(52) U.S. Cl.
CPC .............................. *H04W 74/0816* (2013.01)

(58) Field of Classification Search
CPC ......... H04W 74/0816; H04W 74/0808; H04W 74/0825
See application file for complete search history.

(56) References Cited

U.S. PATENT DOCUMENTS

| 2012/0196528 A1 | 8/2012 | Kazmi et al. |
| 2017/0064731 A1 | 3/2017 | Wang et al. |

(Continued)

OTHER PUBLICATIONS

AT&T: "IAB Enhancements for Rel 17", 3GPP Draft, 3GPP TSG RAN Plenary Meeting #84, RP-192109, IAB Enhancements for Rel 17—ATT, 3rd Generation Partnership Project (3GPP), Mobile Competence Centre, 650, Route Des Lucioles, F-06921 Sophia-Antipolis Cedex, France, vol. TSG RAN, No. Newport Beach, USA, Jun. 3, 2019-Jun. 6, 2019, Sep. 9, 2019 (Sep. 9, 2019), XP051782626, 10 Pages, Retrieved from the Internet: URL: http://www.3gpp.org/ftp/tsg_ran/TSG_RAN/TSGR_85/Docs/RP-192109.zip. [Retrieved on Sep. 9, 2019] p. 7.

(Continued)

*Primary Examiner* — James P Duffy
(74) *Attorney, Agent, or Firm* — Arun Swain

(57) ABSTRACT

This disclosure provides systems, methods, and apparatus, including computer programs encoded on computer storage media, for performing separate channel sensing procedures for transmissions via a mobile termination (MT) role and for transmissions via a distributed unit (DU) role of an integrated access and backhaul (IAB) node. In one aspect, the IAB node may obtain channel access for transmissions via the MT role by performing a first channel sensing procedure and may obtain channel access for transmissions via the DU role by performing a second channel sensing procedure. The IAB node may determine a first timing of a first sensing slot for performing the first channel sensing procedure and a second timing of a second sensing slot for performing the second channel sensing procedure in accordance with a capability of the IAB node and a transmission timing of the transmissions via the MT role and the DU role.

30 Claims, 19 Drawing Sheets

(56) References Cited

U.S. PATENT DOCUMENTS

| | | | |
|---|---|---|---|
| 2018/0115992 | A1 | 4/2018 | Park et al. |
| 2019/0200389 | A1 | 6/2019 | Li et al. |
| 2019/0274137 | A1* | 9/2019 | Bhattad .............. H04W 74/004 |
| 2019/0373635 | A1* | 12/2019 | Yang ...................... H04B 7/088 |
| 2019/0394738 | A1 | 12/2019 | Abedini et al. |
| 2020/0146076 | A1 | 5/2020 | Islam et al. |
| 2020/0229181 | A1 | 7/2020 | Qi et al. |
| 2020/0374940 | A1* | 11/2020 | Jia ........................ H04L 1/1893 |
| 2021/0243805 | A1* | 8/2021 | Si ......................... H04B 7/0617 |
| 2021/0345303 | A1 | 11/2021 | Ying et al. |
| 2021/0400721 | A1 | 12/2021 | Luo |
| 2022/0007212 | A1* | 1/2022 | Hwang ................. H04W 76/38 |
| 2022/0167397 | A1* | 5/2022 | Thangarasa ........... H04W 74/08 |
| 2022/0272753 | A1* | 8/2022 | Hakola ............. H04W 74/0816 |

OTHER PUBLICATIONS

Interdigital Inc: "On LBT for Beam-Based Transmission for NR-U", 3GPP Draft, 3GPP TSG RAN WG1 Meeting #92bis, R1-1804885 On LBT for Beam-Based Transmission for NR-U, 3rd Generation Partnership Project (3GPP), Mobile Competence Centre, 650, Route Des Lucioles, F-06921 Sophia-Antipolis Cedex, FRA , vol. RAN WG1, No. Sanya, China, Apr. 16, 2018-Apr. 20, 2018, Apr. 15, 2018 (Apr. 15, 2018), XP051427148, 6 Pages, Retrieved from the Internet: URL: http://www.3gpp.org/ftp/Meetings%5F3GPP%5FSYNC/RAN1/Docs/, [retrieved on Apr. 15, 2018], Chapters 1, 2, section 1-2, p. 1-5.

International Search Report and Written Opinion—PCT/US2021/028439—ISA/EPO—dated Aug. 16, 2021.

Qualcomm Incorporated: "Channel Access Procedures for NR Unlicensed," 3GPP Draft, 3GPP TSG RAN WG1 Meeting #97, R1-1907261, 7.2.2.2.1, Channel Access Procedures for NR Unlicensed, 3rd Generation Partnership Project (3GPP), Mobile Competence Centre, 650, Route Des Lucioles, F-06921, Sophia-Antipolis Cedex, France, vol. RAN WG1, No. Reno, US; May 13, 2019-May 17, 2019, May 4, 2019 (May 4, 2019), XP051728701, 18 Pages, Retrieved from the Internet: URL: http://www.3gpp.org/ftp/Meetings%5F3GPP%5FSYNC/RAN1/Docs/R1%2D1907261%2Ezip [retrieved on May 4, 2019], Section 4.9, figure 6, paragraph [4.4.3], p. 9.

"3rd Generation Partnership Project, Technical Specification Group Radio Access Network, Physical Layer Procedures for Shared Spectrum Channel Access (Release 16)", 3GPP TS 37.213, RAN WG1, No. V16.1.0, Apr. 3, 2020, XP051893817, pp. 1-25, paragraphs [4.1.1] [4.1.3], [4.1.6], [4.2.1]-[4.2.1.2.3], paragraph [04.0].

\* cited by examiner

CHANNEL SENSING PROCEDURES FOR COMMUNICATIONS AT AN INTEGRATED ACCESS AND BACKHAUL NODE

CROSS REFERENCE TO RELATED APPLICATIONS

The present Application for Patent claims the benefit of U.S. Provisional Patent Application No. 63/042,493 by LUO et al., entitled "CHANNEL SENSING PROCEDURES FOR COMMUNICATIONS AT AN INTEGRATED ACCESS AND BACKHAUL NODE," filed Jun. 22, 2020, assigned to the assignee hereof, and expressly incorporated by reference herein.

TECHNICAL FIELD

The following relates generally to wireless communications and more specifically to channel sensing procedures for communications at an integrated access and backhaul (IAB) node.

DESCRIPTION OF THE RELATED TECHNOLOGY

Wireless communications systems are widely deployed to provide various types of communication content such as voice, video, packet data, messaging, broadcast, and so on. These systems may be capable of supporting communication with multiple users by sharing the available system resources (for example, time, frequency, and power). Examples of such multiple-access systems include fourth generation (4G) systems such as Long Term Evolution (LTE) systems, LTE-Advanced (LTE-A) systems, or LTE-A Pro systems, and fifth generation (5G) systems which may be referred to as New Radio (NR) systems. These systems may employ technologies such as code division multiple access (CDMA), time division multiple access (TDMA), frequency division multiple access (FDMA), orthogonal frequency division multiple access (OFDMA), or discrete Fourier transform spread orthogonal frequency division multiplexing (DFT-S-OFDM). A wireless multiple-access communications system may include one or more base stations or one or more network access nodes, each simultaneously supporting communication for multiple communication devices, which may be otherwise known as user equipment (UE).

SUMMARY

The systems, methods and devices of this disclosure each have several innovative aspects, no single one of which is solely responsible for the desirable attributes disclosed herein.

One innovative aspect of the subject matter described in this disclosure can be implemented in a method for wireless communications at a wireless device apparatus. The method may include establishing a first wireless role and a second wireless role for the wireless device apparatus, where the first wireless role is associated with upstream communications, and the second wireless role is associated with downstream communications, performing at least one of a first channel sensing procedure or a second channel sensing procedure at the wireless device apparatus, where the first channel sensing procedure is for the first wireless role and the second channel sensing procedure is for the second wireless role, initiating a channel occupancy time (COT) at the wireless device apparatus for the first wireless role in accordance with the first channel sensing procedure or for the second wireless role in accordance with the second channel sensing procedure, or both, and transmitting during the COT via at least one of the first wireless role or the second wireless role.

Another innovative aspect of the subject matter described in this disclosure can be implemented in a wireless device apparatus for wireless communications. The wireless device apparatus may include a first interface, a second interface, and a processing system. The processing system may be configured to establish a first wireless role and a second wireless role for the wireless device apparatus, where the first wireless role is associated with upstream communications, and the second wireless role is associated with downstream communications. The processing system may be configured to perform at least one of a first channel sensing procedure or a second channel sensing procedure at the wireless device apparatus, where the first channel sensing procedure is for the first wireless role and the second channel sensing procedure is for the second wireless role. The processing system may be configured to initiate a COT at the wireless device apparatus for the first wireless role in accordance with the first channel sensing procedure or for the second wireless role in accordance with the second channel sensing procedure, or both. The first interface may be configured to output signaling for transmission during the COT via at least one of the first wireless role or the second wireless role.

Another innovative aspect of the subject matter described in this disclosure can be implemented in another wireless device apparatus for wireless communications. The wireless device apparatus may include a processor, memory coupled with the processor, and instructions stored in the memory. The instructions may be executable by the processor to cause the apparatus to establish a first wireless role and a second wireless role for the wireless device apparatus, where the first wireless role is associated with upstream communications, and the second wireless role is associated with downstream communications, perform at least one of a first channel sensing procedure or a second channel sensing procedure at the wireless device apparatus, where the first channel sensing procedure is for the first wireless role and the second channel sensing procedure is for the second wireless role, initiate a COT at the wireless device apparatus for the first wireless role in accordance with the first channel sensing procedure or for the second wireless role in accordance with the second channel sensing procedure, or both, and transmit during the COT via at least one of the first wireless role or the second wireless role.

Another innovative aspect of the subject matter described in this disclosure can be implemented in another wireless device apparatus for wireless communications. The wireless device apparatus may include means for establishing a first wireless role and a second wireless role for the wireless device apparatus, where the first wireless role is associated with upstream communications, and the second wireless role is associated with downstream communications, performing at least one of a first channel sensing procedure or a second channel sensing procedure at the wireless device apparatus, where the first channel sensing procedure is for the first wireless role and the second channel sensing procedure is for the second wireless role, initiating a COT at the wireless device apparatus for the first wireless role in accordance with the first channel sensing procedure or for the second wireless role in accordance with the second channel sensing procedure, or both, and transmitting during the COT via at least one of the first wireless role or the second wireless role.

Another innovative aspect of the subject matter described in this disclosure can be implemented in a non-transitory computer-readable medium storing code for wireless communications at a wireless device apparatus. The code may include instructions executable by a processor to establish a first wireless role and a second wireless role for the wireless device apparatus, where the first wireless role is associated with upstream communications, and the second wireless role is associated with downstream communications, perform at least one of a first channel sensing procedure or a second channel sensing procedure at the wireless device apparatus, where the first channel sensing procedure is for the first wireless role and the second channel sensing procedure is for the second wireless role, initiate a COT at the wireless device apparatus for the first wireless role in accordance with the first channel sensing procedure or for the second wireless role in accordance with the second channel sensing procedure, or both, and transmit during the COT via at least one of the first wireless role or the second wireless role.

One innovative aspect of the subject matter described in this disclosure can be implemented in a method for wireless communications at a wireless device apparatus. The method may include identifying a first value for a first channel sensing procedure associated with a first wireless role of the wireless device apparatus and a second value for a second channel sensing procedure associated with a second wireless role of the wireless device apparatus, determining whether at least one energy detection (ED) value associated with a channel satisfies at least one of the first value or the second value, and determining whether to initiate a COT for at least one of the first wireless role or the second wireless role in accordance with determining whether the at least one ED value associated with the channel satisfies at least one of the first value or the second value.

Another innovative aspect of the subject matter described in this disclosure can be implemented in a wireless device apparatus for wireless communications. The wireless device apparatus may include a first interface, a second interface, and a processing system. The processing system may be configured to identify a first value for a first channel sensing procedure associated with a first wireless role of the wireless device apparatus and a second value for a second channel sensing procedure associated with a second wireless role of the wireless device apparatus. The processing system may be configured to determine whether at least one ED value associated with a channel satisfies at least one of the first value or the second value. The processing system may be configured to determine whether to initiate a COT for at least one of the first wireless role or the second wireless role in accordance with determining whether the at least one ED value associated with the channel satisfies at least one of the first value or the second value.

Another innovative aspect of the subject matter described in this disclosure can be implemented in another wireless device apparatus for wireless communications. The wireless device apparatus may include a processor, memory coupled with the processor, and instructions stored in the memory. The instructions may be executable by the processor to cause the apparatus to identify a first value for a first channel sensing procedure associated with a first wireless role of the wireless device apparatus and a second value for a second channel sensing procedure associated with a second wireless role of the wireless device apparatus, determine whether at least one ED value associated with a channel satisfies at least one of the first value or the second value, and determine whether to initiate a COT for at least one of the first wireless role or the second wireless role in accordance with determining whether the at least one ED value associated with the channel satisfies at least one of the first value or the second value.

Another innovative aspect of the subject matter described in this disclosure can be implemented in another wireless device apparatus for wireless communications. The wireless device apparatus may include means for identifying a first value for a first channel sensing procedure associated with a first wireless role of the wireless device apparatus and a second value for a second channel sensing procedure associated with a second wireless role of the wireless device apparatus, determining whether at least one ED value associated with a channel satisfies at least one of the first value or the second value, and determining whether to initiate a COT for at least one of the first wireless role or the second wireless role in accordance with determining whether the at least one ED value associated with the channel satisfies at least one of the first value or the second value.

Another innovative aspect of the subject matter described in this disclosure can be implemented in a non-transitory computer-readable medium storing code for wireless communications at a wireless device apparatus. The code may include instructions executable by a processor to identify a first value for a first channel sensing procedure associated with a first wireless role of the wireless device apparatus and a second value for a second channel sensing procedure associated with a second wireless role of the wireless device apparatus, determine whether at least one ED value associated with a channel satisfies at least one of the first value or the second value, and determine whether to initiate a COT for at least one of the first wireless role or the second wireless role in accordance with determining whether the at least one ED value associated with the channel satisfies at least one of the first value or the second value.

Details of one or more implementations of the subject matter described in this disclosure are set forth in the accompanying drawings and the description below. Other features, aspects, and advantages will become apparent from the description, the drawings and the claims. Note that the relative dimensions of the following figures may not be drawn to scale.

BRIEF DESCRIPTION OF THE DRAWINGS

Like reference numbers and designations in the various drawings indicate like elements.

DETAILED DESCRIPTION

Figure 1:
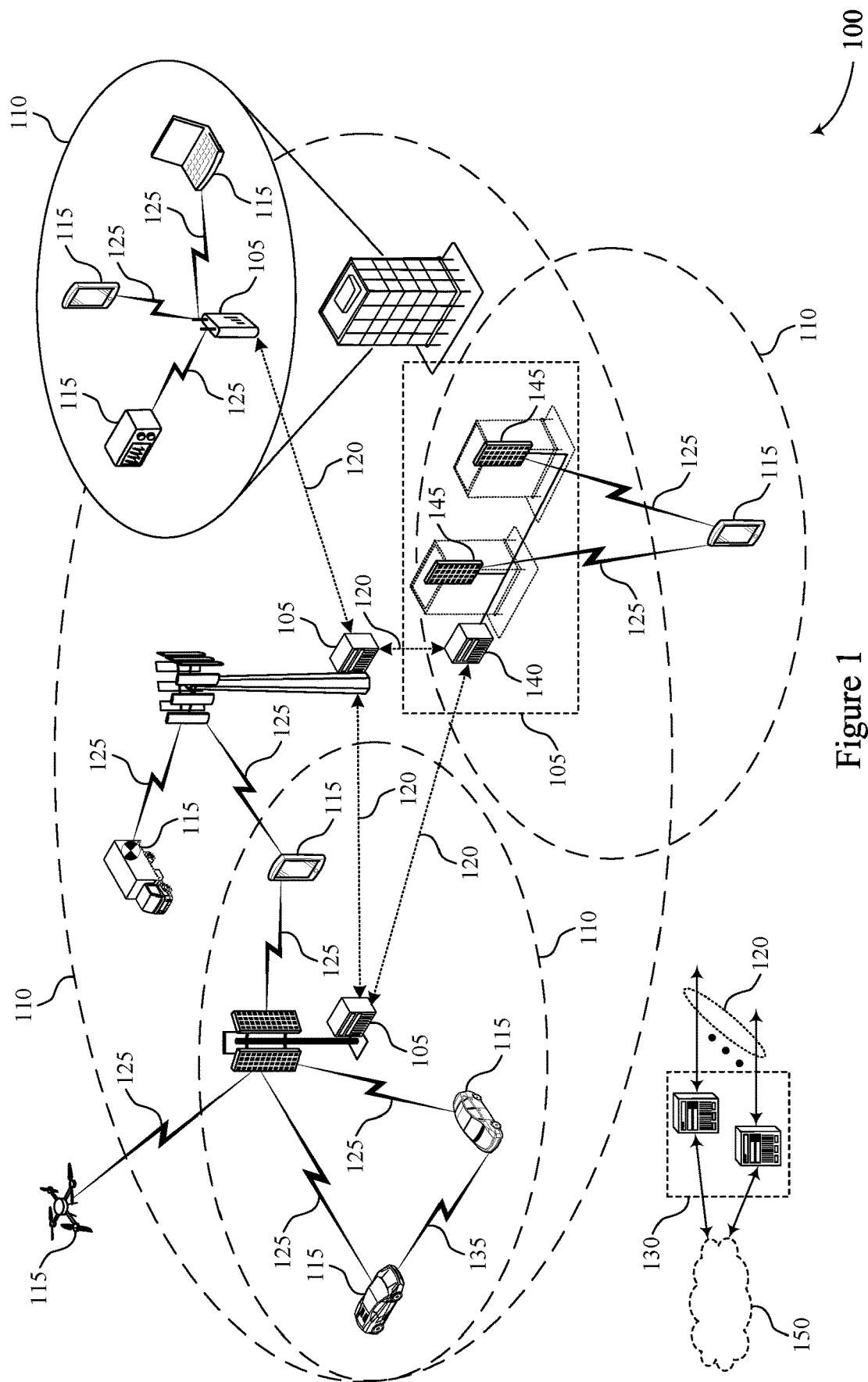
FIG. 1 illustrates an example wireless communications system that supports channel sensing procedures for communications at an integrated access and backhaul (IAB) node.

The following description is directed to certain implementations for the purposes of describing the innovative aspects of this disclosure. However, a person having ordinary skill in the art will readily recognize that the teachings herein can be applied in a multitude of different ways. The described implementations may be implemented in any device, system or network that is capable of transmitting and receiving radio frequency (RF) signals according to any of the IEEE 16.11 standards, or any of the IEEE 802.11 standards, the Bluetooth® standard, code division multiple access (CDMA), frequency division multiple access (FDMA), time division multiple access (TDMA), Global System for Mobile communications (GSM), GSM/General Packet Radio Service (GPRS), Enhanced Data GSM Environment (EDGE), Terrestrial Trunked Radio (TETRA), Wideband-CDMA (W-CDMA), Evolution Data Optimized (EV-DO), 1xEV-DO, EV-DO Rev A, EV-DO Rev B, High Speed Packet Access (HSPA), High Speed Downlink Packet Access (HSDPA), High Speed Uplink Packet Access (HSUPA), Evolved High Speed Packet Access (HSPA+), Long Term Evolution (LTE), AMPS, or other known signals that are used to communicate within a wireless, cellular or internet of things (IOT) network, such as a system utilizing 3G, 4G or 5G, or further implementations thereof, technology.

In some wireless communications systems, an integrated access and backhaul (IAB) node may communicate with one or more upstream devices, such as with a parent IAB node or an IAB donor node, via a backhaul link and may communicate with one or more downstream devices, such as a child IAB node or a user equipment (UE), via an access link or a backhaul link. The IAB node may communicate with the upstream devices using a mobile termination (MT) role or functionality of the IAB node and may communicate with the downstream devices using a distributed unit (DU) role or functionality of the IAB node. In some examples, the IAB node may communicate over a shared spectrum, such as a shared channel, and may perform a channel sensing procedure to determine whether the channel is available for transmissions from the IAB node. For example, the IAB node may identify one or more transmissions from the IAB node (via the MT role or the DU role, or both) and may perform the channel sensing procedure prior to transmitting the transmissions to avoid transmitting at the same time as another, potentially interfering device.

In some implementations, the IAB node may perform separate channel sensing procedures for the transmissions from the IAB node in accordance with the wireless role that the IAB node may use to transmit the transmissions. For example, the IAB node may perform a first channel sensing procedure to obtain channel access for transmissions that are scheduled via the MT role of the IAB node and may perform a second channel sensing procedure to obtain channel access for transmissions that are scheduled via the DU role of the IAB node. The IAB node may select, configure, or otherwise determine a first timing of a first sensing slot for performing the first channel sensing procedure and a second timing of a second sensing slot for performing the second channel sensing procedure in accordance with one or more capabilities of the IAB node and a timing of the transmissions. For example, the IAB node may select, configure, or otherwise determine whether the first sensing slot or the second sensing slot may overlap in time with another transmission from the IAB node in accordance with a sensing capability of the IAB node or may select, configure, or otherwise determine which transmission the first sensing slot or the second sensing slot, or both, may align with (in time). The IAB node may perform the first channel sensing procedure during the first sensing slot by measuring an energy of the shared channel and comparing the measured energy to a first energy detection (ED) threshold associated with the first channel sensing procedure. Similarly, the IAB node may perform the second channel sensing procedure during the second sensing slot by measuring an energy of the shared channel and comparing the measured energy to a second ED threshold associated with the second channel sensing procedure. The IAB node may initiate a channel occupancy time (COT) for the transmissions via the MT role or the DU role, or both, in accordance with whether the measured energy satisfies (is less than or equal to) the first ED threshold or the second ED threshold, or both.

Particular implementations of the subject matter described in this disclosure can be implemented to realize one or more of the following potential advantages. For example, by supporting separate channel sensing procedures to initiate a COT for transmissions via different wireless roles of an IAB node, the IAB node may more reliably or may more accurately obtain channel access. For example, in examples in which the MT role and the DU role of the IAB node use different antenna panels of the IAB node or otherwise have different radio frequency footprints, the IAB node may more optimally align the radio frequency footprint of a channel sensing procedure to the different radio frequency footprints of the MT role and the DU role if the IAB node uses a different channel sensing procedure for each of the MT role and the DU role. As a result of performing more reliable or more accurate channel sensing, the transmissions from the IAB node may be less likely to be adversely influenced by interference from another transmitting device, which may increase the likelihood that a receiving device is able to successfully receive the transmission from the IAB node. As such, the IAB node may achieve higher data rates and greater spectral efficiency because the IAB node may potentially perform fewer retransmissions (due to the higher likelihood for successful communication).

The described techniques also can be implemented to provide for configuring the separate channel sensing procedures in accordance with one or more conditions at the IAB node. For example, the first ED threshold of the first channel sensing procedure and the second ED threshold of the second channel sensing procedure may be configured for the MT role and the DU role, respectively, and in accordance with the sensing beams associated with the MT role and the DU role, respectively, the class of the MT role and the class of the DU role, respectively, or whether the IAB node is transmitting during the first sensing slot or the second sensing slot, respectively. As such, a parent IAB node or an IAB donor node (a central unit (CU) of an IAB donor node) may have greater flexibility if configuring the IAB node to perform the separate channel sensing procedures. Further, the separate channel sensing procedures may be more reliable or more accurate if the IAB node uses ED thresholds that are configured or otherwise determined in accordance with the conditions at the IAB node.

FIG. 1 illustrates an example wireless communications system 100 that supports channel sensing procedures for communications at an IAB node. The wireless communications system 100 may include one or more base stations 105, one or more UEs 115, and a core network 130. In some examples, the wireless communications system 100 may be a Long Term Evolution (LTE) network, an LTE-Advanced (LTE-A) network, an LTE-A Pro network, or a New Radio (NR) network. In some examples, the wireless communications system 100 may support enhanced broadband communications, ultra-reliable (for example, mission critical) communications, low latency communications, communications with low-cost and low-complexity devices, or any combination thereof.

The base stations 105 may be dispersed throughout a geographic area to form the wireless communications system 100 and may be devices in different forms or having different capabilities. The base stations 105 and the UEs 115 may wirelessly communicate via one or more communication links 125. Each base station 105 may provide a geographic coverage area 110 over which the UEs 115 and the base station 105 may establish one or more communication links 125. The geographic coverage area 110 may be an example of a geographic area over which a base station 105 and a UE 115 may support the communication of signals according to one or more radio access technologies.

The UEs 115 may be dispersed throughout a geographic coverage area 110 of the wireless communications system 100, and each UE 115 may be stationary, or mobile, or both at different times. The UEs 115 may be devices in different forms or having different capabilities. Some example UEs 115 are illustrated in FIG. 1. The UEs 115 described herein may be able to communicate with various types of devices, such as other UEs 115, the base stations 105, or network equipment (for example, core network nodes, relay devices, IAB nodes, or other network equipment), as shown in FIG. 1.

The base stations 105 may communicate with the core network 130, or with one another, or both. For example, the base stations 105 may interface with the core network 130 through one or more backhaul links 120 (for example, via an S1, N2, N3, or another interface). The base stations 105 may communicate with one another over the backhaul links 120 (for example, via an X2, Xn, or another interface) either directly (for example, directly between base stations 105), or indirectly (for example, via core network 130), or both. In some examples, the backhaul links 120 may be or include one or more wireless links.

One or more of the base stations 105 described herein may include or may be referred to by a person having ordinary skill in the art as a base transceiver station, a radio base station, an access point, a radio transceiver, a NodeB, an eNodeB (eNB), a next-generation NodeB or a giga-NodeB (either of which may be referred to as a gNB), a Home NodeB, a Home eNodeB, or other suitable terminology.

A UE 115 may include or may be referred to as a mobile device, a wireless device, a remote device, a handheld device, or a subscriber device, or some other suitable terminology, where the "device" also may be referred to as a unit, a station, a terminal, or a client, among other examples. A UE 115 also may include or may be referred to as a personal electronic device such as a cellular phone, a personal digital assistant (PDA), a tablet computer, a laptop computer, or a personal computer. In some examples, a UE 115 may include or be referred to as a wireless local loop (WLL) station, an Internet of Things (IoT) device, an Internet of Everything (IoE) device, or a machine type communications (MTC) device, among other examples, which may be implemented in various objects such as appliances, or vehicles, meters, among other examples.

The UEs 115 described herein may be able to communicate with various types of devices, such as other UEs 115 that may sometimes act as relays as well as the base stations 105 and the network equipment including macro eNBs or gNBs, small cell eNBs or gNBs, or relay base stations, among other examples, as shown in FIG. 1.

The UEs 115 and the base stations 105 may wirelessly communicate with one another via one or more communication links 125 over one or more carriers. The term "carrier" may refer to a set of radio frequency spectrum resources having a defined physical layer structure for supporting the communication links 125. For example, a carrier used for a communication link 125 may include a portion of a radio frequency spectrum band (for example, a bandwidth part (BWP)) that is operated according to one or more physical layer channels for a given radio access technology (for example, LTE, LTE-A, LTE-A Pro, NR). Each physical layer channel may carry acquisition signaling (for example, synchronization signals, system information), control signaling that coordinates operation for the carrier, user data, or other signaling. The wireless communications system 100 may support communication with a UE 115 using carrier aggregation or multi-carrier operation. A UE 115 may be configured with multiple downlink component carriers and one or more uplink component carriers according to a carrier aggregation configuration. Carrier aggregation may be used with both frequency division duplexing (FDD) and time division duplexing (TDD) component carriers.

In some examples (for example, in a carrier aggregation configuration), a carrier also may have acquisition signaling or control signaling that coordinates operations for other carriers. A carrier may be associated with a frequency channel (for example, an evolved universal mobile telecommunication system terrestrial radio access (E-UTRA) absolute radio frequency channel number (EARFCN)) and may be positioned according to a channel raster for discovery by the UEs 115. A carrier may be operated in a standalone mode where initial acquisition and connection may be conducted by the UEs 115 via the carrier, or the carrier may be operated in a non-standalone mode where a connection is anchored using a different carrier (for example, of the same or a different radio access technology).

The communication links 125 shown in the wireless communications system 100 may include uplink transmissions from a UE 115 to a base station 105, or downlink transmissions from a base station 105 to a UE 115. Carriers may carry downlink or uplink communications (for example, in an FDD mode) or may be configured to carry downlink and uplink communications (for example, in a TDD mode).

A carrier may be associated with a particular bandwidth of the radio frequency spectrum, and in some examples the carrier bandwidth may be referred to as a "system bandwidth" of the carrier or the wireless communications system 100. For example, the carrier bandwidth may be one of a number of determined bandwidths for carriers of a particular radio access technology (for example, 1.4, 3, 5, 10, 15, 20, 40, or 80 megahertz (MHz)). Devices of the wireless communications system 100 (for example, the base stations 105, the UEs 115, or both) may have hardware configurations that support communications over a particular carrier bandwidth or may be configurable to support communications over one of a set of carrier bandwidths. In some examples, the wireless communications system 100 may include base stations 105 or UEs 115 that support simultaneous communications via carriers associated with multiple carrier bandwidths. In some examples, each served UE 115 may be configured for operating over portions (for example, a sub-band, a BWP) or all of a carrier bandwidth.

Signal waveforms transmitted over a carrier may be made up of multiple subcarriers (for example, using multi-carrier modulation (MCM) techniques such as orthogonal frequency division multiplexing (OFDM) or discrete Fourier transform spread OFDM (DFT-S-OFDM)). In a system employing MCM techniques, a resource element may include one symbol period (for example, a duration of one modulation symbol) and one subcarrier, where the symbol period and subcarrier spacing are inversely related. The number of bits carried by each resource element may depend on the modulation scheme (for example, the order of the modulation scheme, the coding rate of the modulation scheme, or both). Thus, the more resource elements that a UE 115 receives and the higher the order of the modulation scheme, the higher the data rate may be for the UE 115. A wireless communications resource may refer to a combination of a radio frequency spectrum resource, a time resource, and a spatial resource (for example, spatial layers or beams), and the use of multiple spatial layers may further increase the data rate or data integrity for communications with a UE 115.

One or more numerologies for a carrier may be supported, where a numerology may include a subcarrier spacing ($\Delta f$) and a cyclic prefix. A carrier may be divided into one or more BWPs having the same or different numerologies. In some examples, a UE 115 may be configured with multiple BWPs. In some examples, a single BWP for a carrier may be active at a given time and communications for the UE 115 may be restricted to one or more active BWPs.

The time intervals for the base stations 105 or the UEs 115 may be expressed in multiples of a basic time unit which may, for example, refer to a sampling period of $T_s=1/(\Delta f_{max} \cdot N_f)$ seconds, where $\Delta f_{max}$ may represent the maximum supported subcarrier spacing, and $N_f$ may represent the maximum supported discrete Fourier transform (DFT) size. Time intervals of a communications resource may be organized according to radio frames each having a specified duration (for example, 10 milliseconds (ms)). Each radio frame may be identified by a system frame number (SFN) (for example, ranging from 0 to 1023).

Each frame may include multiple consecutively numbered subframes or slots, and each subframe or slot may have the same duration. In some examples, a frame may be divided (for example, in the time domain) into subframes, and each subframe may be further divided into a number of slots. Alternatively, each frame may include a variable number of slots, and the number of slots may depend on subcarrier spacing. Each slot may include a number of symbol periods (for example, depending on the length of the cyclic prefix prepended to each symbol period). In some wireless communications systems 100, a slot may further be divided into multiple mini-slots containing one or more symbols. Excluding the cyclic prefix, each symbol period may contain one or more (for example, $N_f$) sampling periods. The duration of a symbol period may depend on the subcarrier spacing or frequency band of operation.

A subframe, a slot, a mini-slot, or a symbol may be the smallest scheduling unit (for example, in the time domain) of the wireless communications system 100 and may be referred to as a transmission time interval (TTI). In some examples, the TTI duration (for example, the number of symbol periods in a TTI) may be variable. Additionally, or alternatively, the smallest scheduling unit of the wireless communications system 100 may be dynamically selected (for example, in bursts of shortened TTIs (sTTIs)).

Physical channels may be multiplexed on a carrier according to various techniques. A physical control channel and a physical data channel may be multiplexed on a downlink carrier, for example, using one or more of time division multiplexing (TDM) techniques, frequency division multiplexing (FDM) techniques, or hybrid TDM-FDM techniques. A control region (for example, a control resource set (CORESET)) for a physical control channel may be defined by a number of symbol periods and may extend across the system bandwidth or a subset of the system bandwidth of the carrier. One or more control regions (for example, CORESETs) may be configured for a set of the UEs 115. For example, one or more of the UEs 115 may monitor or search control regions for control information according to one or more search space sets, and each search space set may include one or multiple control channel candidates in one or more aggregation levels arranged in a cascaded manner. An aggregation level for a control channel candidate may refer to a number of control channel resources (for example, control channel elements (CCEs)) associated with encoded information for a control information format having a given payload size. Search space sets may include common search space sets configured for sending control information to multiple UEs 115 and UE-specific search space sets for sending control information to a specific UE 115.

Each base station 105 may provide communication coverage via one or more cells, for example a macro cell, a small cell, a hot spot, or other types of cells, or any combination thereof. The term "cell" may refer to a logical communication entity used for communication with a base station 105 (for example, over a carrier) and may be associated with an identifier for distinguishing neighboring cells (for example, a physical cell identifier (PCID), a virtual cell identifier (VCID), or others). In some examples, a cell also may refer to a geographic coverage area 110 or a portion of a geographic coverage area 110 (for example, a sector) over which the logical communication entity operates. Such cells may range from smaller areas (for example, a structure, a subset of structure) to larger areas depending on various factors such as the capabilities of the base station 105. For example, a cell may be or include a building, a subset of a building, or exterior spaces between or overlapping with geographic coverage areas 110, among other examples.

A macro cell generally covers a relatively large geographic area (for example, several kilometers in radius) and may allow unrestricted access by the UEs 115 with service subscriptions with the network provider supporting the macro cell. A small cell may be associated with a lower-powered base station 105, as compared with a macro cell, and a small cell may operate in the same or different (for example, licensed, unlicensed) frequency bands as macro cells. Small cells may provide unrestricted access to the UEs 115 with service subscriptions with the network provider or may provide restricted access to the UEs 115 having an association with the small cell (for example, the UEs 115 in a closed subscriber group (CSG), the UEs 115 associated with users in a home or office). A base station 105 may support one or multiple cells and also may support communications over the one or more cells using one or multiple component carriers.

In some examples, a carrier may support multiple cells, and different cells may be configured according to different protocol types (for example, MTC, narrowband IoT (NB-IoT), enhanced mobile broadband (eMBB)) that may provide access for different types of devices.

In some examples, a base station 105 may be movable and therefore provide communication coverage for a moving geographic coverage area 110. In some examples, different geographic coverage areas 110 associated with different technologies may overlap, but the different geographic coverage areas 110 may be supported by the same base station 105. In other examples, the overlapping geographic coverage areas 110 associated with different technologies may be supported by different base stations 105. The wireless communications system 100 may include, for example, a heterogeneous network in which different types of the base stations 105 provide coverage for various geographic coverage areas 110 using the same or different radio access technologies.

The wireless communications system 100 may support synchronous or asynchronous operation. For synchronous operation, the base stations 105 may have similar frame timings, and transmissions from different base stations 105 may be approximately aligned in time. For asynchronous operation, the base stations 105 may have different frame timings, and transmissions from different base stations 105 may, in some examples, not be aligned in time. The techniques described herein may be used for either synchronous or asynchronous operations.

Some UEs 115, such as MTC or IoT devices, may be low cost or low complexity devices and may provide for automated communication between machines (for example, via Machine-to-Machine (M2M) communication). M2M communication or MTC may refer to data communication technologies that allow devices to communicate with one another or a base station 105 without human intervention. In some examples, M2M communication or MTC may include communications from devices that integrate sensors or meters to measure or capture information and relay such information to a central server or application program that makes use of the information or presents the information to humans interacting with the application program. Some UEs 115 may be designed to collect information or enable automated behavior of machines or other devices. Examples of applications for MTC devices include smart metering, inventory monitoring, water level monitoring, equipment monitoring, healthcare monitoring, wildlife monitoring, weather and geological event monitoring, fleet management and tracking, remote security sensing, physical access control, and transaction-based business charging.

Some UEs 115 may be configured to employ operating modes that reduce power consumption, such as half-duplex communications (for example, a mode that supports one-way communication via transmission or reception, but not transmission and reception simultaneously). In some examples, half-duplex communications may be performed at a reduced peak rate. Other power conservation techniques for the UEs 115 include entering a power saving deep sleep mode when not engaging in active communications, operating over a limited bandwidth (for example, according to narrowband communications), or a combination of these techniques. For example, some UEs 115 may be configured for operation using a narrowband protocol type that is associated with a defined portion or range (for example, set of subcarriers or resource blocks (RBs)) within a carrier, within a guard-band of a carrier, or outside of a carrier.

The wireless communications system 100 may be configured to support ultra-reliable communications or low-latency communications, or various combinations thereof. For example, the wireless communications system 100 may be configured to support ultra-reliable low-latency communications (URLLC) or mission critical communications. The UEs 115 may be designed to support ultra-reliable, low-latency, or critical functions (for example, mission critical functions). Ultra-reliable communications may include private communication or group communication and may be supported by one or more mission critical services such as mission critical push-to-talk (MCPTT), mission critical video (MCVideo), or mission critical data (MCData). Support for mission critical functions may include prioritization of services, and mission critical services may be used for public safety or general commercial applications. The terms ultra-reliable, low-latency, mission critical, and ultra-reliable low-latency may be used interchangeably herein.

In some examples, a UE 115 also may be able to communicate directly with other UEs 115 over a device-to-device (D2D) communication link 135 (for example, using a peer-to-peer (P2P) or D2D protocol). One or more UEs 115 utilizing D2D communications may be within the geographic coverage area 110 of a base station 105. Other UEs 115 in such a group may be outside the geographic coverage area 110 of a base station 105 or be otherwise unable to receive transmissions from a base station 105. In some examples, groups of the UEs 115 communicating via D2D communications may utilize a one-to-many (1:M) system in which each UE 115 transmits to every other UE 115 in the group. In some examples, a base station 105 facilitates the scheduling of resources for D2D communications. In some other examples, D2D communications are carried out between the UEs 115 without the involvement of a base station 105.

In some systems, the D2D communication link 135 may be an example of a communication channel, such as a sidelink communication channel, between vehicles (for example, UEs 115). In some examples, vehicles may communicate using vehicle-to-everything (V2X) communications, vehicle-to-vehicle (V2V) communications, or some combination of these. A vehicle may signal information related to traffic conditions, signal scheduling, weather, safety, emergencies, or any other information relevant to a V2X system. In some examples, vehicles in a V2X system may communicate with roadside infrastructure, such as roadside units, or with the network via one or more network nodes (for example, base stations 105) using vehicle-to-network (V2N) communications, or with both.

The core network 130 may provide user authentication, access authorization, tracking, Internet Protocol (IP) connectivity, and other access, routing, or mobility functions. The core network 130 may be an evolved packet core (EPC) or 5G core (5GC), which may include at least one control plane entity that manages access and mobility (for example, a mobility management entity (MME), an access and mobility management function (AMF)) and at least one user plane entity that routes packets or interconnects to external networks (for example, a serving gateway (S-GW), a Packet Data Network (PDN) gateway (P-GW), or a user plane function (UPF)). The control plane entity may manage non-access stratum (NAS) functions such as mobility, authentication, and bearer management for the UEs 115 served by the base stations 105 associated with the core network 130. User IP packets may be transferred through the user plane entity, which may provide IP address allocation as well as other functions. The user plane entity may be connected to the network operators IP services 150. The operators IP services 150 may include access to the Internet, Intranet(s), an IP Multimedia Subsystem (IMS), or a Packet-Switched Streaming Service.

Some of the network devices, such as a base station 105, may include subcomponents such as an access network entity 140, which may be an example of an access node controller (ANC). Each access network entity 140 may communicate with the UEs 115 through one or more other access network transmission entities 145, which may be referred to as radio heads, smart radio heads, or transmission/reception points (TRPs). Each access network transmission entity 145 may include one or more antenna panels. In some configurations, various functions of each access network entity 140 or base station 105 may be distributed across various network devices (for example, radio heads and ANCs) or consolidated into a single network device (for example, a base station 105).

The wireless communications system 100 may operate using one or more frequency bands, typically in the range of 300 megahertz (MHz) to 300 gigahertz (GHz). Generally, the region from 300 MHz to 3 GHz is known as the ultra-high frequency (UHF) region or decimeter band because the wavelengths range from approximately one decimeter to one meter in length. The UHF waves may be blocked or redirected by buildings and environmental features, but the waves may penetrate structures sufficiently for a macro cell to provide service to the UEs 115 located indoors. The transmission of UHF waves may be associated with smaller antennas and shorter ranges (for example, less than 100 kilometers) compared to transmission using the smaller frequencies and longer waves of the high frequency (HF) or very high frequency (VHF) portion of the spectrum below 300 MHz.

The wireless communications system 100 also may operate in a super high frequency (SHF) region using frequency bands from 3 GHz to 30 GHz, also known as the centimeter band, or in an extremely high frequency (EHF) region of the spectrum (for example, from 30 GHz to 300 GHz), also known as the millimeter band. In some examples, the wireless communications system 100 may support millimeter wave (mmW) communications between the UEs 115 and the base stations 105, and EHF antennas of the respective devices may be smaller and more closely spaced than UHF antennas. In some examples, this may facilitate use of antenna arrays within a device. The propagation of EHF transmissions, however, may be subject to even greater atmospheric attenuation and shorter range than SHF or UHF transmissions. The techniques disclosed herein may be employed across transmissions that use one or more different frequency regions, and designated use of bands across these frequency regions may differ by country or regulating body.

The wireless communications system 100 may utilize both licensed and unlicensed radio frequency spectrum bands. For example, the wireless communications system 100 may employ License Assisted Access (LAA), LTE-Unlicensed (LTE-U) radio access technology, or NR technology in an unlicensed band such as the 5 GHz industrial, scientific, and medical (ISM) band. When operating in unlicensed radio frequency spectrum bands, devices such as the base stations 105 and the UEs 115 may employ carrier sensing for collision detection and avoidance. In some examples, operations in unlicensed bands may be in accordance with a carrier aggregation configuration in conjunction with component carriers operating in a licensed band (for example, LAA). Operations in unlicensed spectrum may include downlink transmissions, uplink transmissions, P2P transmissions, or D2D transmissions, among other examples.

A base station 105 or a UE 115 may be equipped with multiple antennas, which may be used to employ techniques such as transmit diversity, receive diversity, multiple-input multiple-output (MIMO) communications, or beamforming. The antennas of a base station 105 or a UE 115 may be located within one or more antenna arrays or antenna panels, which may support MIMO operations or transmit or receive beamforming. For example, one or more base station antennas or antenna arrays may be co-located at an antenna assembly, such as an antenna tower. In some examples, antennas or antenna arrays associated with a base station 105 may be located in diverse geographic locations. A base station 105 may have an antenna array with a number of rows and columns of antenna ports that the base station 105 may use to support beamforming of communications with a UE 115. Likewise, a UE 115 may have one or more antenna arrays that may support various MIMO or beamforming operations. Additionally, or alternatively, an antenna panel may support radio frequency beamforming for a signal transmitted via an antenna port.

The base stations 105 or the UEs 115 may use MIMO communications to exploit multipath signal propagation and increase the spectral efficiency by transmitting or receiving multiple signals via different spatial layers. Such techniques may be referred to as spatial multiplexing. The multiple signals may, for example, be transmitted by the transmitting device via different antennas or different combinations of antennas. Likewise, the multiple signals may be received by the receiving device via different antennas or different combinations of antennas. Each of the multiple signals may be referred to as a separate spatial stream and may carry bits associated with the same data stream (for example, the same codeword) or different data streams (for example, different codewords). Different spatial layers may be associated with different antenna ports used for channel measurement and reporting. MIMO techniques include single-user MIMO (SU-MIMO), where multiple spatial layers are transmitted to the same receiving device, and multiple-user MIMO (MU-MIMO), where multiple spatial layers are transmitted to multiple devices.

Beamforming, which also may be referred to as spatial filtering, directional transmission, or directional reception, is a signal processing technique that may be used at a transmitting device or a receiving device (for example, a base station 105, a UE 115) to shape or steer an antenna beam (for example, a transmit beam, a receive beam) along a spatial path between the transmitting device and the receiving device. Beamforming may be achieved by combining the signals communicated via antenna elements of an antenna array such that some signals propagating at particular orientations with respect to an antenna array experience constructive interference while others experience destructive interference. The adjustment of signals communicated via the antenna elements may include a transmitting device or a receiving device applying amplitude offsets, phase offsets, or both to signals carried via the antenna elements associated with the device. The adjustments associated with each of the antenna elements may be defined by a beamforming weight set associated with a particular orientation (for example, with respect to the antenna array of the transmitting device or receiving device, or with respect to some other orientation).

A base station 105 or a UE 115 may use beam sweeping techniques as part of beam forming operations. For example, a base station 105 may use multiple antennas or antenna arrays (for example, antenna panels) to conduct beamforming operations for directional communications with a UE 115. Some signals (for example, synchronization signals, reference signals, beam selection signals, or other control signals) may be transmitted by a base station 105 multiple times in different directions. For example, the base station 105 may transmit a signal according to different beamforming weight sets associated with different directions of transmission. Transmissions in different beam directions may be used to identify (for example, by a transmitting device, such as a base station 105, or by a receiving device, such as a UE 115) a beam direction for later transmission or reception by the base station 105.

Some signals, such as data signals associated with a particular receiving device, may be transmitted by a base station 105 in a single beam direction (for example, a direction associated with the receiving device, such as a UE 115). In some examples, the beam direction associated with transmissions along a single beam direction may be determined in accordance with a signal that was transmitted in one or more beam directions. For example, a UE 115 may receive one or more of the signals transmitted by the base station 105 in different directions and may report to the base station 105 an indication of the signal that the UE 115 received with a highest signal quality or an otherwise acceptable signal quality.

In some examples, transmissions by a device (for example, by a base station 105 or a UE 115) may be performed using multiple beam directions, and the device may use a combination of digital precoding or radio frequency beamforming to generate a combined beam for transmission (for example, from a base station 105 to a UE 115). The UE 115 may report feedback that indicates precoding weights for one or more beam directions, and the feedback may correspond to a configured number of beams across a system bandwidth or one or more sub-bands. The base station 105 may transmit a reference signal (for example, a cell-specific reference signal (CRS), a channel state information reference signal (CSI-RS)), which may be precoded or unprecoded. The UE 115 may provide feedback for beam selection, which may be a precoding matrix indicator (PMI) or codebook-based feedback (for example, a multi-panel type codebook, a linear combination type codebook, a port selection type codebook). Although these techniques are described with reference to signals transmitted in one or more directions by a base station 105, a UE 115 may employ similar techniques for transmitting signals multiple times in different directions (for example, for identifying a beam direction for subsequent transmission or reception by the UE 115) or for transmitting a signal in a single direction (for example, for transmitting data to a receiving device).

A receiving device (for example, a UE 115) may try multiple receive configurations (for example, directional listening) when receiving various signals from the base station 105, such as synchronization signals, reference signals, beam selection signals, or other control signals. For example, a receiving device may try multiple receive directions by receiving via different antenna subarrays, by processing received signals according to different antenna subarrays, by receiving according to different receive beamforming weight sets (for example, different directional listening weight sets) applied to signals received at multiple antenna elements of an antenna array, or by processing received signals according to different receive beamforming weight sets applied to signals received at multiple antenna elements of an antenna array, any of which may be referred to as "listening" according to different receive configurations or receive directions. In some examples, a receiving device may use a single receive configuration to receive along a single beam direction (for example, when receiving a data signal). The single receive configuration may be aligned in a beam direction determined as a result of listening according to different receive configuration directions (for example, a beam direction determined to have a highest signal strength, highest signal-to-noise ratio (SNR), or otherwise acceptable signal quality as a result of listening according to multiple beam directions).

The wireless communications system 100 may be a packet-based network that operates according to a layered protocol stack. In the user plane, communications at the bearer or Packet Data Convergence Protocol (PDCP) layer may be IP-based. A Radio Link Control (RLC) layer may perform packet segmentation and reassembly to communicate over logical channels. A Medium Access Control (MAC) layer may perform priority handling and multiplexing of logical channels into transport channels. The MAC layer also may use error detection techniques, error correction techniques, or both to support retransmissions at the MAC layer to improve link efficiency. In the control plane, the Radio Resource Control (RRC) protocol layer may provide establishment, configuration, and maintenance of an RRC connection between a UE 115 and a base station 105 or a core network 130 supporting radio bearers for user plane data. At the physical layer, transport channels may be mapped to physical channels.

The UEs 115 and the base stations 105 may support retransmissions of data to increase the likelihood that data is received successfully. Hybrid automatic repeat request (HARQ) feedback is one technique for increasing the likelihood that data is received correctly over a communication link 125. HARQ may include a combination of error detection (for example, using a cyclic redundancy check (CRC)), forward error correction (FEC), and retransmission (for example, automatic repeat request (ARQ)). HARQ may improve throughput at the MAC layer in poor radio conditions (for example, low signal-to-noise conditions). In some examples, a device may support same-slot HARQ feedback, where the device may provide HARQ feedback in a specific slot for data received in a previous symbol in the slot. In some other examples, the device may provide HARQ feedback in a subsequent slot, or according to some other time interval.

The wireless communications system 100 may be an NR system that may utilize any combination of licensed, shared, and unlicensed spectrum bands, among others. In some examples, the NR unlicensed (NR-U) or shared spectrum may increase spectrum utilization and spectral efficiency as a result of the sharing of resources between devices within the wireless communications system 100. To transmit over a shared spectrum, a device may perform a channel sensing procedure to determine whether a channel (such as a shared spectrum channel) is currently being used by another, potentially interfering device.

In some implementations, the wireless communications system 100 may support separate channel sensing procedures at an IAB node with multiple wireless roles. For example, the IAB node may establish an MT role or functionality for upstream communications (for example, for communications over a wireless backhaul link 120) and a DU role or functionality for downstream communications (for example, for communications over a wireless access link, such as a communications link 125, or over a wireless backhaul link 120) and may perform a first channel sensing procedure to obtain channel access for transmissions via the MT role and a second channel sensing procedure to obtain channel access for transmissions via the DU role. The IAB node may select, configure, or otherwise determine a timing of a first sensing slot for performing the first channel sensing procedure or a timing of a second sensing slot for performing the second channel sensing procedure in accordance with a transmission timing of the transmissions via the MT role or in accordance with a transmission timing of the transmissions via the DU role, or both.

The IAB node may perform the first channel sensing procedure by measuring an energy of a channel (a shared channel) during the first sensing slot and comparing the measured energy, which may be referred to herein as an ED value, to a first ED threshold of the first channel sensing procedure. The IAB node may initiate a COT (or select, configure, or determine whether to initiate a COT) for the transmissions via the MT role in accordance with whether the measured energy satisfies (is less than or equal to) the first ED threshold, a timing of the transmissions via the MT role and a timing of the transmissions via the DU role, a duplexing capability of the IAB node, or any combination thereof. Similarly, the IAB node may perform the second channel sensing procedure by measuring an energy of a channel (which may be the same channel sensed by the first channel sensing procedure or a different channel) during the second sensing slot and comparing the measured energy to a second ED threshold of the second channel sensing procedure. The IAB node may initiate a COT (or select, configure, or determine whether to initiate a COT) for the transmissions via the DU role in accordance with whether the measured energy satisfies (is less than or equal to) the second ED threshold, a timing of the transmissions via the MT role and a timing of the transmissions via the DU role, a duplexing capability of the IAB node, or any combination thereof.

Figure 2:
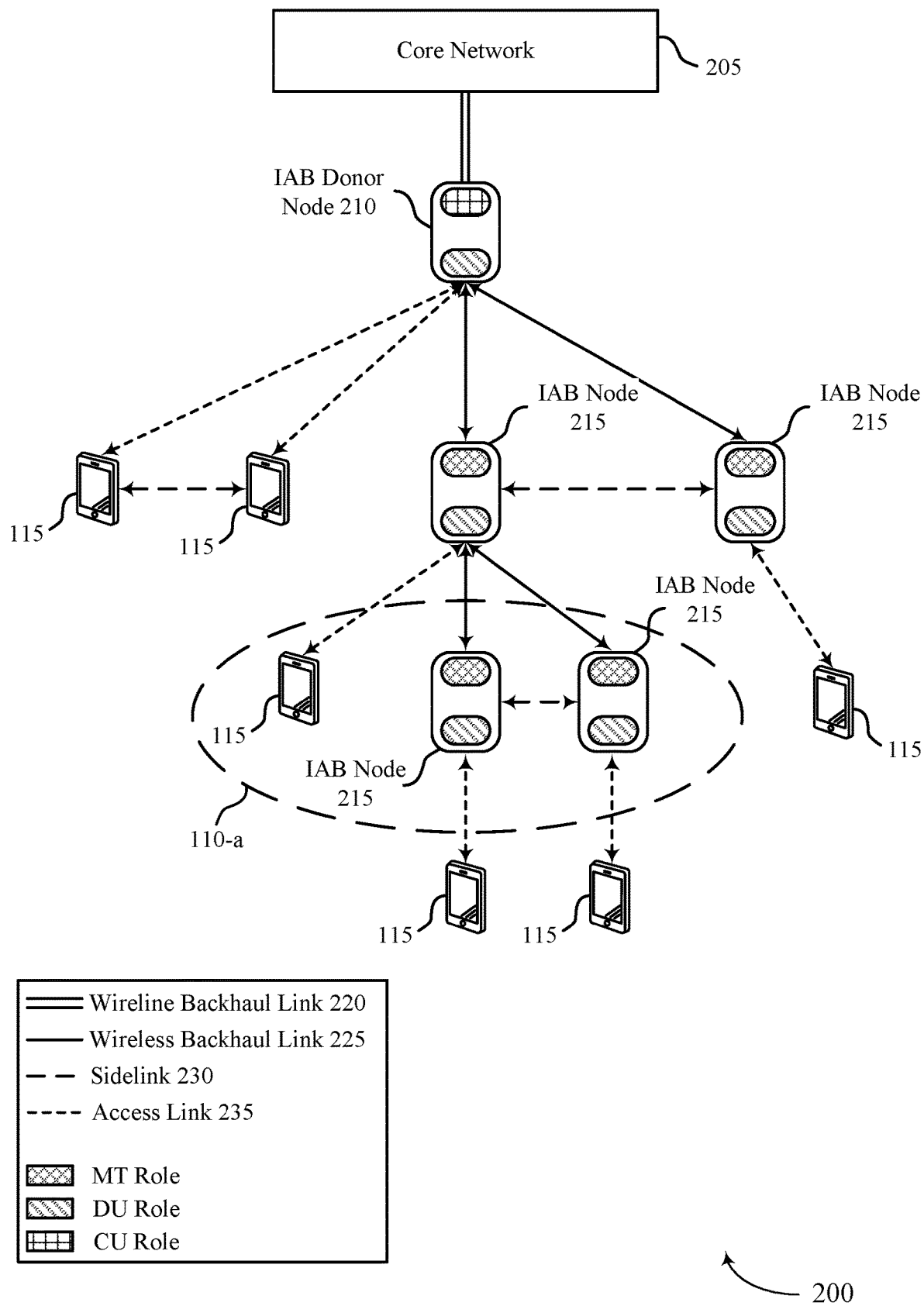
FIGS. 2 and 3 illustrate example IAB networks that support channel sensing procedures for communications at an IAB node.

FIG. 2 illustrates an example IAB network 200 that supports channel sensing procedures for communications at an IAB node. In some examples, the IAB network 200 may implement aspects of the wireless communications system 100. The IAB network 200 may be a 5G NR system, such as an mmW system, and may supplement wireline backhaul connections (such as a wireline backhaul link 220) by sharing infrastructure and spectral resources for network access among devices that support wireless backhaul capabilities, providing an IAB network architecture.

For example, the IAB network 200 illustrates an IAB network architecture including a core network 205, an IAB donor node 210, a number of IAB nodes 215 (which may be examples of IAB relay nodes), and a number of UEs 115. The IAB network 200 may support an overlay of access networks and backhaul networks between access nodes to enable communications between a UE 115 and the core network 205 via one or more wireless or wireline links. Such access networks may include communications between an access node, such as the IAB donor node 210 or an IAB node 215, and a UE 115 and such backhaul networks may include communications between different access nodes. In some examples, communications towards a UE 115 may be referred to as downstream communications and communications towards the core network 205 may be referred to as upstream communications.

The IAB network 200 may include one or more IAB donor nodes 210 that may function as an interface between a wireline network and a wireless network. For example, the IAB donor node 210 may include at least one wireline backhaul link 220 over which the IAB donor node 210 may communicate with the core network 205 and one or more wireless links, such as wireless backhaul links 225 or access links 235, over which the IAB donor node 210 may communicate with UEs 115 or IAB nodes 215 (for example, child nodes). In some aspects, the IAB donor node 210 may be referred to as an anchor node as a result of the wireline backhaul link 220 between the IAB donor node 210 and the core network 205. The IAB donor node 210 may be split into or otherwise function in two wireless roles or as two entities. For example, the IAB donor node 210 may be split into or otherwise function in a CU role and a DU role, where the DU associated with the IAB donor node 210 may be at least partially controlled by the associated CU of the IAB donor node 210. In some aspects, the CU role and the DU role of the IAB donor node 210 may be different entities. In some other aspects, the CU role and the DU role of the IAB donor node 210 may be included within the same entity, but may functionally operate as two different entities (for example, the IAB donor node 210 may use different software if communicating via the CU role than if communicating via the DU role).

The CU of the IAB donor node 210 may support layer 3 (L3) functionality and signaling, such as RRC or PDCP layer functions, and, in some examples, the IAB donor node 210 may control the IAB network through configuration signaling via the CU role. The DU of the IAB donor node 210 may hold lower layer operations, such as layer 1 (L1) or layer 2 (L2) functionality and signaling. For example, the DU of the IAB donor node 210 may hold RLC, MAC, or physical layer functions. In some examples, the IAB donor node 210, via the DU role, may control both the access links 235 and the wireless backhaul links 225 within an IAB network coverage area and may provide control information and scheduling information for descendent (for example, child) IAB nodes 215 or UEs 115, or both. For example, the IAB donor node 210, via the DU role, may support an RLC channel connection with a UE 115 (via an access link 235) or with an IAB node 215 (via a wireless backhaul link 225).

The IAB nodes 215 also may be split into or otherwise function in two wireless roles or as two entities. For example, an IAB node 215 may be split into or otherwise function in a mobile termination (MT) role and a DU role, where the MT role of the IAB node 215 may be at least partially controlled or scheduled by parent nodes, such as a parent IAB node 215 or the IAB donor node 210. In some aspects, the MT role and the DU role of the IAB node 215 may be different entities. In some other aspects, the MT role and the DU role of the IAB node 215 may be included within the same entity, but may functionally operate as two different entities (for example, the IAB node 215 may use different software if communicating via the MT role than if communicating via the DU role). In some examples, the MT role of the IAB node 215 may be similar to a role performed by the UEs 115 within the IAB network 200. Additionally, in some examples, the IAB node 215 may not be directly connected to a wireline backhaul link 220. Instead, the IAB node 215 may connect to the core network 205 via other IAB nodes 215 (any number of additional IAB nodes 215 and the IAB donor node 210) using wireless backhaul links 225. As such, in examples in which the IAB node 215 functions as a relay node, the IAB node 215 may relay traffic to or from the IAB donor node 210 through one or multiple hops, where a quantity of the one or multiple hops may refer to the number of wireless backhaul links 225 connecting the IAB node 215 to the IAB donor node 210.

The DU role of the IAB node 215 may be at least partially controlled by signaling messages from the CU role of the IAB donor node 210 (for example, an associated IAB donor node 210). In some examples, such signaling messages may be transmitted from the IAB donor node 210 to the IAB node 215 via an F1-application protocol (F1-AP) message. Additionally, the DU role of the IAB node 215 may support a geographic coverage area 110-a of the IAB network coverage area and may provide scheduling information to the UEs 115 and the child IAB nodes 215 within the geographic coverage area 110-a. For example, the DU role of the IAB node 215 may perform the same or similar functions as the DU role of the IAB donor node 210 by controlling or scheduling communication over the access links 235 between the IAB node 215 and the UEs 115 within the geographic coverage area 110-a and the wireless backhaul links 225 between the IAB node 215 and the downstream IAB nodes 215 within the geographic coverage area 110-a. As described herein, the IAB node 215 may communicate upstream (towards the core network 205) in the IAB network 200 using the MT role of the IAB node 215 and may communicate downstream (towards a UE 115) in the IAB network 200 using the DU role of the IAB node 215.

In some examples, the IAB network 200 may be an NR-U system and an IAB node 215 may utilize a shared spectrum or an unlicensed spectrum to communicate with the IAB donor node 210, one or more other IAB nodes 215 (for example, parent IAB nodes 215 or child IAB nodes 215), one or more UEs 115, or any combination thereof. As such, the IAB node 215 may share time and frequency resources with other devices within the IAB network 200. The IAB node 215, as a result of utilizing an NR shared spectrum, may support increased spectrum utilization and spectral efficiency, specifically through dynamic vertical (for example, across the frequency domain) and horizontal (for example, across the time domain) sharing of resources. In some examples, however, a shared spectrum may become congested if multiple devices attempt to transmit over the shared spectrum simultaneously, which may result in high levels of interference and reduce the likelihood for successful communications between devices in the IAB network 200. For example, if the IAB node 215 attempts to transmit at the same time as another device, the transmission from the IAB node 215 may be adversely influenced by interference generated by the other device, which may lower the likelihood that a receiving device will successfully receive the transmission from the IAB node 215.

To reduce the influence of interference generated by other devices using the shared spectrum, the IAB node 215 may perform a channel sensing procedure prior to transmitting to find or determine whether the shared channel is idle (available). Some channel sensing procedures, however, may be sub-optimal for devices that feature or otherwise function in different wireless roles. For example, the IAB node 215 may function in the MT role or in the DU role, or both, at any given time and the different wireless roles may use different communication components of the IAB node 215 or different communication parameters that may influence the reliability and accuracy of a channel sensing procedure. For example, in accordance with various design or implementation choices, the MT role and the DU role of the IAB node 215 may share an antenna panel of the IAB node 215, use different antenna panels of the IAB node 215, use different transmission powers (for example, different maximum transmission powers), use different sets of transmit beams and receive beams, have different radio frequency footprints, share the same ED thresholds, use different ED thresholds, or any combination thereof. In an example, the MT role and the DU role of the IAB node 215 may each use different sets of transmit beams and receive beams because the DU role of the IAB node 215 may serve a wider geographic area than the MT role, which may be because the DU role of the IAB node 215 may serve a relatively larger number of UEs 115 or child IAB nodes 215 at various locations within a geographic coverage area 110-a while the MT role of the IAB node 215 may communicate with a relatively smaller number of candidate parent IAB nodes 215 with known locations or directions. Additionally, or alternatively, different IAB nodes 215 may have different duplexing capabilities, which may influence the timing of a channel sensing procedure.

In some implementations, the IAB node 215 may account for such potential variations as a result of communicating capability and configuration signaling between the IAB node 215 and a parent IAB node 215 or the IAB donor node 210 (for example, the CU role of the IAB donor node 210). For example, the IAB node 215 may report one or more capabilities to a parent IAB node 215 or the CU role of the IAB donor node 210, which may include a sensing capability or a duplexing capability, or both.

In some examples, the sensing capability of the IAB node 215 may indicate whether the IAB node 215 is capable of performing a channel sensing procedure as a single node or as multiple nodes. For example, the IAB node 215 may operate both the MT role and the DU role of the IAB node 215 as a single entity (for example, the MT role and the DU role may share an antenna panel of the IAB node 215) and the IAB node 215 may include, within the sensing capability, an indication that the IAB node 215 is capable of performing channel sensing procedures as a single node. Performing a channel sensing procedure as a single node may be referred to herein as a common channel sensing procedure. Alternatively, the IAB node 215 may operate the MT role as a first entity and the DU role as a second entity (for example, the MT role and the DU role of the IAB node 215 may use different antenna panels of the IAB node 215) and the IAB node 215 may include, within the sensing capability, an indication that the IAB node 215 is capable of performing channel sensing procedures as multiple nodes. Performing a channel sensing procedure as multiple nodes may be referred to herein as performing a separate channel sensing procedure for the MT role and the DU role.

In some implementations, the IAB node 215 may perform a separate channel sensing procedure for the MT role and the DU role. Such use of separate channel sensing procedures for transmissions via the MT role and for transmissions via the DU role of the IAB node 215 may result in greater reliability, such as in examples in which the MT role and the DU role of the IAB node use separate antenna panels or otherwise have different radio frequency footprints—for instance, in examples in which the MT role and the DU role of the IAB node 215 have sufficiently different (outside a threshold variation) radio frequency footprints.

The radio frequency footprints associated with the MT role and the DU role of the IAB node 215 may correspond to areas or volumes in which interference to a receiver may be great enough to result in higher error rates or lower likelihoods for successful communications. The IAB node 215 may determine the radio frequency footprints associated with the MT role and the DU role of the IAB node 215 in accordance with a transmit beam pattern, a transmission power, an ED threshold, or any combination thereof. As such, in examples in which the MT role and the DU role have different radio frequency footprints, the MT role and the DU role may use different transmit beam patterns and or different transmission powers, or transmissions via the MT role and the DU role may have different susceptibilities to interference (for example, different ED thresholds may be used for transmissions via the MT role than for transmissions via the DU role).

In such examples in which the MT role and the DU role have different radio frequency footprints, the IAB node 215 may perform different channel sensing procedures for each wireless role such that the two different channel sensing procedure achieve better alignment with the two different radio frequency footprints of the MT role and the DU role than a single channel sensing procedure could achieve. For example, the MT role may be associated with a first radio frequency footprint and the DU role may be associated with a second radio frequency footprint and the first channel sensing procedure may be configured to align with the first radio frequency footprint of the MT role while the second channel sensing procedure may be configured to align with the second radio frequency footprint of the DU role. The area or volume of the radio frequency footprint associated with a channel sensing procedure may be determined using or in accordance with a receive beam pattern, a maximum transmit power, an ED threshold, or any combination thereof.

As such, the IAB node 215 may align the radio frequency footprint associated with one of the channel sensing procedures with the radio frequency footprint associated with one of the wireless roles of the IAB node 215 as a result of using the same or a similar beam pattern to perform the channel sensing procedure as the wireless role uses to transmit, or as a result of adjusting the transmit power or the ED threshold, or both, in examples in which different beam patterns are used. As such, the IAB node 215 may minimize or avoid an exposed node problem in which an area or volume may be covered by the radio frequency footprint of a channel sensing procedure but not by the radio frequency footprint of a transmission via the MT role or the DU role, which may result in unnecessary blocking of transmissions, and a hidden node problem in which an area or volume may be covered by the radio frequency footprint of a transmission via the MT role or the DU role but not by the radio frequency footprint of a channel sensing procedure, which may result in high levels of interference from a node within the area or volume that may reduce the likelihood for successful transmissions from the IAB node 215.

Additionally, or alternatively, the sensing capability of the IAB node 215 may indicate whether the IAB node 215 is capable of performing simultaneous channel sensing procedures. In other words, the sensing capability of the IAB node 215 may indicate whether the IAB node 215 is capable of simultaneously sensing one or multiple channels from multiple entities of the IAB node 215. For example, the sensing capability may indicate whether the IAB node 215 is capable of performing the first channel sensing procedure at the same time as the second channel sensing procedure. Additionally, or alternatively, the sensing capability of the IAB node 215 may indicate whether the IAB node 215 is capable of performing a channel sensing procedure for one wireless role while transmitting via another wireless role. For example, the IAB node 215 may include, within the sensing capability, an indication of whether the IAB node 215 is capable of performing the first channel sensing procedure for a transmission via the MT role while simultaneously transmitting via the DU role or capable of performing the second channel sensing procedure for a transmission via the DU role while simultaneously transmitting via the MT role.

Additionally, or alternatively, the sensing capability may include an indication of whether the IAB node 215 is capable of shifting the timing of a sensing slot by a gap to offset the sensing slot from a corresponding transmission.

In some implementations, the IAB node 215 may transmit the sensing capability to a parent IAB node 215 or the CU role of the IAB donor node 210 in a message signaled via an F1-AP interface, via an RRC interface, via a MAC-CE, or any combination thereof. For example, the IAB node 215 may transmit or otherwise output the sensing capability of the IAB node 215 as one or more of an F1-AP message, an RRC message, or a MAC-CE. The IAB node 215 may additionally, or alternatively, transmit a duplexing capability to a parent IAB node 215 or the CU role of the IAB donor node 210 to indicate whether the IAB node 215 is capable of TDM upstream and downstream communications, space-division multiplexing (SDM) simultaneous reception, SDM simultaneous transmission, or full-duplex communications. Example duplexing capabilities of the IAB node 215 are described in more detail herein, for example, with reference to FIG. 3. In some examples, the duplexing capability of the IAB node 215 may influence a timing of a sensing slot for performing a channel sensing procedure. The IAB node 215 may transmit the duplexing capability to a parent IAB node 215 or the CU role of the IAB donor node 210 along with or separately from transmitting the sensing capability and, in some implementations, may transmit or otherwise output the duplexing capability as one or more of an F1-AP message, an RRC message, or a MAC-CE.

The parent IAB node 215 or the IAB donor node 210 may receive the sensing capability or the duplexing capability, or both, and may select or otherwise determine a configuration of the channel sensing procedure of the IAB node 215 in accordance with the sensing capability or the duplexing capability, or both. In some examples, the configuration of the channel sensing procedures may indicate a type of channel sensing procedure that the IAB node 215 may use. For example, the IAB node 215 may perform a type 1 (type1) channel sensing procedure, a type 2A (type2A) channel sensing procedure, or a type 2B (type2B) channel sensing procedure. Additional details relating to the type of channel sensing procedure are described herein, for example, with reference to FIG. 4. Additionally, the configuration of the channel sensing procedure may indicate whether the IAB node 215 will perform a common channel sensing procedure for transmissions via the MT role and the DU role or whether the IAB node 215 will perform separate channel sensing procedures for transmissions via the MT role and the DU role. In some implementations, the configuration may indicate that the IAB node 215 will perform separate channel sensing procedures for transmissions via the MT role and for transmissions via the DU role.

The configuration of the channel sensing procedure also may include information relating to a timing of a sensing slot for performing the channel sensing procedure (for example, timing information of separate sensing slots for performing separate channel sensing procedures). Additional details relating to the timing of separate channel sensing procedures are described herein, for example, with reference to FIG. 5. Additionally, or alternatively, the configuration of the channel sensing procedure may indicate whether the IAB node 215 may use a filler signal to align a transmission timing of a transmission via the MT role with a transmission timing of a transmission via the DU role. For instance, in examples in which the IAB node 215 is capable of simultaneously transmitting via the MT role and the DU role and in which the transmissions via the MT role and the DU role are not aligned in time (for example, offset by some time gap), the configuration of the channel sensing procedure may indicate the IAB node 215 to apply a filler signal to align the transmissions via the MT role and the DU role in time. Additional details relating to the application of a filler signal to align different transmissions via the MT role and the DU role in time are described herein, for example, with reference to FIG. 6.

In some examples, the configuration for the channel sensing procedure of the IAB node 215 may be pre-configured or pre-defined, such as in a specification, in accordance with the capabilities of the IAB node 215. Additionally, or alternatively, the parent IAB node 215 or the IAB donor node 210 may transmit an indication of the channel sensing procedure configuration to the IAB node 215. For instance, in examples in which the parent IAB node 215 configures the channel sensing procedure for the IAB node 215, the parent IAB node 215 may transmit the indication via a MAC-CE or via DCI. In examples in which the IAB donor node 210 configures the channel sensing procedure for the IAB node 215 via the CU role of the IAB donor node 210, the IAB donor node 210 may transmit the indication via the F1-AP interface (via an F1-AP message) or via the RRC interface (via an RRC message).

In some implementations, the configuration of the channel sensing procedure may be received via a ChannelAccessConfig-r16 field, which be an RRC field or an RRC information element including a list of parameters used for shared spectrum channel sensing procedures. For example, the ChannelAccessConfig-r16 field may include a maxEnergyDetectionThreshold-r16 parameter that indicates a maximum ED threshold, an energyDetectionThresholdOffset-r16 parameter that indicates an offset relative to a default ED threshold (such as a default maximum ED threshold), an ul-toDL-COT-SharingED-Threshold-r16 parameter that indicates a maximum ED threshold that the IAB node 215 may use to share a COT with the IAB donor node 210 or a parent IAB node 215, and an absenceOfAnyOtherTechnology-r16 parameter that indicates a potential presence or an absence of any other technology sharing the carrier used by the IAB node 215. At a base station 105 side or a DU role of an IAB node 215, the upper limit for an ED threshold may be determined using a formula, such as defined by a specification, and the max ED threshold may be a function of maximum transmission power, bandwidth, existence of other technology for sharing the channel, or any combination thereof. At a UE 115 side or an MT role of the IAB node 215, the upper limit for an ED threshold may be configured as an absolute value via maxEnergyDetectionThreshold-r16 or as an offset value via energyDetectionThresholdOffset-r16. In examples in which the upper limit for the ED threshold is not configured, the UE 115 or the MT role of the IAB node 215 may determine the upper limit for the ED threshold using a formula similar to the formula used at the base station 105 side or at the DU role of the IAB node 215.

In some examples, the IAB node 215 may receive or be configured with an ED threshold, which also may be referred to herein as a value or an ED threshold value, of a channel sensing procedure. For example, the CU role of the IAB donor node 210 may configure the ED threshold via an F1-AP interface (via an F1-AP message) or via an RRC interface (via an RRC message) or a parent IAB node 215 may indicate the ED threshold value to the IAB node 215 via a MAC-CE or DCI. In some examples, the IAB node 215 may receive an indication of the ED threshold via one of the parameters in the ChannelAccessConfig-r16 field. In some implementations, the signaling from the IAB donor node 210 or the parent IAB node 215 may indicate a first ED threshold that the IAB node 215 may use for performing the first channel sensing procedure and a second ED threshold that the IAB node 215 may use for performing the second channel sensing procedure. Additionally, or alternatively, a configured or indicated ED threshold may be associated with a set of sensing beams or a set of beam pairs (for example, a set of unique pairs of sensing beams and transmit beams) and the IAB node 215 may use the ED threshold when performing a channel sensing procedure using an associated set of sensing beams or an associated set of beam pairs. For example, a first ED threshold may be associated with a first set of sensing beams and a second ED threshold may be associated with a second set of sensing beams. In such examples, the IAB node 215 may use the first ED threshold for performing the first channel sensing procedure if the first channel sensing procedure uses the first set of sensing beams and the IAB node 215 may use the second ED threshold for performing the second channel sensing procedure if the second channel sensing procedure uses the second set of sensing beams.

Additionally, or alternatively, the ED threshold may be configured or otherwise determined in accordance with whether the IAB node 215 is performing a channel sensing procedure while simultaneously transmitting. For example, the IAB node 215 may be configured with a first ED threshold that the IAB node 215 may use if performing a channel sensing procedure (either the first channel sensing procedure or the second channel sensing procedure) in the presence of transmissions via another wireless role (for example, either the MT role or the DU role) of the IAB node 215 and may be configured with a second ED threshold that the IAB node 215 may use if performing the channel sensing procedure in the absence of transmissions from the IAB node 215. In some examples, the first ED threshold that the IAB node 215 may use for performing the channel sensing procedure while transmitting may have a larger value than the second ED threshold that the IAB node 215 may use for performing the channel sensing procedure in the absence of transmissions from the IAB node 215 (for example, the first ED threshold may be a less strict threshold than the second ED threshold). The IAB node 215 may select the first ED threshold or the second ED threshold in accordance with whether the IAB node 215 is scheduled to be transmitting while performing the channel sensing procedure.

In some examples, an ED threshold may be received or configured at the IAB node 215 as an absolute value. For example, signaling indicating or configuring an ED threshold at the IAB node 215 may include a number of bits (such as a bit stream) corresponding to the absolute value (the complete value) of the ED threshold. In some other examples, an ED threshold may be indicated to or configured at the IAB node 215 as an offset value relative to a default value (for example, a default value as defined by a specification) or as an offset value relative to an indicated parameter. For example, the IAB node 215 may be configured with or otherwise determine a default value and the signaling to the IAB node 215 (from either the IAB donor node 210 or a parent IAB node 215) may indicate an offset value relative to the default value. In such examples, the IAB node 215 may calculate or otherwise determine the ED threshold using the default value and the offset value. For example, the IAB node 215 may add, subtract, or perform any other mathematical operation including the default value and the offset value to calculate or otherwise determine the ED threshold. In some implementations, the default value may be a default ED threshold. Additionally, or alternatively, the IAB node 215 may receive an indication of a parameter and the offset value (from either of the IAB donor node 210 or a parent IAB node 215) and the IAB node 215 may calculate or otherwise determine the ED threshold using the indicated parameter and the offset value. The indicated parameter may be any communication parameter and may be explicitly or implicitly signaled to the IAB node 215.

In some other examples, the IAB node 215 may determine an ED threshold without receiving additional signaling from another device (from either of the IAB donor node 210 or a parent IAB node 215). In such examples, the IAB node 215 may determine the ED threshold using a formula, such as a formula defined in a specification. In some implementations, the IAB node 215 (a device in a wireless backhaul network) may use a formula to determine the ED threshold in a similar manner as a device in an access network may determine the ED threshold (for example, as defined in an NR-U specification). Additionally, or alternatively, the IAB node 215 may determine the ED threshold as a result of using a number of rules or formulas, or both, that correspond (for example, account for) the class of the wireless roles of the IAB node 215. For example, the IAB node 215 may determine a first ED threshold for the first channel sensing procedure in accordance with a class of the MT role and may determine a second ED threshold for the second channel sensing procedure in accordance with a class of the DU role. In some examples, the class of the MT role may include a wide-area class or a local-area class.

As such, the IAB node 215 may receive an indication or otherwise select or determine the configuration of the separate channel sensing procedures and the ED thresholds and may perform the separate channel sensing procedures accordingly. For example, the IAB node 215 may measure an energy, which may be referred to herein as an ED value, of a channel during a first channel sensing procedure in a measurement area of a first sensing slot and initiate a COT for a transmission via the MT role in accordance with whether the measured energy satisfies (for example, is less than or equal to) a first ED threshold. Similarly, the IAB node 215 may measure an energy of a channel during a second channel sensing procedure in a measurement area of a second sensing slot and initiate a COT for a transmission via the DU role as a result of determining whether the measured energy satisfies a second ED threshold.

Figure 3:
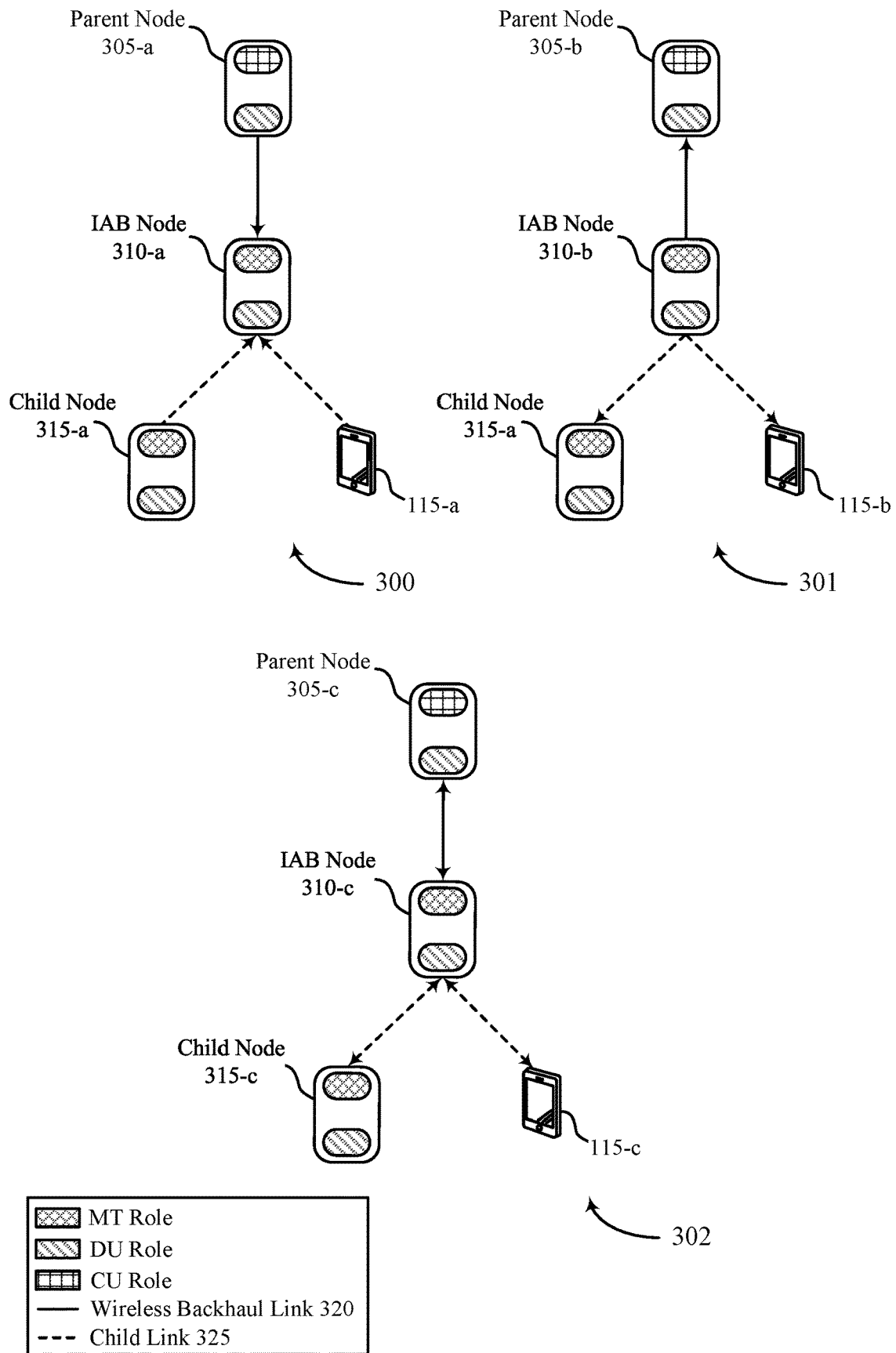

FIG. 3 illustrates example IAB networks 300, 301, and 302 that support channel sensing procedures for communications at an IAB node. In some examples, the IAB networks 300, 301, and 302 may implement aspects of the wireless communications system 100 or the IAB network 200. The IAB networks 300, 301, and 302 illustrate examples of different duplexing capabilities of an IAB node 310, which may be an example of corresponding devices described with reference to FIGS. 1 and 2, such as an IAB node 215 as described with reference to FIG. 2.

The IAB node 310 may feature a duplexing capability and, in some implementations, may transmit an indication of the duplexing capability to a parent node 305, which may be an example of a parent IAB node 215 or an IAB donor node 210 as described with reference to FIG. 2. In some examples, the IAB node 310 may be configured with or otherwise receive an indication of a configuration for performing separate channel sensing procedures for transmissions via an MT role and for transmissions via a DU role in accordance with the duplexing capability of the IAB node 310. The IAB node 310 may support TDM communication techniques between communications over wireless backhaul link 320 and child links 325 (which may be examples of access links) or may support different duplex capabilities (for example, enhanced duplex capabilities), such as half-duplex SDM for simultaneous reception or simultaneous transmission or full-duplex SDM for simultaneous transmission and reception.

In the IAB network 300, an IAB node 310-a may establish an MT role and a DU role and may communicate with a parent node 305-a over a wireless backhaul link 320 via the MT role of the IAB node 310-a and may communicate with a child node 315-a and a UE 115-a over child links 325 via the DU role of the IAB node 310-a. In some examples, the IAB node 310-a may support a half-duplex SDM capability and, as such, may receive multiple signals simultaneously. For example, the IAB node 310-a may simultaneously receive signaling from the child node 315-a and the UE 115-a over the child links 325 and signaling from the parent node 305-a over the wireless backhaul link 320.

In the IAB network 301, an IAB node 310-b may establish an MT role and a DU role and may communicate with a parent node 305-b over a wireless backhaul link 320 via the MT role of the IAB node 310-b and may communicate with a child node 315-b and a UE 115-b over child links 325 via the DU role of the IAB node 310-b. In some examples, the IAB node 310-b may support a half-duplex SDM capability and, as such, may transmit multiple signals simultaneously. For example, the IAB node 310-b may simultaneously transmit signaling (for example, downstream communication) to the child node 315-b or the UE 115-b over the child links 325 via the DU role of the IAB node 310-b and may transmit signaling (for example, upstream communications) to the parent node 305-b over the wireless backhaul link 320 via the MT role of the IAB node 310-b. In some implementations, the IAB node 310-b may perform separate channel sensing procedures prior to transmitting via the MT role and the DU role. Additional details relating to performing the separate channel sensing procedures are described herein, for example, with reference to FIGS. 2 and 5.

In the IAB network 302, an IAB node 310-c may establish an MT role and a DU role and may communicate with a parent node 305-c over a wireless backhaul link 320 via the MT role of the IAB node 310-c and may communicate with a child node 315-c and a UE 115-c over child links 325 via the DU role of the IAB node 310-c. In some examples, the IAB node 310-c may support a full-duplex SDM capability and, as such, may transmit and receive multiple signals simultaneously. For example, the IAB node 310-c may simultaneously transmit and receive signaling to and from the child node 315-c or the UE 115-c over the child links 325 via the DU role of the IAB node 310-c and may simultaneously transmit and receive signaling to and from the parent node 305-c over the wireless backhaul link 320 via the MT role of the IAB node 310-c. In some implementations, the IAB node 310-c may perform separate channel sensing procedures prior to transmitting via the MT role and the DU role. Additional details relating to performing the separate channel sensing procedures are described herein, for example, with reference to FIGS. 2 and 5.

Figure 4:
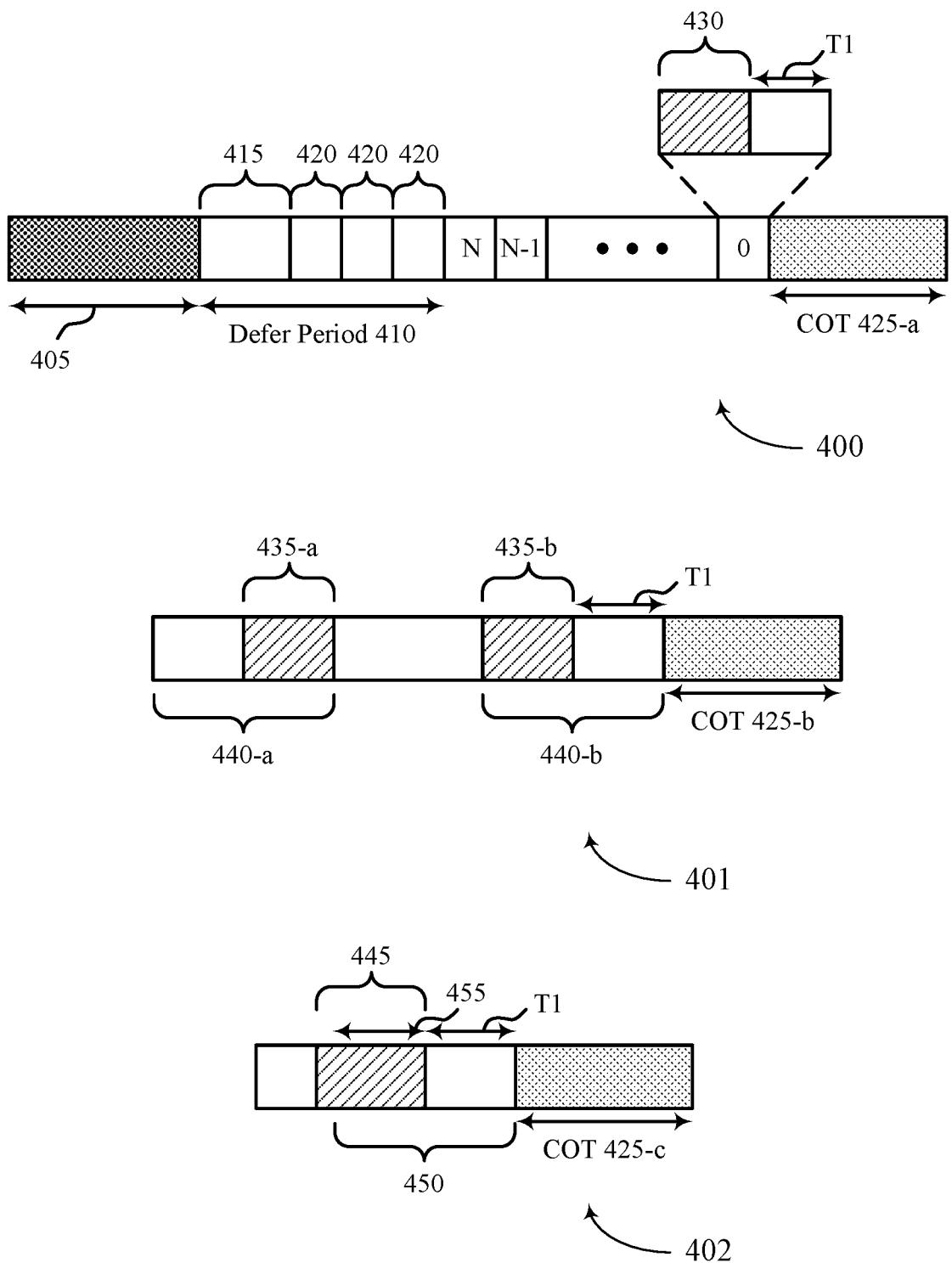
FIG. 4 illustrates example channel sensing configurations that support channel sensing procedures for communications at an IAB node.
Figure 5A:
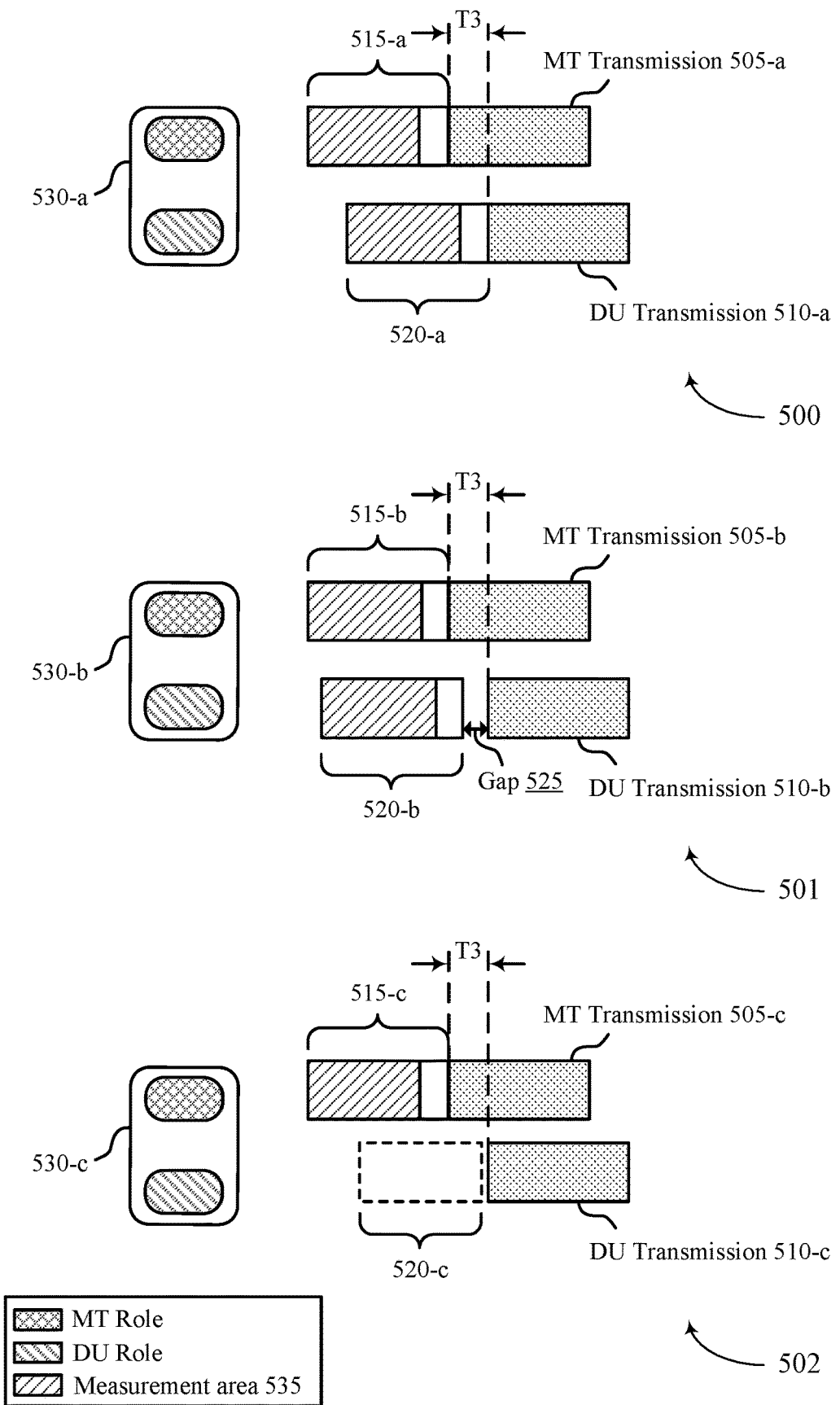
FIGS. 5A and 5B illustrate example communications timelines that support channel sensing procedures for communications at an IAB node.
Figure 5B:
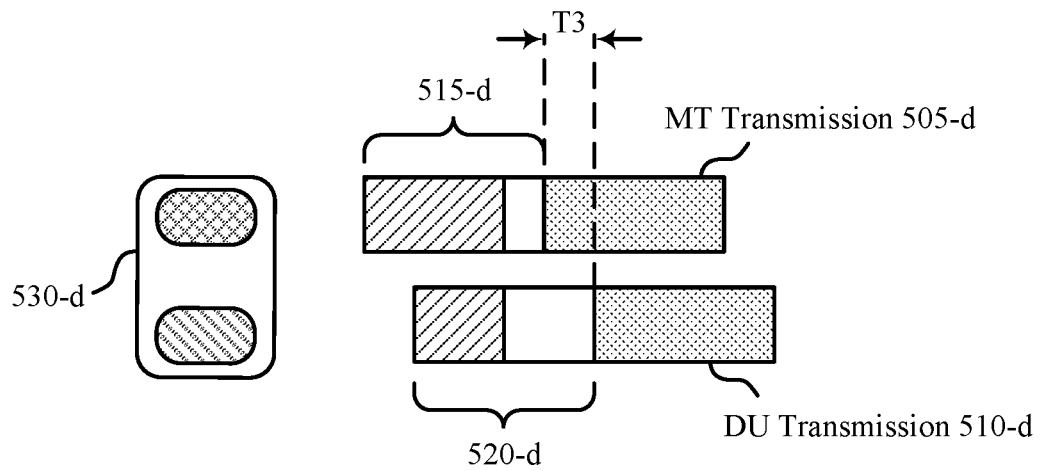
Figure 5B:
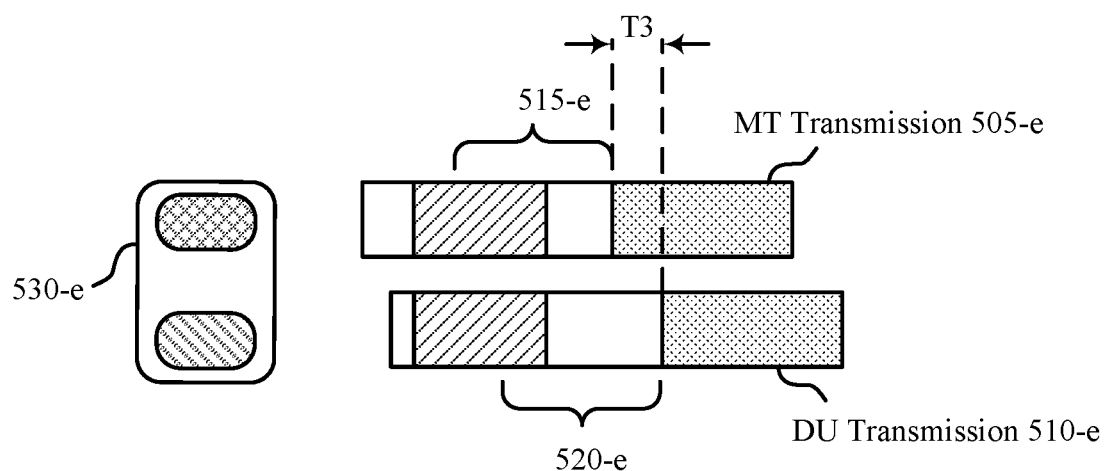
Figure 5B:
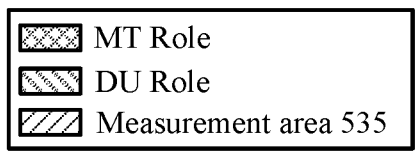

FIG. 4 illustrates example channel sensing configurations 400, 401, and 402 that support channel sensing procedures for communications at an IAB node. In some examples, the channel sensing configurations 400, 401, and 402 may implement aspects of the wireless communications system 100 or the IAB network 200. The channel sensing configurations 400, 401, and 402 illustrate example channel sensing configurations that a wireless node, which may be an example of an IAB node as described with reference to FIGS. 1-3, may use to perform separate channel sensing procedures for transmissions via an MT role and a DU role of the IAB node.

The channel sensing configuration 400 illustrates an example of a type1 channel sensing procedure that the wireless node may implement to gain access and to initiate a COT 425 (for example, in an NR-U shared spectrum). A type1 channel sensing procedure, which may be equivalently referred to as a type1 channel access procedure, may include a random number of slots N that the wireless node may sense (for example, a random number of slots N that the wireless node may measure an energy of a channel during). For example, the wireless node may identify that a channel is busy during a time period 405 and may perform the type1 channel sensing procedure upon the expiration of the time period 405 and one or more defer periods 410. A defer period 410 may include a slot 415 and a number of slots 420. The wireless node may select or otherwise determine the number (the quantity) of slots 420 in the defer period 410 in accordance with a parameter, such as an $m_p$ parameter. For example, the wireless node may use the $m_p$ parameter to select or determine a number of slots 420 that may follow a slot 415. As illustrated in the channel sensing configuration 400, $m_p$ may be equal to 3 and, as such, three slots 420 may follow the slot 415. In some examples, the slot 415 may span a time duration equal to 16 microseconds and a slot 420 may span a time duration equal to a basic sensing unit of time, which may be equal to 9 microseconds. As such, in examples in which $m_p$ is equal to 3, the defer period 410 may span a time duration equal to 43 microseconds ($16+m_p*9=16+3*9=43$).

Upon expiration of the defer period 410, the wireless node may sense a random number (which may be denoted as N, where $N \geq 0$) of sensing slots that are found, sensed, or otherwise determined to be idle prior to transmitting. In some examples, each of the sensing slots that the wireless node may sense may include a measurement area 430. Each of the sensing slots may span a time duration equal to the basic sensing unit of time, which may be equal to 9 microseconds, and each measurement area 430 within a sensing slot may span a time duration of at least 4 microseconds. The wireless node may maintain a counter initially set to N when performing a type1 channel sensing procedure and may reduce the counter by one for each sensing slot that the wireless node senses to be idle. For example, the wireless node may measure an energy of the channel during the measurement area 430 in a sensing slot and reduce the counter by one if the measured energy satisfies an ED threshold. In examples in which the measured energy fails to satisfy the ED threshold, the wireless node may determine that the sensing slot is busy and hold the counter at its existing value, wait another defer period 410 after the sensing slot that was determined to be busy, and continue the channel sensing procedure in sensing slots after the defer period 410. In such examples, the wireless node may continue reducing the counter by one for each sensing slot that is measured to be idle and waiting other defer periods 410 if other sensing slots are measured to be busy before the counter reaches zero.

Once the counter at the wireless node reaches zero, the wireless node will have sensed a total of N sensing slots to be idle and, in some examples, completed the type1 channel sensing procedure and may transmit at the next scheduled or allocated transmission occasion. In examples in which the counter reaches zero before the next scheduled or allocated transmission occasion (for example, if there is a time gap between the $N^{th}$ idle sensing slot and the next scheduled or allocated transmission occasion), the behavior of the wireless node may vary. In some examples, the wireless node may hold the counter value at zero and perform channel sensing in a sensing slot prior (such as immediately prior, so that the sensing slot is aligned with the beginning of the scheduled or allocated transmission occasion) to the next scheduled or allocated transmission occasion and may transmit at the scheduled or allocated occasion if the sensing slot is sensed to be idle. In some other examples, the wireless node may keep sensing the channel after the counter reaches zero and may decrease the value of the counter past zero (to negative values) for each idle slot sensed. In such examples, the wireless node may transmit at the scheduled or allocated occasion if the counter value is less than or equal to zero. If the wireless device senses a slot to be busy when the counter is at zero, the wireless node may restart the type1 channel sensing procedure (for example, with a newly generated random number N for the counter).

In examples in which the wireless node is an example of an IAB node and measures an energy of the channel that satisfies an ED threshold of a first channel sensing procedure in a total of N sensing slots (such that the counter is less than or equal to zero), the IAB node may initiate a COT 425-a and transmit via he MT role or the DU role, or both. In some examples, a type1 channel sensing procedure may be used by the wireless node (for example, the IAB node), a parent node, a child node, a UE 115, or a base station 105 to initiate a COT 425-a. A duration of the COT 425-a initiated for transmissions via the MT role or the DU role, or both, of the wireless node may be less than or equal to a maximum COT associated with the priority class of the transmissions (the traffic) from the wireless node. The priority class may be equivalently referred to as a channel access priority class (CAPC), may be denoted by the symbol p, and may be described with reference to Table 1.

TABLE 1

| CAPC (p) | $m_p$ | $CW_{min,p}$ | $CW_{max,p}$ | $T_{mcot,p}$ | Allowed $CW_p$ Sizes |
|---|---|---|---|---|---|
| 1 | 1 | 3 | 7 | 2 ms | {3, 7} |
| 2 | 1 | 7 | 15 | 3 ms | {7, 15} |
| 3 | 3 | 15 | 63 | 8 or 10 ms | {15, 31, 63} |
| 4 | 7 | 15 | 1023 | 8 or 10 ms | {15, 31, 63, 127, 255, 511, 1023} |

Table 1 shows examples of various parameters that may be associated with the CAPC for a type1 channel sensing procedure for a downlink or an uplink transmission. As shown by Table 1, the wireless node may use different parameters in accordance with the class of the traffic via the MT role or the DU role to determine the configuration of a type1 channel sensing procedure. For example, the wireless node may use the parameters $CW_{min,p}$ and $CW_{max,p}$ to select a lower limit and an upper limit, respectively, of a contention window (CW) that the wireless node may use for performing a type1 channel sensing procedure. The CW may include a list of values, as shown by the $CW_p$ Sizes column, from which the wireless node may select (for example, randomly select) a value to set as the counter. For example, the wireless node may select, calculate, or determine N as a result of randomly selecting (via a random number generator) a value from $CW_p$ Sizes. The wireless node may use the parameter $T_{mcot,p}$ to select or determine how long the wireless node may hold a COT after or as a result of passing the type1 channel sensing procedure.

The channel sensing configurations 401 and 402 illustrate examples of type2 channel sensing procedures that a wireless node may implement to gain access and to initiate a COT 425 (for example, in an NR-U shared spectrum). For example, the channel sensing configuration 401 may illustrate an example of a type2A channel sensing procedure, which may be equivalently referred to as a type2A channel access procedure, and the channel sensing configuration 402 may illustrate an example of a type2B channel sensing procedure, which may be equivalently referred to as a typ2B channel access procedure. In some examples, a type2 channel sensing procedure may be used by the wireless node, a parent node, or a base station 105 to initiate a COT 425 for transmissions of discovery signals. Additionally, or alternatively, a type2 channel sensing procedure may be used by the wireless node, a parent node, a child node, a base station 105, or a UE 115 to send transmissions after a time gap within a previously initiated COT 425 or a shared COT 425. In such examples, the wireless node, the parent node, the child node, the base station 105, or the UE 115 may perform a relatively lower-latency channel sensing procedure (as compared to a type1 channel sensing procedure) to access a channel within a previously initiated COT 425. The parameter ULtoDL-CO-SharingED-Threshold-r16 may indicate the upper limit ED threshold (the maximum ED threshold) that may be used to allow a wireless node-initiated or a UE-initiated COT to be shared with a parent wireless node or a base station 105. The parameter ULtoDL-CO-SharingED-Threshold-r16 may be configured by a parent wireless node or a base station 105 in accordance with the transmission power (for example, the maximum transmission power) of the wireless node, the parent wireless node, or the base station 105.

A type2A channel sensing procedure, as illustrated in the channel sensing configuration 401, may enable the wireless node to transmit signaling as a result of sensing a channel to be idle (for example, as a result of calculating or determining that a measured energy satisfies an ED threshold) for a deterministic time period. For example, the channel sensing configuration 401 may illustrate a channel sensing procedure having a duration of 25 microseconds. Such a channel sensing procedure may be used by the wireless node in examples in which a time gap between switching from downlink to uplink is greater than or equal to 25 microseconds and when a gap between switching from uplink to downlink is equal to 25 microseconds.

The channel sensing configuration 401 may use two sensing slots 440 including a sensing slot 440-a at the beginning of the channel sensing configuration 401 and a sensing slot 440-b at the end of the channel sensing configuration 401. Each sensing slot 440 may include a measurement area 435 during which the wireless node may measure an energy of the channel. For example, the sensing slot 440-a may include a measurement area 435-a and the sensing slot 440-b may include a measurement area 435-b, and the wireless node may perform the type2A channel sensing procedure by measuring an energy of the channel during the measurement area 435-a and the measurement area 435-b. In examples in which the measured energy satisfies an ED threshold of a channel sensing procedure in both the measurement area 435-a and the measurement area 435-b, the wireless node may determine that the channel is idle (for example, available) and may initiate a COT 425-b. In some examples, the sensing slot 440-a and the sensing slot 440-b may span time durations equal to the basic sensing unit of time, which may be equal to 9 microseconds, and the measurement area 435-a and the measurement area 435-b may span time durations equal to 4 microseconds.

A type2B channel sensing procedure, as illustrated in the channel sensing configuration 402, may enable the wireless node to transmit signaling as a result of sensing a channel to be idle (for example, as a result of calculating or determining that a measured energy satisfies an ED threshold) for a deterministic time period. For example, the channel sensing configuration 402 may illustrate a channel sensing procedure having a duration of 16 microseconds. Such a channel sensing procedure may be used by the wireless node in examples in which a time gap between switching from downlink to uplink, switching from uplink to uplink, switching from uplink to downlink, or switching from downlink to downlink is equal to 16 microseconds.

The channel sensing configuration 402 may include one sensing slot 450 at the end of the channel sensing configuration 402 and a measurement area 445. In some examples, the sensing slot 450 may include at least a first portion of the measurement area 445 equal to a time duration of 455, while a second portion of the measurement area 445 may, in some implementations, be outside of the sensing slot 450. For example, the sensing slot 450 may span a time duration equal to the basic sensing unit of time, which may be equal to 9 microseconds, and may include at least 4 microseconds of the measurement area 445 (for example, the time duration 455 may equal at least 4 microseconds). In some examples, the measurement area 445 may span a time duration equal to 5 microseconds. The wireless node may measure an energy of the channel during the measurement area 445 that is included within the sensing slot 450 as a result of performing the type2B channel sensing procedure and initiate a COT 425-c if whether the measured energy satisfies an ED threshold of a channel sensing procedure. In examples in which the measured energy satisfies the ED threshold, the wireless node may initiate the COT 425-c.

In some examples, the wireless node may perform a type2C channel sensing procedure, which may be equivalently referred to as a type2C channel access procedure, and may refrain from performing any channel sensing prior to transmitting any transmissions via either the MT role or the DU role, or both, in examples in which the wireless node is an IAB node. The IAB node may perform a type2C channel sensing procedure in examples in which a time gap between switching from downlink to uplink, switching from uplink to uplink, switching from uplink to downlink, or switching from downlink to downlink is less or equal to 16 microseconds and the transmissions via either the MT role or the DU role, or both, are less than a threshold time duration (for example, less than 584 microseconds).

In examples in which the wireless node performs a type1, a type2A, or a type2B channel sensing procedure, the wireless node may measure an energy of a channel in at least one sensing slot including a measurement area prior to transmitting. For example, type1, type2A, and type2B channel sensing procedures may include different numbers of sensing slots or span different total durations, but the last sensing slot (for example, the sensing slot latest in time or the sensing slot that is aligned with the COT 425) of each type of channel sensing procedure may be common across the three types of channel sensing procedures. For instance, the sensing slot that is aligned with the COT 425 for each type of channel sensing procedure may be a sensing slot of 9 microseconds and include at least four microseconds of a measurement area during which the wireless node may sense the channel. Such final sensing slots that are common to the three types of channel sensing procedures also may include a time gap T1 between the measurement area of the sensing slot and the beginning of the COT 425. In some examples, the time gap T1 may be a time gap to provide node processing time and may include sufficient time for the wireless node to switch from sensing to transmitting.

In some implementations, the wireless node may select or determine a timing of the separate channel sensing procedures (which may include any combination of a type1, a type2A, or a type2B channel sensing procedure) in accordance with the sensing capability and the duplexing capability of the wireless node. Additional details relating to the timing of the separate channel sensing procedures are described herein, for example, with reference to FIG. 5.

FIG. 5 illustrates example communications timelines 500, 501, 502, 503, and 504 that support channel sensing procedures for communications at an IAB node. In some examples, the communications timelines 500, 501, 502, 503, and 504 may implement aspects of the wireless communications system 100 or the IAB network 200. In some implementations, an IAB node 530, which may be an example of corresponding devices as described with reference to FIGS. 1-4, may perform separate channel sensing procedures to initiate a COT for transmissions via the MT role and the DU role of the IAB node.

The IAB node 530 may support various timing options for transmitting via the MT role and the DU role of the IAB node 530. In some examples, an IAB network including the IAB node 530 may support a baseline timing option in which transmissions via the DU role of IAB nodes 530 in the IAB network are aligned in time and in which transmissions via the MT role of IAB nodes 530 within the IAB network are controlled by the DU role of a parent node. For example, the DU role of a parent node may control transmissions via the MT role of a child node using a timing advance (TA) framework. In examples in which the IAB node 530 uses baseline timing, a transmission via the MT role of the IAB node 530 (which may be referred to as an MT transmission 505) may be offset in time from a transmission via the DU role of the IAB node 530 (which may be referred to as a DU transmission 510).

In some implementations, aligned MT transmissions 505 and DU transmissions 510 may experience reduced self-interference. For example, aligned transmissions may reduce the interference that a transmission via one wireless role may cause during a channel sensing procedure at another wireless role. As such, the IAB node 530 may use aligned MT transmissions 505 and DU transmissions 510 in examples in which an MT transmission 505 is likely to interfere with a DU transmission 510 and, alternatively, the IAB node 530 may use baseline timing (in which an MT transmission 505 may be offset in time from a DU transmission 510) in examples in which an MT transmission 505 is unlikely to interfere with a DU transmission 510. For example, the IAB node 530 may use baseline timing in examples in which the IAB node 530 transmits an MT transmission 505 and a DU transmission 510 using separate antenna panels that are sufficiently isolated from each other.

As shown in the communications timeline 500, an IAB node 530-a may be scheduled to transmit an MT transmission 505-a and a DU transmission 510-a and may use a baseline timing option. As such, the MT transmission 505-a may be offset in time from the DU transmission 510-a. For example, the MT transmission 505-a may precede the DU transmission 510-a by a time gap T3, which may be calculated or determined using the TA of the IAB node 530-a and a T_delta parameter. For instance, T3 may be defined as T3=TA/2+T_delta.

In some examples, the MT transmission 505-a may be associated with a sensing slot 515-a during which the IAB node 530-a may perform a first channel sensing procedure and the DU transmission 510-a may be associated with a sensing slot 520-a during which the IAB node 530-a may perform a second channel sensing procedure. The sensing slot 515-a and the sensing slot 520-a may be examples of a last sensing slot (for example, the sensing slot latest in time or the sensing slot aligned with the beginning of a COT) of a type1, a type2A, or a type2B channel sensing procedure, as described in more detail with reference to FIG. 4. The sensing slot 515-a and the sensing slot 520-a may each include measurement areas 535 during which the IAB node 530-a may measure an energy of the channel.

In some implementations, the IAB node 530-a may be capable of simultaneously transmitting the MT transmission 505-a and the DU transmission 510-a and may either have a sensing capability or may have been configured such that the IAB node 530-a may perform a channel sensing procedure while simultaneously transmitting. For example, the IAB node 530-a may be capable of performing the second channel sensing during a measurement area 535 of the sensing slot 520-a that overlaps in time with the MT transmission 505-a. In such examples, the IAB node 530-a may determine the timing of the sensing slot 515-a for performing the first channel sensing procedure as a result of aligning the sensing slot 515-a with the MT transmission 505-a and the IAB node 530-a may determine the timing of the sensing slot 520-a for performing the second channel sensing procedure as a result of aligning the sensing slot 520-a with the DU transmission 510-a.

In some implementations, the IAB node 530-a may be capable of performing the second channel sensing procedure while transmitting the MT transmission 505-a by applying a signal processing technique to the sensing slot 520-a when the IAB node 530-a is transmitting the MT transmission 505-a. In some examples, the signal processing technique may cancel or reduce the interference experienced while performing the second channel sensing procedure while simultaneously transmitting the MT transmission 505-a. In some other implementations, the IAB node 530-a may be capable of performing the second channel sensing procedure while transmitting the MT transmission 505-a as a result of measuring or otherwise determining that the IAB node 530-a satisfies an interference metric. For example, the IAB node 530-a may measure or determine that the antenna panel used by the MT role may be sufficiently isolated by time separation, frequency separation, or spatial separation, or any combination thereof, from the antenna panel used by the DU role.

As shown in the communications timeline 501, an IAB node 530-b may be scheduled to transmit an MT transmission 505-b and a DU transmission 510-b and may use a baseline timing option. As such, the MT transmission 505-b may be offset in time from the DU transmission 510-b. For example, the MT transmission 505-b may precede the DU transmission 510-b by a time gap T3. In some examples, the MT transmission 505-b may be associated with a sensing slot 515-b during which the IAB node 530-b may perform a first channel sensing procedure and the DU transmission 510-b may be associated with a sensing slot 520-b during which the IAB node 530-b may perform a second channel sensing procedure. The sensing slot 515-b and the sensing slot 520-b may be examples of a last sensing slot (for example, the sensing slot latest in time or the sensing slot aligned with the beginning of a COT) of a type1, a type2A, or a type2B channel sensing procedure, as described in more detail with reference to FIG. 4. The sensing slot 515-*b* and the sensing slot 520-*b* may each include measurement areas 535 during which the IAB node 530-*b* may measure an energy of the channel.

In some implementations, the IAB node 530-*b* may be capable of simultaneously transmitting the MT transmission 505-*b* and the DU transmission 510-*b* and may either have a sensing capability or may have been configured such that the IAB node 530-*b* may avoid performing a channel sensing procedure while simultaneously transmitting. For example, the IAB node 530-*b* may be incapable of performing the second channel sensing during a measurement area 535 of the sensing slot 520-*b* that overlaps in time with the MT transmission 505-*b*. As such, the IAB node 530-*b* may offset the sensing slot 520-*b* from the DU transmission 510-*b* by a gap 525 (for example, a time gap) such that the measurement area 535 of the sensing slot 520-*b* does not overlap in time with the MT transmission 505-*b*. Accordingly, the IAB node 530-*b* may select, configure, or otherwise determine a timing of the sensing slot 515-*b* for performing the first channel sensing procedure as a result of aligning the sensing slot 515-*b* with the MT transmission 505-*b* and the IAB node 530-*b* may select, configure, or otherwise determine a timing of the sensing slot 520-*b* for performing the second channel sensing procedure in accordance with the DU transmission 510-*b* and the gap 525 such that the sensing slot 520-*b* is offset from the DU transmission 510-*b*.

In some examples, the IAB node 530-*b* may select or determine to offset the sensing slot 520-*b* from the DU transmission 510-*b* as a result of measuring or otherwise determining that the IAB node 530-*b* fails to satisfy an interference metric. For example, the IAB node 530-*b* may measure or determine that the antenna panel used by the MT role and the antenna panel used by the DU role are not sufficiently isolated and that transmissions from one of the MT role or the DU role may cause interference at the other wireless role. In some implementations, the IAB node 530-*b* may select or determine to offset the sensing slot 520-*b* from the DU transmission 510-*b* if T3 is less than or equal to a threshold.

As shown in the communications timeline 502, an IAB node 530-*c* may be scheduled to transmit an MT transmission 505-*c* and a DU transmission 510-*c* and may use a baseline timing option. As such, the MT transmission 505-*c* may be offset in time from the DU transmission 510-*c*. For example, the MT transmission 505-*c* may precede the DU transmission 510-*c* by a time gap T3. In some examples, the MT transmission 505-*c* may be associated with a sensing slot 515-*c* during which the IAB node 530-*c* may perform a first channel sensing procedure and the DU transmission 510-*c* may not be associated with a sensing slot 520-*c* during which the IAB node 530-*c* may perform a second channel sensing procedure. For example, the IAB node 530-*c* may perform the first channel sensing procedure during the sensing slot 515-*c* and may refrain from performing the second channel sensing procedure during a sensing slot 520-*c* (for example, the sensing slot 520-*c* may be empty of a channel sensing procedure). In some implementations, the IAB node 530-*c* may refrain from performing the second channel sensing procedure for the DU transmission 510-*c* if T3 is less than a threshold time duration or if the DU transmission 510-*c* spans less than a threshold time duration (for example, less than 584 microseconds), or both.

The sensing slot 515-*c* may be an example of a last sensing slot (for example, the sensing slot latest in time or the sensing slot aligned with the beginning of a COT) of a type1, a type2A, or a type2B channel sensing procedure, as described in more detail with reference to FIG. 4, and the empty sensing slot 520-*c* may be an example of a sensing slot of a type2C channel sensing procedure. The sensing slot 515-*c* may include a measurement area 535 during which the IAB node 530-*c* may measure an energy of the channel.

As shown in the communications timeline 503, an IAB node 530-*d* may be scheduled to transmit an MT transmission 505-*d* and a DU transmission 510-*d* and may use a baseline timing option. As such, the MT transmission 505-*d* may be offset in time from the DU transmission 510-*d*. For example, the MT transmission 505-*d* may precede the DU transmission 510-*d* by a time gap T3. In some examples, the MT transmission 505-*d* may be associated with a sensing slot 515-*d* during which the IAB node 530-*d* may perform a first channel sensing procedure and the DU transmission 510-*d* may be associated with a sensing slot 520-*d* during which the IAB node 530-*d* may perform a second channel sensing procedure. The sensing slot 515-*d* and the sensing slot 520-*d* may be examples of a last sensing slot (for example, the sensing slot latest in time or the sensing slot aligned with the beginning of a COT) of a type2A or a type2B channel sensing procedure, as described in more detail with reference to FIG. 4. The sensing slot 515-*d* and the sensing slot 520-*d* may each include measurement areas 535 during which the IAB node 530-*d* may measure an energy of the channel.

In some implementations, the IAB node 530-*d* may adjust the timing of the measurement area 535 within a sensing slot in addition, or as an alternative, to adjusting the timing of the sensing slot. For example, the IAB node 530-*d* may modify the measurement area 535 within the sensing slot 520-*d* such that the IAB node 530-*d* may perform the second channel sensing procedure during the measurement area 535 of the sensing slot 520-*d* without interference from the MT transmission 505-*d* and without changing the alignment of the sensing slot 520-*d* with the DU transmission 510-*d*. In some examples, the IAB node 530-*d* may adjust the measurement area 535 within the sensing slot 520-*d* such that less than 4 microseconds of the measurement area 535 is within the sensing slot 520-*d*. Such an adjustment to the measurement area 535 within a sensing slot 520 may be applicable for type2A and type2B channel sensing procedures.

As shown in the communications timeline 503, an IAB node 530-*e* may be scheduled to transmit an MT transmission 505-*e* and a DU transmission 510-*e* and may use a baseline timing option. As such, the MT transmission 505-*e* may be offset in time from the DU transmission 510-*e*. For example, the MT transmission 505-*e* may precede the DU transmission 510-*e* by a time gap T3. In some examples, the MT transmission 505-*e* may be associated with a sensing slot 515-*e* during which the IAB node 530-*e* may perform a first channel sensing procedure and the DU transmission 510-*e* may be associated with a sensing slot 520-*e* during which the IAB node 530-*e* may perform a second channel sensing procedure. The sensing slot 515-*e* and the sensing slot 520-*e* may be examples of a last sensing slot (for example, the sensing slot latest in time or the sensing slot aligned with the beginning of a COT) of a type2B channel sensing procedure, as described in more detail with reference to FIG. 4. The sensing slot 515-*e* and the sensing slot 520-*e* may each include measurement areas 535 during which the IAB node 530-*d* may measure an energy of the channel.

In similarity to communications timeline 503, the communications timeline 504 also illustrates implementations in which the IAB node 530-*e* may adjust the timing of the measurement area 535 within a sensing slot in addition, or as an alternative, to adjusting the timing of the sensing slot. For example, the IAB node 530-*e* may modify the measurement area 535 within the sensing slot 520-*e* such that the IAB node 530-*e* may perform the second channel sensing procedure during the measurement area 535 of the sensing slot 520-*e* without interference from the MT transmission 505-*e* and without changing the alignment of the sensing slot 520-*d* with the DU transmission 510-*e*. In some examples, the IAB node 530-*e* may adjust the measurement area 535 within the sensing slot 520-*e* such that less than 4 microseconds of the measurement area 535 is within the sensing slot 520-*e*. In such examples, the sensing slot 515-*e* may include a first portion of the measurement area 535 that spans a time duration greater than or equal to 4 microseconds and the sensing slot 520-*e* may include a second portion of the measurement area 535 in a sensing window that is less than 4 microseconds. In some implementations, the IAB node 530-*e* may adjust the measurement area 535 within the sensing slot 520-*e* to be less than 4 microseconds if T3 is less than a threshold time duration or if the DU transmission 510-*e* spans less than a threshold time duration (for example, less than 584 microseconds). Such an adjustment to the measurement area 535 within a sensing slot may be applicable for type2B channel sensing procedures.

Upon performing the first channel sensing procedure and the second channel sensing procedure, the IAB node 530 may select or determine whether to transmit the MT transmission 505 or the DU transmission 510, or both, in accordance with a success of the first channel sensing procedure or the second channel sensing procedure, or both, and the duplexing capability of the IAB node 530. For example, in examples in which the first channel sensing procedure and the second channel sensing procedure are both successful, but the IAB node 530 is incapable of transmitting via multiple wireless roles simultaneously, the IAB node 530 may select one of the MT transmission 505 or the DU transmission 510 to transmit during an initiated COT and either transmit the remaining transmission after transmitting the selected transmission (within the same COT) or determine to initiate a new COT for the remaining transmission.

The first channel sensing procedure for the MT transmission 505 and the second channel sensing procedure for the DU transmission 510 may be implemented independently or in conjunction with each other. For example, in some implementations, the IAB node 530 may perform the first channel sensing procedure independently from the second channel sensing procedure and, as such, the IAB node may initiate a first COT for the MT transmission 505 and a second COT for the DU transmission 510. Such independent channel sensing procedures may be performed at different antenna panels of the IAB node 530 that are sufficiently isolated from each another. In some other implementations, the IAB node 530 may perform the first channel sensing procedure in conjunction with the second channel sensing procedure.

For example, the IAB node 530 may measure an ED value at a first antenna panel during a first channel sensing procedure, initiate a COT for an MT transmission 505 as a result of measuring or determining that the ED value satisfies a first ED threshold of the first channel sensing procedure, and share the initiated COT with a DU transmission 510 as a result of measuring or determining that the measured ED value also satisfies a second ED threshold of the second channel sensing procedure. The IAB node 530 may perform a similar process for performing the second channel sensing procedure at a second antenna panel, initiating a COT for a DU transmission 510 as a result of measuring or determining that a measured ED value satisfies the second ED threshold, and share the initiated COT with an MT transmission 505 as a result of measuring or determining that the measured ED value also satisfies the first ED threshold. In some examples, the ED threshold that the IAB node 530 may use to configure or determine whether a first wireless node is able to share a COT that was initiated for a second wireless node may be more strict (for example, a lower threshold value) than the ED threshold that the IAB node 530 may use if the channel sensing procedure was performed at the antenna panel used by the first wireless node.

Further, although the first channel sensing procedure is described as being for the MT transmission 505 and the second channel sensing procedure is described as being for the DU transmission 510, the first channel sensing procedure may additionally, or alternatively, be a channel sensing procedure that uses a first one or more receive beams (or sensing beams) that correspond to a first set of transmit beams that the IAB node 530 uses to transmit via the MT role of the IAB node 530. Similarly, the second channel sensing procedure may additionally, or alternatively, be a channel sensing procedure that uses a second one or more receive beams (or sensing beams) that correspond to a second set of transmit beams that the IAB node 530 uses to transmit via the DU role of the IAB node 530. As such, the separate channel sensing procedures may be viewed as either beam-specific or role-specific, or both, depending on the implementation.

Additionally, although illustrated in the communications timelines 500, 501, 502, 503, and 504 as using a baseline timing option, the described techniques are equally applicable to examples in which an aligned transmission timing option is used. For example, the IAB network including the IAB node 530 may support half-duplex (for example, SDM simultaneous transmission or SDM simultaneous reception) or full-duplex (for example, simultaneous transmission and reception) capabilities, which may support aligned transmissions or receptions, or both, via the MT role and the DU role of the IAB node 530. For instance, in examples in which the IAB node 530 uses aligned timing, an MT transmission 505 may be aligned in time with a DU transmission 510. In such examples, the IAB node 530 may select, configure, or otherwise determine a timing for the sensing slot 515 for performing the first channel sensing procedure and a timing for the sensing slot 520 for performing the second channel sensing procedure using the aligned transmission timing.

In some other examples, the IAB node 530 may align (for example, artificially align) an MT transmission 505 and a DU transmission 510 by adding a filler signal, such as an extended cyclic prefix (CP), to either the MT transmission 505 or the DU transmission 510 in accordance with which of the MT transmission 505 and the DU transmission 510 is scheduled for later transmission. In such examples, the IAB node 530 may select, configure, or otherwise determine a timing for a sensing slot 515 for performing the first channel sensing procedure and a timing for a sensing slot 520 for performing the second channel sensing procedure using the artificially aligned timing of the MT transmission 505 and the DU transmission 510. Additional details relating to the addition of a filler signal to one of the MT transmission 505 and the DU transmission 510 are described herein, for example, with reference to FIG. 6.

Figure 6:
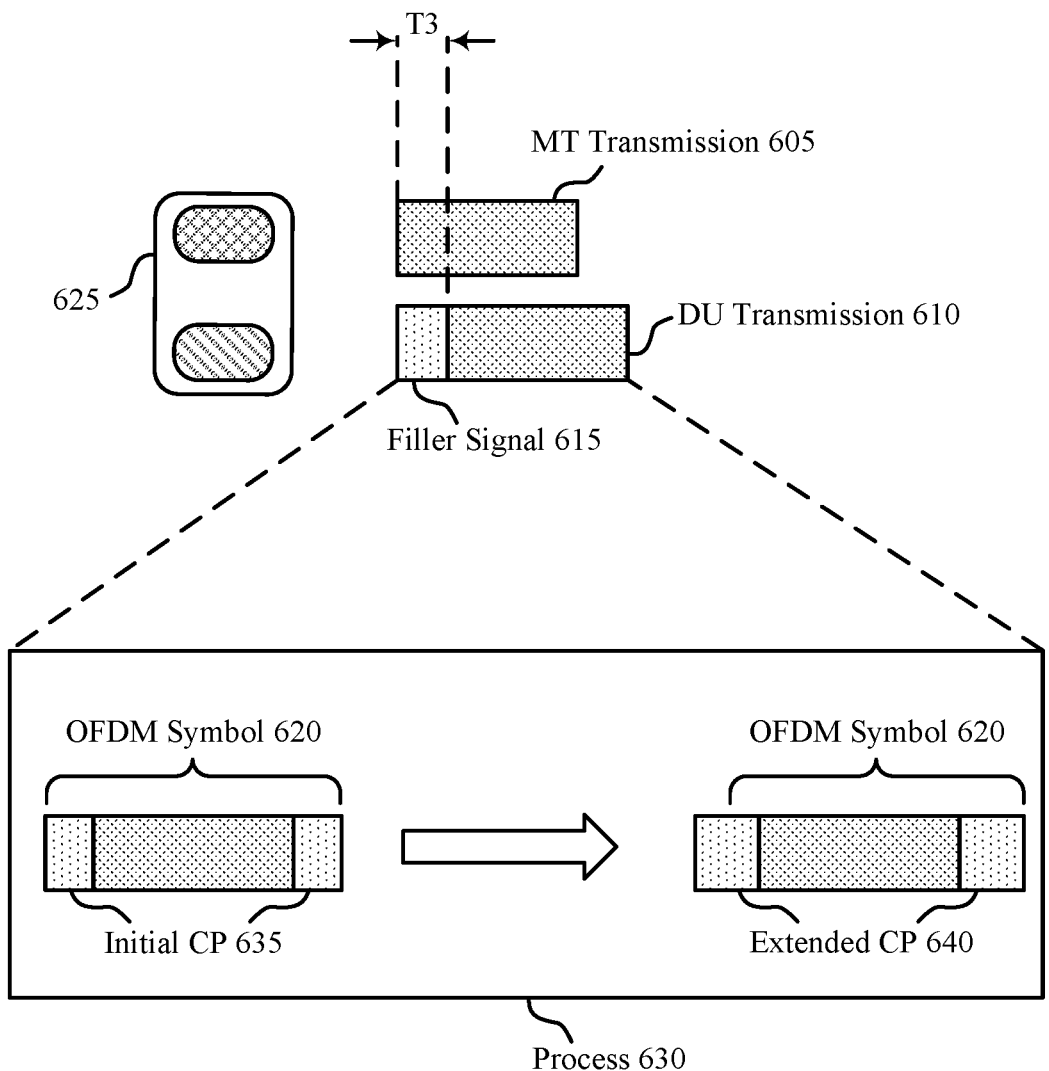
FIG. 6 illustrates an example alignment procedure that supports channel sensing procedures for communications at an IAB node.

FIG. 6 illustrates an example alignment procedure 600 that supports channel sensing procedures for communications at an IAB node. In some examples, the alignment procedure 600 may be implemented to realize aspects of the wireless communications system 100 or the IAB network 200. In some implementations, an IAB node 625, which may be an example of corresponding devices as described with reference to FIGS. 1-5, may use the alignment procedure 600 to artificially align an MT transmission 605 with a DU transmission 610 and may select, configure, or otherwise determine a timing for performing a first channel sensing procedure for the MT transmission 605 and a second channel sensing procedure for the DU transmission 610 in accordance with the artificially aligned transmission timing.

For example, the IAB node 625 may be scheduled to simultaneously transmit an MT transmission 605 and a DU transmission 610 and may use a baseline timing option. As such, the MT transmission 605 may be offset in time from the DU transmission 610. For example, the MT transmission 605 may precede the DU transmission 610 by a time gap T3, which may be determined using the TA of the IAB node 625 and a T_delta parameter. For instance, T3 may be defined as T3=TA/2+T_delta.

In some implementations, the IAB node 625 may completely or partially align the DU transmission 610 with the MT transmission 605 as a result of using a filler signal 615. For example, the IAB node 625 may add or otherwise apply the filler signal 615 to the DU transmission 610 to artificially align (in full or in part) the DU transmission 610 with the MT transmission 605. The filler signal 615 may be an example of any signaling, and in some examples the IAB node 625 may add the filler signal 615 to the DU transmission 610 by using an extended CP in a first OFDM symbol 620 during which the DU transmission 610 is transmitted. A process 630 illustrates an example process that the IAB node 625 may perform to increase (or extend) an initial CP 635 of the DU transmission 610 to an extended CP 640 that is added to the DU transmission 610. As illustrated in process 630, the addition or use of the extended CP 640 may increase the length of the DU transmission 610 such that the longer length DU transmission 610 may align with the MT transmission 605. In some examples, the OFDM symbol 620 may be the first symbol of the COT including the DU transmission 610.

In some examples, the IAB node 625 may report a capability of the IAB node to support the addition of a filler signal 615 (such as an extended CP 640) to DU transmissions 610. In some implementations, the IAB node 625 may signal a message to a parent IAB node or an IAB donor node (for example, a CU of an IAB donor node) including an indication of the capability of the IAB node 625 to support the addition of a filler signal 615. The IAB node 625 may transmit the message as an F1-AP message, an RRC message, or a MAC-CE. Additionally, or alternatively, the IAB node 625 may receive a message configuring the IAB node 625 to add a filler signal 615 to a first symbol of a DU transmission 610 from a parent IAB node or an IAB donor node (for example, a CU of an IAB donor node). The parent IAB node may transmit the message to the IAB node 625 as a MAC-CE or in DCI and the IAB donor node may transmit the message to the IAB node 625 as an F1-AP message or an RRC message.

Although the alignment procedure 600 is described in the context of adding a filler signal 615 to a DU transmission 610, the described techniques may be equally applicable in the context of adding a filler signal 615 to an MT transmission 605. For instance, in examples in which the DU transmission 610 is scheduled for transmission earlier than the MT transmission 605, the IAB node 625 may add a filler signal 615 to the first symbol of the MT transmission 605 to artificially align (in full or in part) the MT transmission 605 with the DU transmission 610.

Upon complete or partial alignment of the MT transmission 605 and the DU transmission 610, the IAB node 625 may select or determine a timing of a first sensing slot for performing the first channel sensing procedure and a timing of a second sensing slot for performing the second channel sensing procedure in accordance with the aligned (the artificially aligned) transmission timing of the MT transmission 605 and the DU transmission 610. In some examples in which the IAB node 625 adds a filler signal 615 to align the MT transmission 605 and the DU transmission 610, the IAB node 625 may align the first sensing slot for performing the first channel sensing procedure with the transmission timing of the MT transmission 605 and determine to align the second sensing slot for performing the second channel sensing procedure with the timing of the filler signal 615. As such, the IAB node 625 may perform the separate channel sensing procedures and, in examples in which the measured energies satisfy the ED thresholds, the IAB node 625 may initiate a COT for transmitting the MT transmission 605 and the DU transmission 610.

Figure 7:
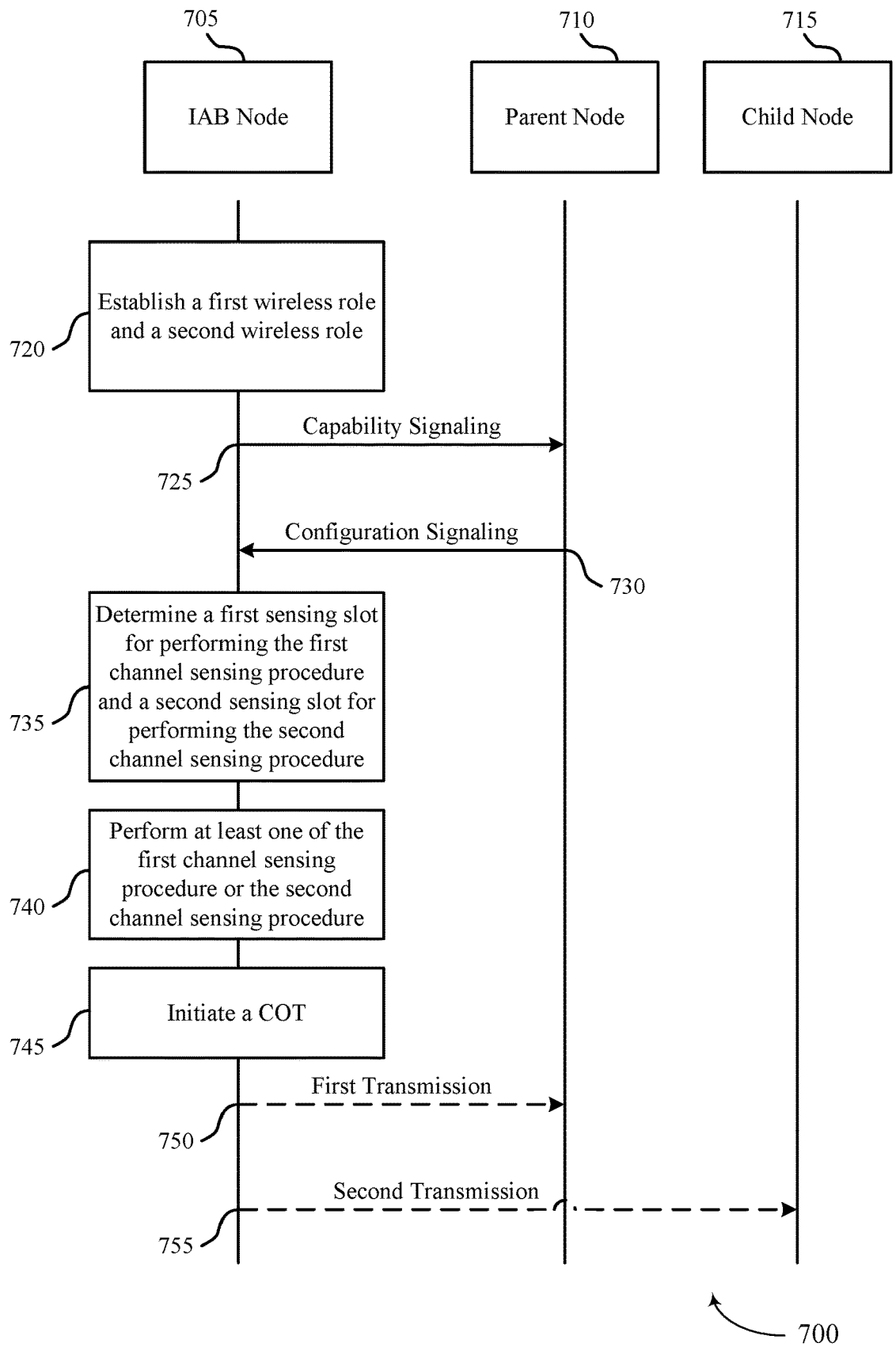
FIGS. 7 and 8 illustrate example process flows that support channel sensing procedures for communications at an IAB node.

FIG. 7 illustrates an example process flow 700 that supports channel sensing procedures for communications at an IAB node. In some examples, the process flow 700 may implement aspects of the wireless communications system 100 or the IAB network 200. The process flow 700 may illustrate communication between an IAB node 705, a parent node 710 (which may be an example of a parent IAB node or an IAB donor node), and a child node 715 (which may be an example of a child IAB node or a UE 115). The IAB node 705, the parent node 710, and the child node 715 may be examples of corresponding devices described with reference to FIGS. 1-6. In some examples, the IAB node 705 may perform separate channel sensing procedures for transmitting via an MT role and the DU role of the IAB node 705. Alternative examples of the following may be implemented, where some processes are performed in a different order than described or are not performed at all. In some implementations, processes may include additional features not mentioned below, or further processes may be added.

At 720, the IAB node 705 may establish a first wireless role and a second wireless role for the IAB node 705. The first wireless role of the IAB node 705 may be an MT role of the IAB node 705 and the second wireless role of the IAB node 705 be a DU role of the IAB node 705. In some examples, the IAB node 705 may use the first wireless role (the MT role) for upstream communications over a wireless backhaul link between the IAB node 705 and the parent node 710 and the IAB node 705 may use the second wireless role (the DU role) for downstream communications over an access link or a wireless backhaul link between the IAB node 705 and the child node 715. As described herein, the MT role and the DU role may be separate entities (for example, use different antenna panels) or may be the same entity (for example, share an antenna panel).

At 725, the IAB node 705 may transmit capability signaling to the parent node 710. In some examples, the capability signaling may include a sensing capability, a duplexing capability, a capability for adding a filler signal to transmissions via the MT role or the DU role of the IAB node 705, a capability of adding a gap or an offset between a sensing slot and a transmission, or any combination thereof. In examples in which the capability signaling includes a sensing capability, the capability signaling may include an indication that the IAB node 705 may perform separate channel sensing procedures for transmissions via the MT role and the DU role of the IAB node 705, an indication that the IAB node 705 may perform the common channel sensing procedure as multiple nodes (for example, using different antenna panels), an indication of whether the IAB node 705 may perform the common channel sensing procedure at one entity while transmitting from a different entity, an indication of whether the IAB node 705 may perform multiple channel sensing procedures at the same time, or any combination thereof. In examples in which the capability signaling includes a duplexing capability, the capability signaling may include an indication of whether the IAB node 705 has a TDM capability, an SDM simultaneous reception capability, an SDM simultaneous transmission capability, or a full-duplex capability. The IAB node 705 may transmit the sensing capability to the parent node 710 (at least one of a parent IAB node or a central unit of an IAB donor node) as one or more of an F1-AP message, an RRC message, or a MAC-CE.

At 730, the parent node 710 may transmit configuration signaling to the IAB node 705. For example, the IAB node 705 may receive a configuration for performing the first channel sensing procedure and the second channel sensing procedure at the IAB node 705. In some examples, the configuration for performing the channel sensing procedure may include an indication that the IAB node 705 is to perform separate channel sensing procedures for transmissions via the MT role and the DU role of the IAB node 705, an indication of which types (for example, type1, type2A, or type2B) of channel sensing procedures the IAB node 705 may perform, an indication of a timing of the separate channel sensing procedures (such as a shifting gap between a sensing slot and a transmission), an indication of one or more thresholds that the IAB node 705 may use to determine a timing of the separate channel sensing procedures, or any combination thereof. The IAB node 705 may receive the configuration as one or more of an F1-AP message or an RRC message (in examples in which the configuration is transmitted or output for transmission via a CU of an IAB donor node) or as one or more of a MAC-CE or in DCI (in examples in which the configuration is transmitted via a parent IAB node).

At 735, the IAB node 705 may select, configure, or otherwise determine a first sensing slot for performing the first channel sensing procedure and a second sensing slot for performing the second channel sensing procedure. In some examples, the first sensing slot is aligned with a first transmission timing of a first transmission and the second sensing slot is aligned with a second transmission timing of a second transmission (for example, as described with reference to communications timeline 500). In some other examples, the first sensing slot is aligned with the first transmission timing of the first transmission and the second sensing slot is offset (for example, by a time gap) from the second transmission timing of the second transmission in correlation with the transmission timing of the first transmission (for example, as described with reference to communications timeline 501). In some other examples, the first sensing slot is aligned with the first transmission timing of the first transmission and the IAB node 705 refrains from performing the second channel sensing procedure (for example, as described with reference to communications timeline 502).

In some other examples, the first sensing slot is aligned with the first transmission timing of the first transmission and the second sensing slot is aligned with the second transmission timing of the second transmission, and the first sensing slot may have a greater measurement area (a longer time duration of a measurement area) than the second sensing slot (for example, as described with reference to communications timeline 503). In some examples, the measurement area of the second sensing slot may be shifted farther into a sensing window (for example, farther away in time from the transmissions) of the second channel sensing procedure (for example, as described with reference to communications timeline 504).

At 740, the IAB node 705 may perform at least one of the first channel sensing procedure or the second channel sensing procedure at the IAB node 705. In some examples, the first channel sensing procedure is for the MT role and the second channel sensing procedure is for the DU role. In some implementations, the IAB node 705 may perform the first channel sensing procedure at a first antenna panel associated with the MT role and the IAB node 705 may perform the second channel sensing procedure at a second antenna panel associated with the DU role. The IAB node 705 may determine a success of the first channel sensing procedure as a result of measuring or determining that a first ED value measured at the first antenna panel satisfies a first value (for example, a first ED threshold) associated with the first channel sensing procedure and the IAB node 705 may determine a success of the second channel sensing procedure as a result of measuring or determining that a second ED value measured at the second antenna panel satisfies a second value (for example, a second ED threshold) associated with the second channel sensing procedure. In some implementations, the IAB node 705 may perform at least one of the first channel sensing procedure or the second channel sensing procedure using one or more sensing beams.

At 745, the IAB node 705 may initiate a COT at the IAB node 705 for the first wireless role (the MT role) in accordance with the first channel sensing procedure or for the second wireless role (the DU role) in accordance with the second channel sensing procedure. For example, the IAB node 705 may measure or determine that the channel is idle (available) as a result of performing the separate channel sensing procedures at 740 and may initiate the COT for transmissions from the IAB node 705 via the MT role or the DU role, or both. The IAB node 705 may initiate the COT for transmissions via one of the MT role or the DU role, may initiate the COT for transmissions via the MT role that may be shared with transmissions via the DU role, may initiate the COT for transmissions via the DU role that may be shared with transmissions via the MT role, or may initiate the COT for transmissions via both the MT role and the DU role (either for simultaneous transmissions via the MT and the DU role or transmissions from one of the MT role or the DU role followed by transmissions from the other).

At 750, the IAB node 705 may, in some implementations, transmit a first transmission via the MT role during the COT. In some examples, the IAB node 705 may transmit the first transmission via the MT role to the parent node 710. Additionally, or alternatively, at 755, the IAB node 705 may, in some implementations, transmit a second transmission via the DU role during the COT. In some examples, the IAB node 705 may transmit the second transmission via the DU role to the child node 715.

Figure 8:
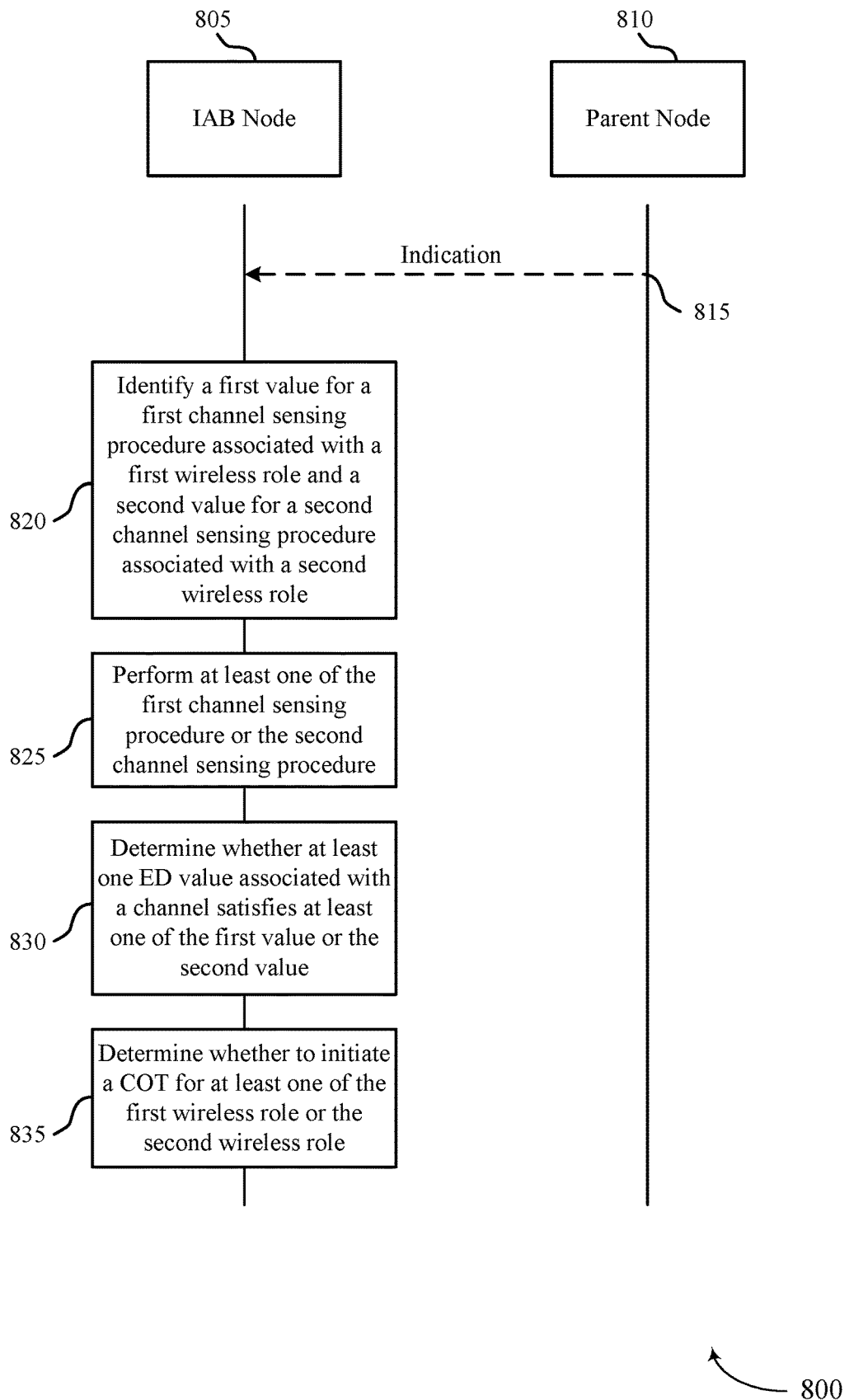

FIG. 8 illustrates an example process flow 800 that supports channel sensing procedures for communications at an IAB node. In some examples, the process flow 800 may implement aspects of the wireless communications system 100 or the IAB network 200. The process flow 800 may illustrate communication between an IAB node 805 and a parent node 810, which may be an example of a parent IAB node or an IAB donor node. The IAB node 805 and the parent node 810 (the parent IAB node or the IAB donor node) may be examples of corresponding devices described with reference to FIGS. 1-7. In some examples, the IAB node 805 may perform separate channel sensing procedures for transmitting via an MT role and a DU role of the IAB node 805. Alternative examples of the following may be implemented, where some processes are performed in a different order than described or are not performed at all. In some implementations, processes may include additional features not mentioned below, or further processes may be added.

At 815, the IAB node 805 may, in some implementations, receive an indication of a first value (for example, a first ED threshold value) and a second value (for example, a second ED threshold value) from the parent node 810. In some examples, the IAB node 805 may receive the indication of the first ED threshold and the second ED threshold as absolute values. For example, the IAB node 805 may receive a number of bits or a bit stream corresponding to an absolute value for each of the first ED threshold and the second ED threshold. In some other examples, the IAB node 805 may receive the indication of the first ED threshold and the second ED threshold as offset values relative to a default value and may determine the first ED threshold and the second ED threshold using the offset values and the default value. For example, the IAB node 805 may receive an indication of a first offset value relative to a default value, such as a default ED threshold, and may calculate or determine the first ED threshold as a result of adding, subtracting, or performing some other mathematical operation including the first offset value and the default value. The IAB node 805 may similarly calculate or determine the second ED threshold. In some other examples, the IAB node 805 may receive an indication of the first ED threshold and the second ED threshold as offset values relative to an indicated parameter and may calculate or determine the first ED threshold and the second ED threshold using the offset values and the indicated parameter. For example, the parent node 810 may indicate a parameter in addition to a first offset value, and the IAB node 805 may calculate or determine the first ED threshold as a result of adding, subtracting, or performing some other mathematical operation including the first offset value and the indicated parameter. The IAB node 805 may similarly calculate or determine the second ED threshold. In examples in which the IAB node 805 receives the indication of the first ED threshold and the second ED threshold from the parent node 810, the IAB node 805 may receive the indication as one or more of an F1 AP message, an RRC message, a MAC-CE, or in DCI.

At 820, the IAB node 805 may identify a first value (a first ED threshold) for a first channel sensing procedure associated with a first wireless role (an MT role) and a second value (a second ED threshold) for a second channel sensing procedure associated with a second wireless role (a DU role). In some examples, the IAB node 805 may select, calculate, or determine the first ED threshold and the second ED threshold in accordance with receiving the indication at 815. In some other examples, the IAB node 805 may determine the first ED threshold and the second ED threshold in accordance with a condition at the IAB node 805 or the configuration of the separate channel sensing procedures. For example, the IAB node 805 may determine the first ED threshold and the second ED threshold in accordance with whether the ED thresholds are for one or more of a threshold for a channel sensing procedure for an incoming transmission via the MT role, threshold for a channel sensing procedure for an incoming transmission via the DU role, a threshold that is used by the DU role of the IAB node 805 to share an initiated COT with a co-located MT, a threshold that is used by the MT role of the IAB node 805 to share an initiated COT with a co-located DU, separate thresholds associated with different sets of sensing beams, separate thresholds associated with different sets of beam pairs (for example, different unique pairs of a sensing beam and a transmit beam), or separate thresholds that are used for a wireless role in the presence of a transmission from another wireless role and in the absence of a transmission from another wireless role. In some examples, the first ED threshold may be different than the second ED threshold because the MT role and the DU role may have different maximum transmit powers or different beam patterns, or both.

At 825, the IAB node 805 may perform at least one of the first channel sensing procedure or the second channel sensing procedure. In some examples, the IAB node 805 may perform the first channel sensing procedure using a first set of sensing beams and may perform the second channel sensing procedure using a second set of sensing beams. In such examples, the IAB node 805 may use a first ED threshold associated with the first set of sensing beams and a second ED threshold associated with the second set of sensing beams. In some other examples, the IAB node 805 may perform the first channel sensing procedure using a first beam pair and may perform the second channel sensing procedure using a second beam pair. In such examples, the IAB node 805 may use a first ED threshold associated with the first beam pair and may use a second ED threshold associated with the second beam pair. In some other examples, the IAB node 805 may perform the first channel sensing procedure or the second channel sensing procedure, or both, during sensing slots that are absent of transmissions via other wireless roles of the IAB node 805. In such examples, the IAB node 805 may use a first ED threshold or a second ED threshold, or both, associated with the absence of transmissions via other wireless roles of the IAB node 805. In some other examples, the IAB node 805 may perform the first channel sensing procedure or the second channel sensing procedure, or both, during sensing slots in the presence of transmissions via other wireless roles of the IAB node 805. In such examples, the IAB node 805 may use a first ED threshold or a second ED threshold, or both, associated with the presence of transmissions via other wireless roles of the IAB node 805.

At 830, the IAB node measure or otherwise determine whether at least one ED value associated with a channel satisfies at least one of the first value (the first ED threshold) or the second value (the second ED threshold). In some examples, the IAB node 805 may measure or determine a first ED value as a result of the first channel sensing procedure and may compare the first ED value to the first ED threshold associated with the first channel sensing procedure to determine whether the first ED value satisfies (is less than or equal to) the first ED threshold. Similarly, the IAB node 805 may measure or determine a second ED value as a result of the second channel sensing procedure and may compare the second ED value to the second ED threshold associated with the second channel sensing procedure to determine whether the second ED value satisfies (is less than or equal to) the second ED threshold. The IAB node 805 may measure or determine the ED values as a result of measuring a channel during a measurement area of a sensing slot and the measured ED values may be associated or correlated with the set of sensing beams associated with the channel sensing procedure, the beam pair associated with the channel sensing procedure, the presence of transmissions via other wireless roles of the IAB node 805 during the channel sensing procedure, or any combination thereof.

At 835, the IAB node 805 may select, configure, or otherwise determine whether to initiate a COT for at least one of the first wireless role (the MT role) or the second wireless role (the DU role) based at least in part on measuring or determining whether the at least one ED value associated with the channel satisfies at least one of the first value (the first ED threshold) or the second value (the second ED threshold). In some examples, the IAB node 805 may initiate the COT for transmissions via the MT role if a first ED value satisfies the first ED threshold and may initiate the COT for transmissions via the DU role if the second ED value satisfies the second ED threshold. The IAB node 805 may initiate the COT for transmissions via one of the MT role or the DU role, may initiate the COT for transmissions via the MT role that may be shared with transmissions via the DU role, may initiate the COT for transmissions via the DU role that may be shared with transmissions via the MT role, or may initiate the COT for transmissions via both the MT role and the DU role (either for simultaneous transmissions via the MT and the DU role or transmissions from one of the MT role or the DU role followed by transmissions from the other).

Figure 9:
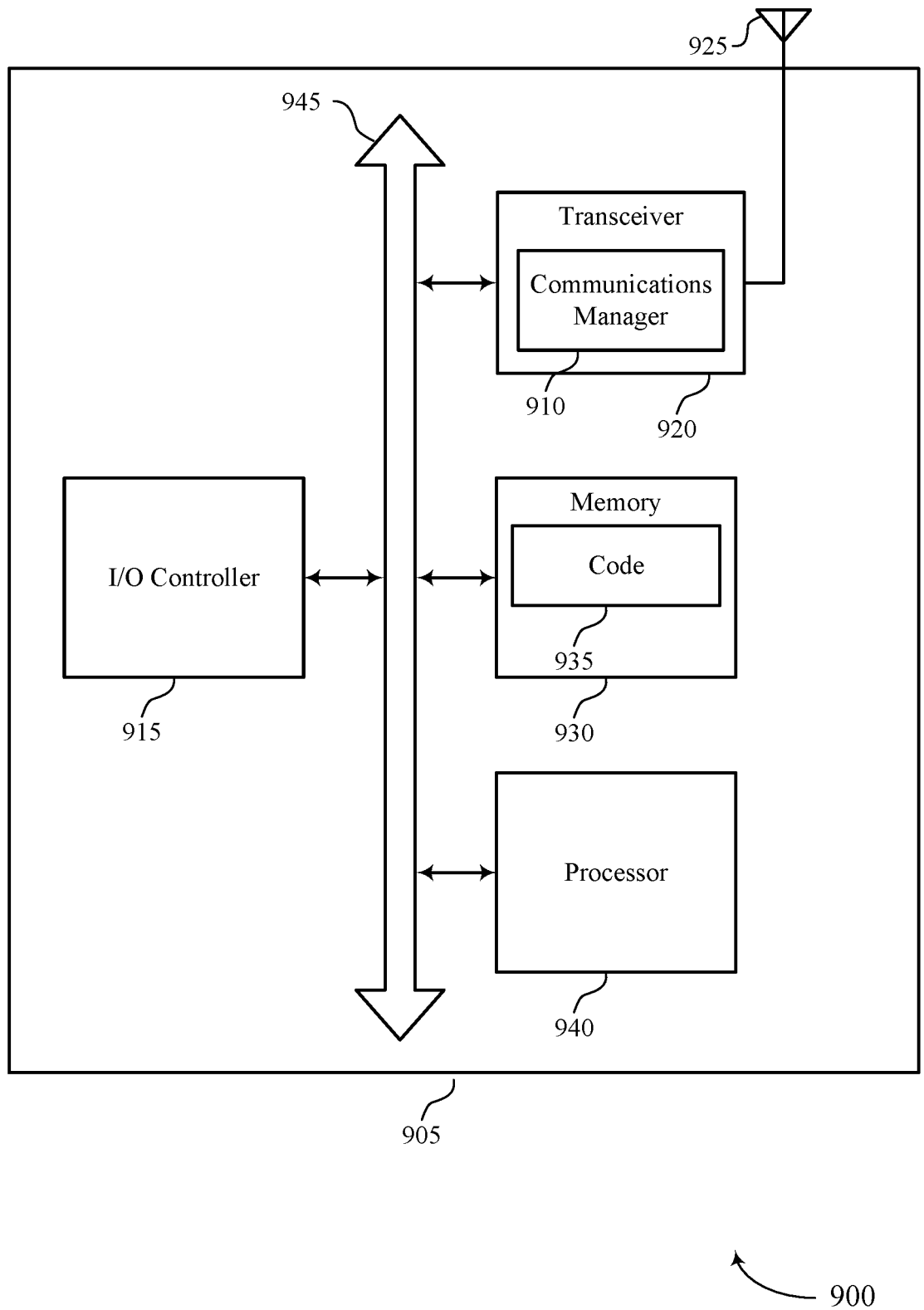
FIG. 9 shows a block diagram of an example device that supports channel sensing procedures for communications at an IAB node.

FIG. 9 shows a block diagram of an example device 905 that supports channel sensing procedures for communications at an IAB node. The device 905 may be an example of or include the components of an IAB node as described herein. In some examples, the device 905 may be an example or include the components of a wireless device or a wireless device apparatus as described herein. The device 905 may include components for bi-directional voice and data communications including components for transmitting and receiving communications, including a communications manager 910, an input/output (I/O) controller 915, a transceiver 920, an antenna 925, memory 930, a processor 940, and a coding manager 950. These components may be in electronic communication via one or more buses (for example, bus 945).

The I/O controller 915 may manage input and output signals for the device 905. The I/O controller 915 also may manage peripherals not integrated into the device 905. In some examples, the I/O controller 915 may represent a physical connection or port to an external peripheral. In some examples, the I/O controller 915 may utilize an operating system such as iOS®, ANDROID®, MS-DOS®, MS-WINDOWS®, OS/2®, UNIX®, LINUX®, or another known operating system. In some other examples, the I/O controller 915 may represent or interact with a modem, a keyboard, a mouse, a touchscreen, or a similar device. In some examples, the I/O controller 915 may be implemented as part of a processor. In some examples, a user may interact with the device 905 via the I/O controller 915 or via hardware components controlled by the I/O controller 915.

The transceiver 920 may communicate bi-directionally, via one or more antennas, wired, or wireless links as described throughout. For example, the transceiver 920 may represent a wireless transceiver and may communicate bi-directionally with another wireless transceiver. The transceiver 920 also may include a modem to modulate the packets and provide the modulated packets to the antennas for transmission, and to demodulate packets received from the antennas.

In some examples, the wireless device may include a single antenna 925. In such examples, the device 905 may use a single antenna 925 to communicate via both the first wireless role (for example, an MT role of the device 905) and the second wireless role (for example, a DU role of the device 905). However, in some examples the device may have more than one antenna 925, which may be capable of concurrently transmitting or receiving multiple wireless transmissions. In such examples, the device 905 may use a first antenna 925 to communicate via the first wireless role (for example, the MT role of the device 905) and may use a second antenna 925 to communicate via the second wireless role (for example, the DU role of the device 905).

The memory 930 may include random-access memory (RAM) and read-only memory (ROM). The memory 930 may store computer-readable, computer-executable code 935 including instructions that, when executed, cause the processor to perform various functions described herein. In some examples, the memory 930 may contain, among other things, a basic I/O system (BIOS) which may control basic hardware or software operation such as the interaction with peripheral components or devices.

The processor 940 may be any one or more suitable processors capable of executing scripts or instructions of one or more software programs stored in the device 905 (such as within the memory 930). In some implementations, the processor 940 may be a component of a processing system. A processing system may generally refer to a system or series of machines or components that receives inputs and processes the inputs to produce a set of outputs (which may be passed to other systems or components of, for example, the device 905). For example, a processing system of the device 905 may refer to a system including the various other components or subcomponents of the device 905.

The processing system of the device 905 may interface with other components of the device 905, and may process information received from other components (such as inputs or signals) or output information to other components. For example, a chip or modem of the device 905 may include a processing system, a first interface to output information, and a second interface to obtain information. In some implementations, the first interface may refer to an interface between the processing system of the chip or modem and a transmitter, such that the device 905 may transmit information output from the chip or modem. In some implementations, the second interface may refer to an interface between the processing system of the chip or modem and a receiver, such that the device 905 may obtain information or signal inputs, and the information may be passed to the processing system. A person having ordinary skill in the art will readily recognize that the first interface also may obtain information or signal inputs, and the second interface also may output information or signal outputs.

In some examples, the communications manager 910, if functioning as or in conjunction with processor or a processing system, may output signaling for transmission during the COT via at least one of the first wireless role or the second wireless role. For example, the communications manager 910 may output signaling to the transceiver 920 for transmission during the COT via at least one of the first wireless role or the second wireless role. Similarly, the communications manager 910 also may obtain signaling (for example, messages, indications, or any other signing that may be transmitted to the device 905) from the transceiver 920. For example, the communications manager 910 may obtain, from the transceiver 920, a configuration of separate channel sensing procedures or an indication of ED threshold, or both.

In some examples, the communications manager 910 may be implemented as an integrated circuit or chipset for a device modem, and the receiver and the transmitter may be implemented as analog components (for example, amplifiers, filters, antennas) coupled with the device modem to enable wireless transmission and reception over one or more bands.

The device 905 may support wireless communications at a wireless device apparatus in accordance with examples as disclosed herein. The communications manager 910 may be configured as or otherwise support a means for establishing a first wireless role and a second wireless role for the wireless device apparatus, where the first wireless role is associated with upstream communications, and the second wireless role is associated with downstream communications. In some examples, the communications manager 910 may be configured as or otherwise support a means for performing at least one of a first channel sensing procedure or a second channel sensing procedure at the wireless device apparatus, where the first channel sensing procedure is for the first wireless role and the second channel sensing procedure is for the second wireless role. In some examples, the communications manager 910 may be configured as or otherwise support a means for initiating a COT at the wireless device apparatus for the first wireless role based on the first channel sensing procedure or for the second wireless role based on the second channel sensing procedure, or both. In some examples, the communications manager 910 may be configured as or otherwise support a means for transmitting during the COT via at least one of the first wireless role or the second wireless role.

In some examples, to support performing at least one of the first channel sensing procedure or the second channel sensing procedure at the wireless device apparatus, the communications manager 910 may be configured as or otherwise support a means for performing the first channel sensing procedure at a first antenna panel associated with the first wireless role. In some examples, to support performing at least one of the first channel sensing procedure or the second channel sensing procedure at the wireless device apparatus, the communications manager 910 may be configured as or otherwise support a means for performing the second channel sensing procedure at a second antenna panel associated with the second wireless role.

In some examples, the communications manager 910 may be configured as or otherwise support a means for determining a success of the first channel sensing procedure based on a first ED value associated with the first antenna panel and a first value associated with the first channel sensing procedure, where the first ED value satisfies the first value. In some examples, the communications manager 910 may be configured as or otherwise support a means for determining a success of the second channel sensing procedure based on a second ED value associated with the second antenna panel and a second value associated with the second channel sensing procedure, where the second ED value satisfies the second value.

In some examples, to support performing at least one of the first channel sensing procedure or the second channel sensing procedure at the wireless device apparatus, the communications manager 910 may be configured as or otherwise support a means for performing the first channel sensing procedure and the second channel sensing procedure at an antenna panel of the wireless device apparatus associated with the first wireless role.

In some examples, the communications manager 910 may be configured as or otherwise support a means for determining a success of the first channel sensing procedure based on an ED value associated with the antenna panel and a first value associated with the first channel sensing procedure, where the ED value satisfies the first value. In some examples, the communications manager 910 may be configured as or otherwise support a means for determining a success of the second channel sensing procedure based on the ED value associated with the antenna panel and a second value associated with the second channel sensing procedure, where the ED value satisfies the second value.

In some examples, to support performing at least one of the first channel sensing procedure or the second channel sensing procedure at the wireless device apparatus, the communications manager 910 may be configured as or otherwise support a means for performing the first channel sensing procedure and the second channel sensing procedure at an antenna panel of the wireless device apparatus associated with the second wireless role.

In some examples, the communications manager 910 may be configured as or otherwise support a means for determining a success of the first channel sensing procedure based on an ED value associated with the antenna panel and a first value associated with the first channel sensing procedure, where the ED value satisfies the first value. In some examples, the communications manager 910 may be configured as or otherwise support a means for determining a success of the second channel sensing procedure based on the ED value associated with the antenna panel and a second value associated with the second channel sensing procedure, where the ED value satisfies the second value.

In some examples, to support performing at least one of the first channel sensing procedure or the second channel sensing procedure at the wireless device apparatus, the communications manager 910 may be configured as or otherwise support a means for determining one or more sensing beams associated with at least one of the first channel sensing procedure or the second channel sensing procedure. In some examples, to support performing at least one of the first channel sensing procedure or the second channel sensing procedure at the wireless device apparatus, the communications manager 910 may be configured as or otherwise support a means for performing at least one of the first channel sensing procedure or the second channel sensing procedure using the one or more sensing beams.

In some examples, to support transmitting, by the wireless device apparatus, via at least one of the first wireless role or the second wireless role during the COT, the communications manager 910 may be configured as or otherwise support a means for transmitting via the one or more transmit beams.

In some examples, the communications manager 910 may be configured as or otherwise support a means for transmitting, by the wireless device apparatus to a parent node or a central unit, a sensing capability, where performing the first channel sensing procedure for the first wireless role and the second channel sensing procedure for the second wireless role is based on the sensing capability.

In some examples, the sensing capability includes an indication that the wireless device apparatus performs the first channel sensing procedure for the first wireless role and the second channel sensing procedure for the second wireless role as multiple nodes. In some examples, the sensing capability includes an indication of whether the wireless device apparatus is capable of performing at least one of the first channel sensing procedure while transmitting via the second wireless role or the second channel sensing procedure while transmitting via the first wireless role. In some examples, the wireless device apparatus may transmit the sensing capability via an F1-AP message, an RRC message, or a MAC-CE.

In some examples, to support transmitting during the COT via at least one of the first wireless role or the second wireless role, the communications manager 910 may be configured as or otherwise support a means for determining a duplex capability of the wireless device apparatus, a success of the first channel sensing procedure, and a success of the second channel sensing procedure. In some examples, to support transmitting during the COT via at least one of the first wireless role or the second wireless role, the communications manager 910 may be configured as or otherwise support a means for determining whether to transmit at least one of a first transmission from the wireless device apparatus via the first wireless role or a second transmission from the wireless device apparatus via the second wireless role based on the duplex capability of the wireless device apparatus, the success of the first channel sensing procedure, and the success of the second channel sensing procedure.

In some examples, the communications manager 910 may be configured as or otherwise support a means for determining a first transmission timing of a first transmission from the wireless device apparatus via the first wireless role and a second transmission timing of a second transmission from the wireless device apparatus via the second wireless role. In some examples, the communications manager 910 may be configured as or otherwise support a means for determining a first sensing slot for performing the first channel sensing procedure and a second sensing slot for performing the second channel sensing procedure, where the first sensing slot is aligned with the first transmission timing of the first transmission and the second sensing slot is aligned with the second transmission timing of the second transmission.

In some examples, the communications manager 910 may be configured as or otherwise support a means for determining that the wireless device apparatus satisfies an interference metric. In some examples, to support determining that the wireless device apparatus satisfies the interference metric, the communications manager 910 may be configured as or otherwise support a means for applying a signal processing technique to at least one of the first sensing slot or the second sensing slot.

In some examples, to support performing at least one of the first channel sensing procedure or the second channel sensing procedure at the wireless device apparatus, the communications manager 910 may be configured as or otherwise support a means for performing the first channel sensing procedure during a first measurement area within the first sensing slot, where the first measurement area has a first time duration. In some examples, to support performing at least one of the first channel sensing procedure or the second channel sensing procedure at the wireless device apparatus, the communications manager 910 may be configured as or otherwise support a means for performing the second channel sensing procedure during a second measurement area within the second sensing slot, where the second measurement area has a second time duration less than the first time duration.

In some examples, the first time duration is equal to four microseconds and the second time duration is less than four microseconds. In some examples, the first measurement area and the second measurement area are aligned in time.

In some examples, to support performing at least one of the first channel sensing procedure or the second channel sensing procedure at the wireless device apparatus, the communications manager 910 may be configured as or otherwise support a means for performing the first channel sensing procedure during a first measurement area of a first sensing window, where the first sensing window includes the first sensing slot, and where the first sensing slot includes a first portion of the first measurement area. In some examples, to support performing at least one of the first channel sensing procedure or the second channel sensing procedure at the wireless device apparatus, the communications manager 910 may be configured as or otherwise support a means for performing the second channel sensing procedure during a second measurement area of a second sensing window, where the second sensing window includes the second sensing slot, and where the second sensing slot includes a second portion of the second measurement area, the second portion of the second measurement area including a smaller time duration than the first portion of the first measurement area.

In some examples, the first portion of the first measurement area includes at least four microseconds and the second portion of the second measurement area includes less than four microseconds. In some examples, the first sensing slot at least partially overlaps with the second sensing slot.

In some examples, the communications manager 910 may be configured as or otherwise support a means for determining a first transmission timing of a first transmission from the wireless device apparatus via the first wireless role and a second transmission timing of a second transmission from the wireless device apparatus via the second wireless role. In some examples, the communications manager 910 may be configured as or otherwise support a means for determining a first sensing slot for performing the first channel sensing procedure and a second sensing slot for performing the second channel sensing procedure, where the first sensing slot is aligned with the first transmission timing of the first transmission and the second sensing slot is offset from the second transmission timing of the second transmission based on the first transmission timing of the first transmission.

In some examples, the communications manager 910 may be configured as or otherwise support a means for determining that the wireless device apparatus fails to satisfy an interference metric, where the second sensing slot being offset from the second transmission timing of the second transmission based on the first transmission timing of the first transmission is based on determining that the wireless device apparatus fails to satisfy the interference metric.

In some examples, the first transmission timing of the first transmission is within a threshold time duration of the second transmission timing of the second transmission. In some examples, the first sensing slot and the second sensing slot avoid overlapping with either of the first transmission or the second transmission.

In some examples, the communications manager 910 may be configured as or otherwise support a means for determining a first transmission timing of a first transmission from the wireless device apparatus via the first wireless role and a second transmission timing of a second transmission from the wireless device apparatus via the second wireless role. In some examples, the communications manager 910 may be configured as or otherwise support a means for determining a first sensing slot for performing the first channel sensing procedure. In some examples, the communications manager 910 may be configured as or otherwise support a means for refraining from performing the second channel sensing procedure.

In some examples, the first transmission timing of the first transmission is within a threshold time duration of the second transmission timing of the second transmission. In some examples, the second transmission is less than a threshold time duration.

In some examples, the communications manager 910 may be configured as or otherwise support a means for determining a first transmission timing of a first transmission from the wireless device apparatus via the first wireless role and a second transmission timing of a second transmission from the wireless device apparatus via the second wireless role. In some examples, the communications manager 910 may be configured as or otherwise support a means for adding a filler signal to a beginning of the second transmission, where the first transmission timing precedes the second transmission timing by a time duration equal to a duration of the filler signal. In some examples, the communications manager 910 may be configured as or otherwise support a means for determining a first sensing slot for performing the first channel sensing procedure and a second sensing slot for performing the second channel sensing procedure, where the first sensing slot is aligned with the first transmission timing of the first transmission and the second sensing slot is aligned with the filler signal.

In some examples, the communications manager 910 may be configured as or otherwise support a means for receiving a configuration for performing the first channel sensing procedure and the second channel sensing procedure at the wireless device apparatus.

In some examples, the wireless device apparatus may receive the configuration via an F1-AP message, an RRC message, a MAC-CE, or DCI. In some examples, the wireless device apparatus is an IAB node and, in some examples, the first wireless role includes an MT role and the second wireless role includes a DU role.

Additionally, or alternatively, the device 905 may support wireless communications at a wireless device apparatus in accordance with examples as disclosed herein. In some examples, the communications manager 910 may be configured as or otherwise support a means for identifying a first value for a first channel sensing procedure associated with a first wireless role of the wireless device apparatus and a second value for a second channel sensing procedure associated with a second wireless role of the wireless device apparatus. In some examples, the communications manager 910 may be configured as or otherwise support a means for determining whether at least one ED value associated with a channel satisfies at least one of the first value or the second value. In some examples, the communications manager 910 may be configured as or otherwise support a means for determining whether to initiate a COT for at least one of the first wireless role or the second wireless role based on determining whether the at least one ED value associated with the channel satisfies at least one of the first value or the second value.

In some examples, to support determining whether the at least one ED value associated with the channel satisfies at least one of the first value or the second value, the communications manager 910 may be configured as or otherwise support a means for determining an ED value based on the first channel sensing procedure. In some examples, to support determining whether the at least one ED value associated with the channel satisfies at least one of the first value or the second value, the communications manager 910 may be configured as or otherwise support a means for determining whether the ED value satisfies the first value, where determining whether to initiate the COT for the first wireless role is based on determining whether the ED value satisfies the first value.

In some examples, to support determining whether the at least one ED value associated with the channel satisfies at least one of the first value or the second value, the communications manager 910 may be configured as or otherwise support a means for determining an ED value based on the second channel sensing procedure. In some examples, to support determining whether the at least one ED value associated with the channel satisfies at least one of the first value or the second value, the communications manager 910 may be configured as or otherwise support a means for determining whether the ED value satisfies the second value, where determining whether to initiate the COT for the second wireless role is based on determining whether the ED value satisfies the second value.

In some examples, the communications manager 910 may be configured as or otherwise support a means for determining an ED value based on the first channel sensing procedure. In some examples, the communications manager 910 may be configured as or otherwise support a means for determining that the ED value satisfies the first value. In some examples, the communications manager 910 may be configured as or otherwise support a means for initiating the COT for the first wireless role based on determining that the ED value satisfies the first value. In some examples, the communications manager 910 may be configured as or otherwise support a means for determining that the ED value satisfies the second value. In some examples, the communications manager 910 may be configured as or otherwise support a means for including, within the COT initiated for the first wireless role, one or more transmissions from the wireless device apparatus via the second wireless role based on determining that the ED value satisfies the second value.

In some examples, the communications manager 910 may be configured as or otherwise support a means for determining an ED value based on the second channel sensing procedure. In some examples, the communications manager 910 may be configured as or otherwise support a means for determining that the ED value satisfies the second value. In some examples, the communications manager 910 may be configured as or otherwise support a means for initiating the COT for the second wireless role based on determining that the ED value satisfies the second value. In some examples, the communications manager 910 may be configured as or otherwise support a means for determining that the ED value satisfies the first value. In some examples, the communications manager 910 may be configured as or otherwise support a means for including, within the COT initiated for the second wireless role, one or more transmissions from the wireless device apparatus via the first wireless role based on determining that the ED value satisfies the first value.

In some examples, to support determining whether the at least one ED value associated with the channel satisfies at least one of the first value or the second value, the communications manager 910 may be configured as or otherwise support a means for performing the first channel sensing procedure using a set of sensing beams. In some examples, to support determining whether the at least one ED value associated with the channel satisfies at least one of the first value or the second value, the communications manager 910 may be configured as or otherwise support a means for determining an ED value based on performing the first channel sensing procedure using the set of sensing beams. In some examples, to support determining whether the at least one ED value associated with the channel satisfies at least one of the first value or the second value, the communications manager 910 may be configured as or otherwise support a means for determining whether the ED value satisfies the first value, where the first value is for the first channel sensing procedure using the set of sensing beams.

In some examples, to support determining whether the at least one ED value associated with the channel satisfies at least one of the first value or the second value, the communications manager 910 may be configured as or otherwise support a means for performing the second channel sensing procedure using a set of sensing beams. In some examples, to support determining whether the at least one ED value associated with the channel satisfies at least one of the first value or the second value, the communications manager 910 may be configured as or otherwise support a means for determining an ED value based on performing the second channel sensing procedure using the set of sensing beams. In some examples, to support determining whether the at least one ED value associated with the channel satisfies at least one of the first value or the second value, the communications manager 910 may be configured as or otherwise support a means for determining whether the ED value satisfies the second value, where the second value is for the second channel sensing procedure using the set of sensing beams.

In some examples, to support determining whether the at least one ED value associated with the channel satisfies at least one of the first value or the second value, the communications manager 910 may be configured as or otherwise support a means for performing the first channel sensing procedure using a beam pair. In some examples, to support determining whether the at least one ED value associated with the channel satisfies at least one of the first value or the second value, the communications manager 910 may be configured as or otherwise support a means for determining an ED value based on performing the first channel sensing procedure using the beam pair. In some examples, to support determining whether the at least one ED value associated with the channel satisfies at least one of the first value or the second value, the communications manager 910 may be configured as or otherwise support a means for determining whether the ED value satisfies the first value, where the first value is for the first channel sensing procedure using the beam pair.

In some examples, to support determining whether the at least one ED value associated with the channel satisfies at least one of the first value or the second value, the communications manager 910 may be configured as or otherwise support a means for performing the second channel sensing procedure using a beam pair. In some examples, to support determining whether the at least one ED value associated with the channel satisfies at least one of the first value or the second value, the communications manager 910 may be configured as or otherwise support a means for determining an ED value based on performing the second channel sensing procedure using the beam pair. In some examples, to support determining whether the at least one ED value associated with the channel satisfies at least one of the first value or the second value, the communications manager 910 may be configured as or otherwise support a means for determining whether the ED value satisfies the second value, where the second value is for the second channel sensing procedure using the beam pair.

In some examples, to support determining whether the at least one ED value associated with the channel satisfies at least one of the first value or the second value, the communications manager 910 may be configured as or otherwise support a means for performing at least one of the first channel sensing procedure or the second channel sensing procedure during a sensing slot absent of transmissions from the wireless device apparatus. In some examples, to support determining whether the at least one ED value associated with the channel satisfies at least one of the first value or the second value, the communications manager 910 may be configured as or otherwise support a means for determining the at least one ED value based on performing at least one of the first channel sensing procedure or the second channel sensing procedure during the sensing slot absent of transmissions from the wireless device apparatus.

In some examples, to support determining whether the at least one ED value associated with the channel satisfies at least one of the first value or the second value, the communications manager 910 may be configured as or otherwise support a means for determining whether the at least one ED value satisfies at least one of the first value or the second value, where the first value is for the first channel sensing procedure during the sensing slot absent of transmissions from the wireless device apparatus and the second value is for the second channel sensing procedure during the sensing slot absent of transmissions from the wireless device apparatus.

In some examples, to support determining whether the at least one ED value associated with the channel satisfies at least one of the first value or the second value, the communications manager 910 may be configured as or otherwise support a means for performing at least one of the first channel sensing procedure during a first sensing slot including transmissions via the second wireless role of the wireless device apparatus or the second channel sensing procedure during a second sensing slot including transmissions via the first wireless role of the wireless device apparatus. In some examples, to support determining whether the at least one ED value associated with the channel satisfies at least one of the first value or the second value, the communications manager 910 may be configured as or otherwise support a means for determining the at least one ED value based on performing at least one of the first channel sensing procedure during the first sensing slot including transmissions via the second wireless role of the wireless device apparatus or the second channel sensing procedure during the second sensing slot including transmissions via the first wireless role of the wireless device apparatus.

In some examples, to support determining whether the at least one ED value associated with the channel satisfies at least one of the first value or the second value, the communications manager 910 may be configured as or otherwise support a means for determining whether the at least one ED value satisfies at least one of the first value or the second value, where the first value is for the first channel sensing procedure during the first sensing slot including transmissions via the second wireless role of the wireless device apparatus and the second value is for the second channel sensing procedure during the second sensing slot including transmissions via the first wireless role of the wireless device apparatus.

In some examples, the communications manager 910 may be configured as or otherwise support a means for identifying the first value based on a first class of the first wireless role and the second value based on a second class of the second wireless role.

In some examples, the first class of the first wireless role includes at least one of a wide-area class or a local-area class. In some examples, to support identifying the first value and the second value, the communications manager 910 may be configured as or otherwise support a means for receiving an indication of the first value and the second value as one or more of: an F1-AP message, an RRC message, a MAC-CE, or DCI. In some examples, to support identifying the first value and the second value, the communications manager 910 may be configured as or otherwise support a means for receiving an indication of the first value and the second value as absolute values.

In some examples, to support identifying the first value and the second value, the communications manager 910 may be configured as or otherwise support a means for receiving an indication of at least one of the first value or the second value as offset values relative to a default value. In some examples, to support identifying the first value and the second value, the communications manager 910 may be configured as or otherwise support a means for determining at least one of the first value or the second value based on the offset values and the default value.

In some examples, to support identifying the first value and the second value, the communications manager 910 may be configured as or otherwise support a means for receiving an indication of at least one of the first value or the second value as offset values relative to an indicated parameter. In some examples, to support identifying the first value and the second value, the communications manager 910 may be configured as or otherwise support a means for determining at least one of the first value or the second value based on the offset values and the indicated parameter.

In some examples, the wireless device apparatus is an IAB node and, in some examples, the first wireless role includes an MT role and the second wireless role includes a DU role.

In some implementations, the communications manager 910 may be configured to perform various operations (for example, receiving, monitoring, transmitting) using or otherwise in cooperation with the transceiver 920, the one or more antennas 925, or any combination thereof. Although the communications manager 910 is illustrated as a separate component, in some implementations, one or more functions described with reference to the communications manager 910 may be supported by or performed by the processor 940, the memory 930, the code 935, or any combination thereof. For example, the code 935 may include instructions executable by the processor 940 to cause the device 905 to perform various aspects of channel sensing procedures for communications at an IAB node as described herein, or the processor 940 and the memory 930 may be otherwise configured to perform or support such operations.

The communications manager 910 as described herein may be implemented to realize one or more potential advantages. In some implementations, the communications manager 910 may perform separate channel sensing procedures for transmissions from the device 905 via an MT role and a DU role of the device 905. In some examples, the device 905, as a result of performing separate channel sensing procedures for transmissions via the MT role and the DU role, may reliably and accurately obtain channel access in examples in which the MT role and the DU role use separate antenna panels of the device 905 or otherwise have different radio frequency footprints. As a result of performing reliable channel sensing procedures, the transmissions from the device 905 via the MT role and the DU role may have a lower likelihood of being adversely influenced by interference, which may result in a greater likelihood for a receiving device to successfully receive the transmissions from the device 905.

As such, the device 905 may potentially perform fewer retransmissions, which may result in greater spectral efficiency, less overhead, and high data rates to and from the device 905. Moreover, as a result of achieving higher data rates and potentially performing fewer retransmissions, the device 905 may spend less time transmitting and, accordingly, the device 905 to enter a sleep mode more frequently or for longer durations, which may improve power savings at the device 905 and increase battery life.

Figure 10:
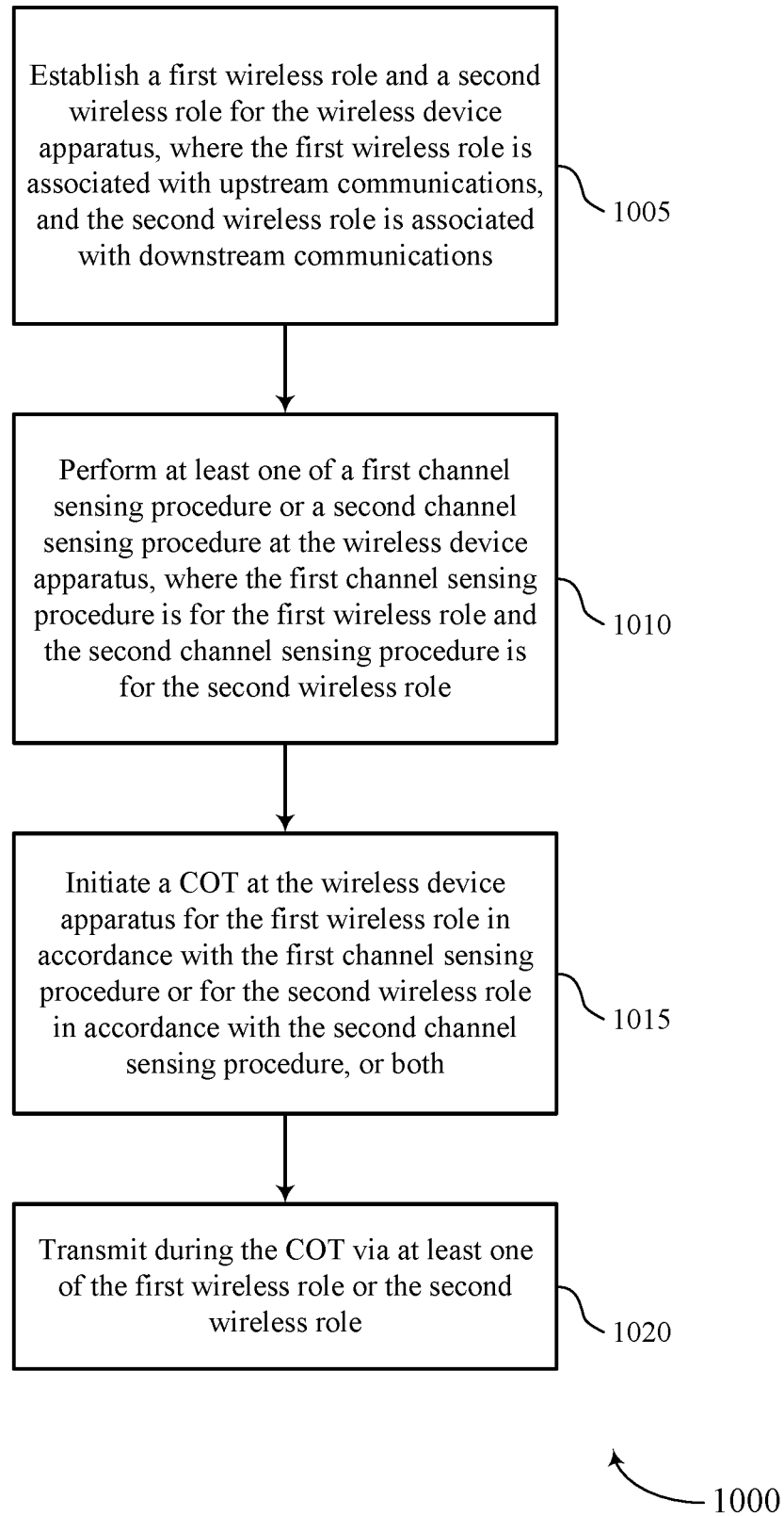
FIGS. 10-18 show flowcharts illustrating methods that support channel sensing procedures for communications at an IAB node.

FIG. 10 shows a flowchart illustrating an example method 1000 that supports channel sensing procedures for communications at an IAB node. The operations of method 1000 may be implemented by a device or its components as described herein. For example, the operations of method 1000 may be performed by a communications manager as described with reference to FIG. 9. In some examples, a device may execute a set of instructions to control the functional elements of the device to perform the functions described below. Additionally, or alternatively, a device may perform aspects of the functions described below using special-purpose hardware.

At 1005, the device may establish a first wireless role and a second wireless role for the wireless device apparatus, where the first wireless role is associated with upstream communications, and the second wireless role is associated with downstream communications. The operations of 1005 may be performed according to the methods described herein.

At 1010, the device may perform at least one of a first channel sensing procedure or a second channel sensing procedure at the wireless device apparatus, where the first channel sensing procedure is for the first wireless role and the second channel sensing procedure is for the second wireless role. The operations of 1010 may be performed according to the methods described herein.

At 1015, the device may initiate a COT at the wireless device apparatus for the first wireless role in accordance with the first channel sensing procedure or for the second wireless role in accordance with the second channel sensing procedure, or both. The operations of 1015 may be performed according to the methods described herein.

At 1020, the device may transmit during the COT via at least one of the first wireless role or the second wireless role. The operations of 1020 may be performed according to the methods described herein.

Figure 11:
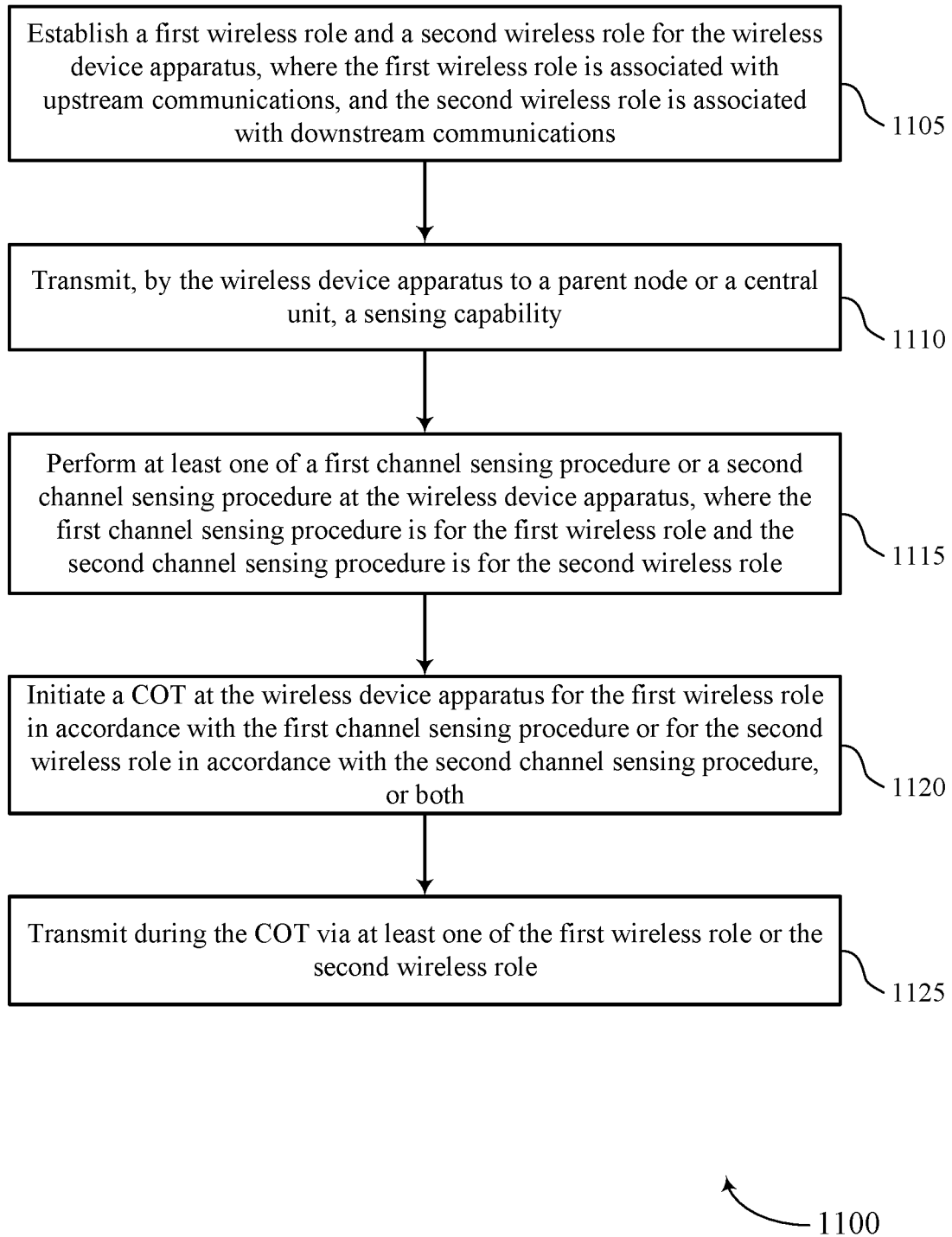

FIG. 11 shows a flowchart illustrating an example method 1100 that supports channel sensing procedures for communications at an IAB node. The operations of method 1100 may be implemented by a device or its components as described herein. For example, the operations of method 1100 may be performed by a communications manager as described with reference to FIG. 9. In some examples, a device may execute a set of instructions to control the functional elements of the device to perform the functions described below. Additionally, or alternatively, a device may perform aspects of the functions described below using special-purpose hardware.

At 1105, the device may establish a first wireless role and a second wireless role for the wireless device apparatus, where the first wireless role is associated with upstream communications, and the second wireless role is associated with downstream communications. The operations of 1105 may be performed according to the methods described herein.

At 1110, the device may transmit, by the wireless device apparatus to a parent node or a central unit, a sensing capability. The operations of 1110 may be performed according to the methods described herein.

At 1115, the device may perform at least one of a first channel sensing procedure or a second channel sensing procedure at the wireless device apparatus, where the first channel sensing procedure is for the first wireless role and the second channel sensing procedure is for the second wireless role. In some examples, performing the first channel sensing procedure for the first wireless role and the second channel sensing procedure for the second wireless role is based on the sensing capability. The operations of 1115 may be performed according to the methods described herein.

At 1120, the device may initiate a COT at the wireless device apparatus for the first wireless role in accordance with the first channel sensing procedure or for the second wireless role in accordance with the second channel sensing procedure, or both. The operations of 1120 may be performed according to the methods described herein.

At 1125, the device may transmit during the COT via at least one of the first wireless role or the second wireless role. The operations of 1125 may be performed according to the methods described herein.

Figure 12:
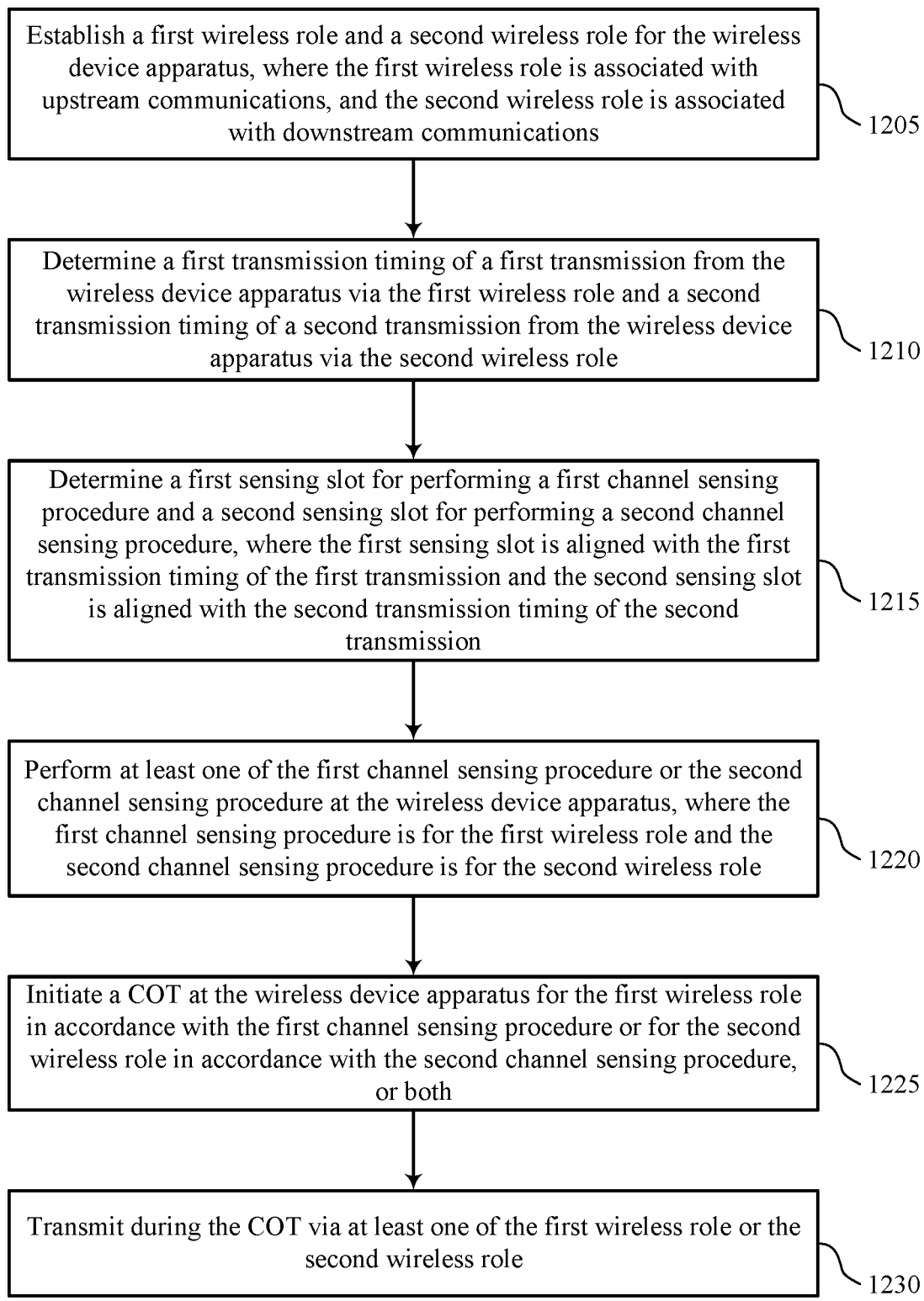

FIG. 12 shows a flowchart illustrating an example method 1200 that supports channel sensing procedures for communications at an IAB node. The operations of method 1200 may be implemented by a device or its components as described herein. For example, the operations of method 1200 may be performed by a communications manager as described with reference to FIG. 9. In some examples, a device may execute a set of instructions to control the functional elements of the device to perform the functions described below. Additionally, or alternatively, a device may perform aspects of the functions described below using special-purpose hardware.

At 1205, the device may establish a first wireless role and a second wireless role for the wireless device apparatus, where the first wireless role is associated with upstream communications, and the second wireless role is associated with downstream communications. The operations of 1205 may be performed according to the methods described herein.

At 1210, the device may determine a first transmission timing of a first transmission from the wireless device apparatus via the first wireless role and a second transmission timing of a second transmission from the wireless device apparatus via the second wireless role. The operations of 1210 may be performed according to the methods described herein.

At 1215, the device may determine a first sensing slot for performing a first channel sensing procedure and a second sensing slot for performing a second channel sensing procedure, where the first sensing slot is aligned with the first transmission timing of the first transmission and the second sensing slot is aligned with the second transmission timing of the second transmission. The operations of 1215 may be performed according to the methods described herein.

At 1220, the device may perform at least one of the first channel sensing procedure or the second channel sensing procedure at the wireless device apparatus, where the first channel sensing procedure is for the first wireless role and the second channel sensing procedure is for the second wireless role. The operations of 1220 may be performed according to the methods described herein.

At 1225, the device may initiate a COT at the wireless device apparatus for the first wireless role in accordance with the first channel sensing procedure or for the second wireless role in accordance with the second channel sensing procedure, or both. The operations of 1225 may be performed according to the methods described herein.

At 1230, the device may transmit during the COT via at least one of the first wireless role or the second wireless role. The operations of 1230 may be performed according to the methods described herein.

Figure 13:
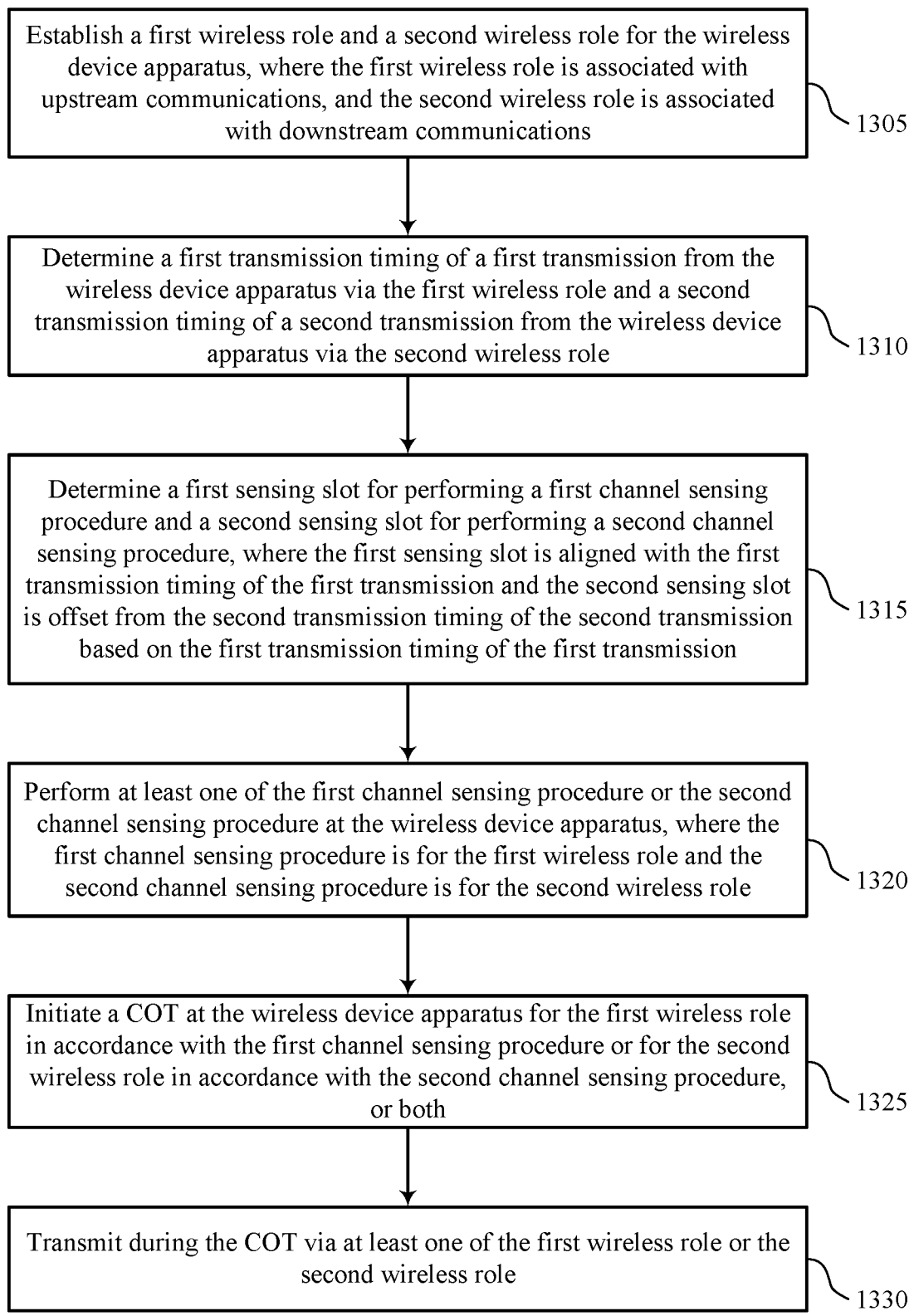

FIG. 13 shows a flowchart illustrating an example method 1300 that supports channel sensing procedures for communications at an IAB node. The operations of method 1300 may be implemented by a device or its components as described herein. For example, the operations of method 1300 may be performed by a communications manager as described with reference to FIG. 9. In some examples, a device may execute a set of instructions to control the functional elements of the device to perform the functions described below. Additionally, or alternatively, a device may perform aspects of the functions described below using special-purpose hardware.

At 1305, the device may establish a first wireless role and a second wireless role for the wireless device apparatus, where the first wireless role is associated with upstream communications, and the second wireless role is associated with downstream communications. The operations of 1305 may be performed according to the methods described herein.

At 1310, the device may determine a first transmission timing of a first transmission from the wireless device apparatus via the first wireless role and a second transmission timing of a second transmission from the wireless device apparatus via the second wireless role. The operations of 1310 may be performed according to the methods described herein.

At 1315, the device may determine a first sensing slot for performing a first channel sensing procedure and a second sensing slot for performing a second channel sensing procedure, where the first sensing slot is aligned with the first transmission timing of the first transmission and the second sensing slot is offset from the second transmission timing of the second transmission based on the first transmission timing of the first transmission. The operations of 1315 may be performed according to the methods described herein.

At 1320, the device may perform at least one of the first channel sensing procedure or the second channel sensing procedure at the wireless device apparatus, where the first channel sensing procedure is for the first wireless role and the second channel sensing procedure is for the second wireless role. The operations of 1320 may be performed according to the methods described herein.

At 1325, the device may initiate a COT at the wireless device apparatus for the first wireless role in accordance with the first channel sensing procedure or for the second wireless role in accordance with the second channel sensing procedure, or both. The operations of 1325 may be performed according to the methods described herein.

At 1330, the device may transmit during the COT via at least one of the first wireless role or the second wireless role. The operations of 1330 may be performed according to the methods described herein.

Figure 14:
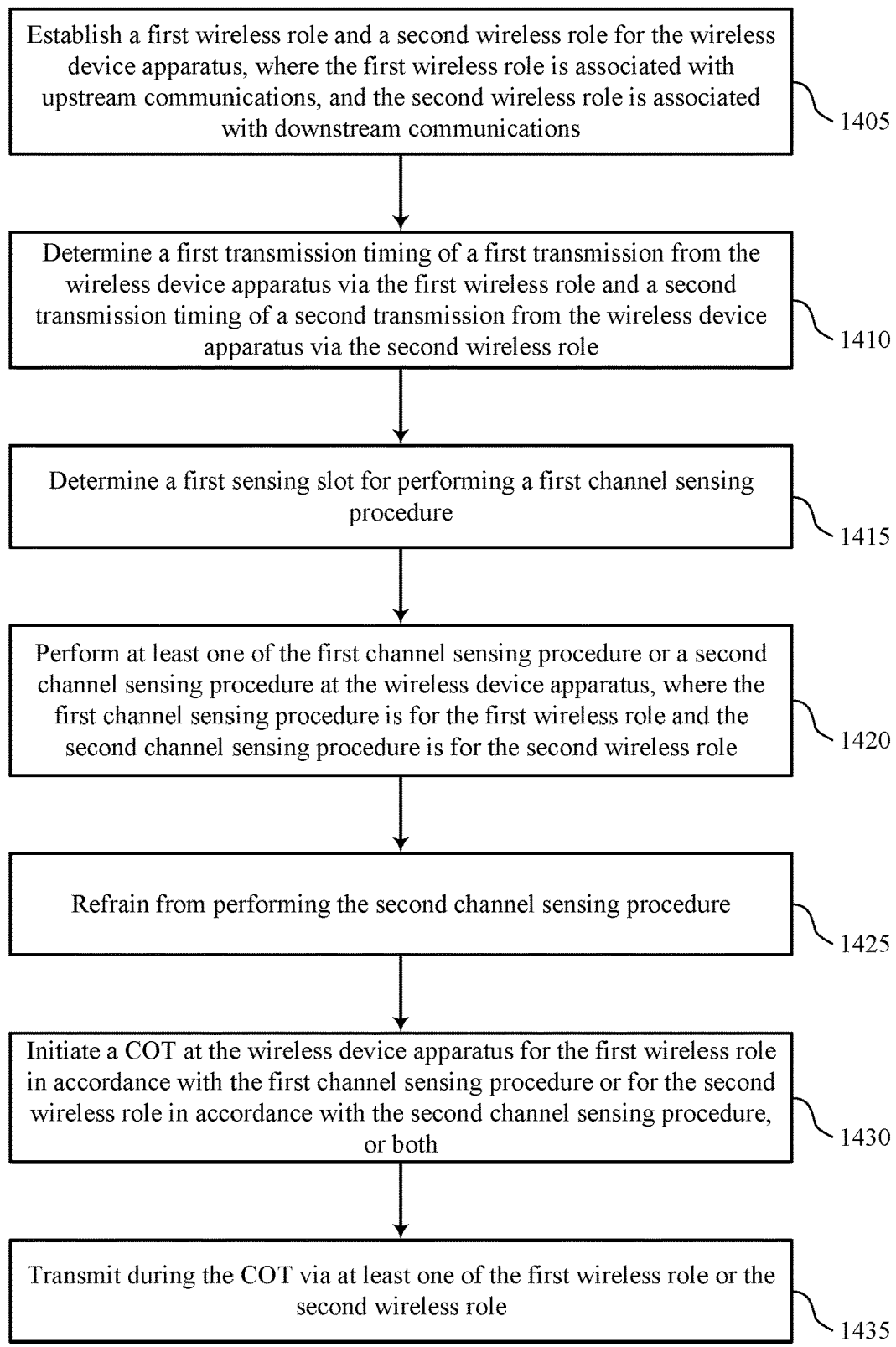

FIG. 14 shows a flowchart illustrating an example method 1400 that supports channel sensing procedures for communications at an IAB node. The operations of method 1400 may be implemented by a device or its components as described herein. For example, the operations of method 1400 may be performed by a communications manager as described with reference to FIG. 9. In some examples, a device may execute a set of instructions to control the functional elements of the device to perform the functions described below. Additionally, or alternatively, a device may perform aspects of the functions described below using special-purpose hardware.

At 1405, the device may establish a first wireless role and a second wireless role for the wireless device apparatus, where the first wireless role is associated with upstream communications, and the second wireless role is associated with downstream communications. The operations of 1405 may be performed according to the methods described herein.

At 1410, the device may determine a first transmission timing of a first transmission from the wireless device apparatus via the first wireless role and a second transmission timing of a second transmission from the wireless device apparatus via the second wireless role. The operations of 1410 may be performed according to the methods described herein.

At 1415, the device may determine a first sensing slot for performing a first channel sensing procedure. The operations of 1415 may be performed according to the methods described herein.

At 1420, the device may perform at least one of the first channel sensing procedure or a second channel sensing procedure at the wireless device apparatus, where the first channel sensing procedure is for the first wireless role and the second channel sensing procedure is for the second wireless role. The operations of 1420 may be performed according to the methods described herein.

At 1425, the device may refrain from performing the second channel sensing procedure. The operations of 1425 may be performed according to the methods described herein.

At 1430, the device may initiate a COT at the wireless device apparatus for the first wireless role in accordance with the first channel sensing procedure or for the second wireless role in accordance with the second channel sensing procedure, or both. The operations of 1430 may be performed according to the methods described herein.

At 1435, the device may transmit during the COT via at least one of the first wireless role or the second wireless role. The operations of 1435 may be performed according to the methods described herein.

Figure 15:
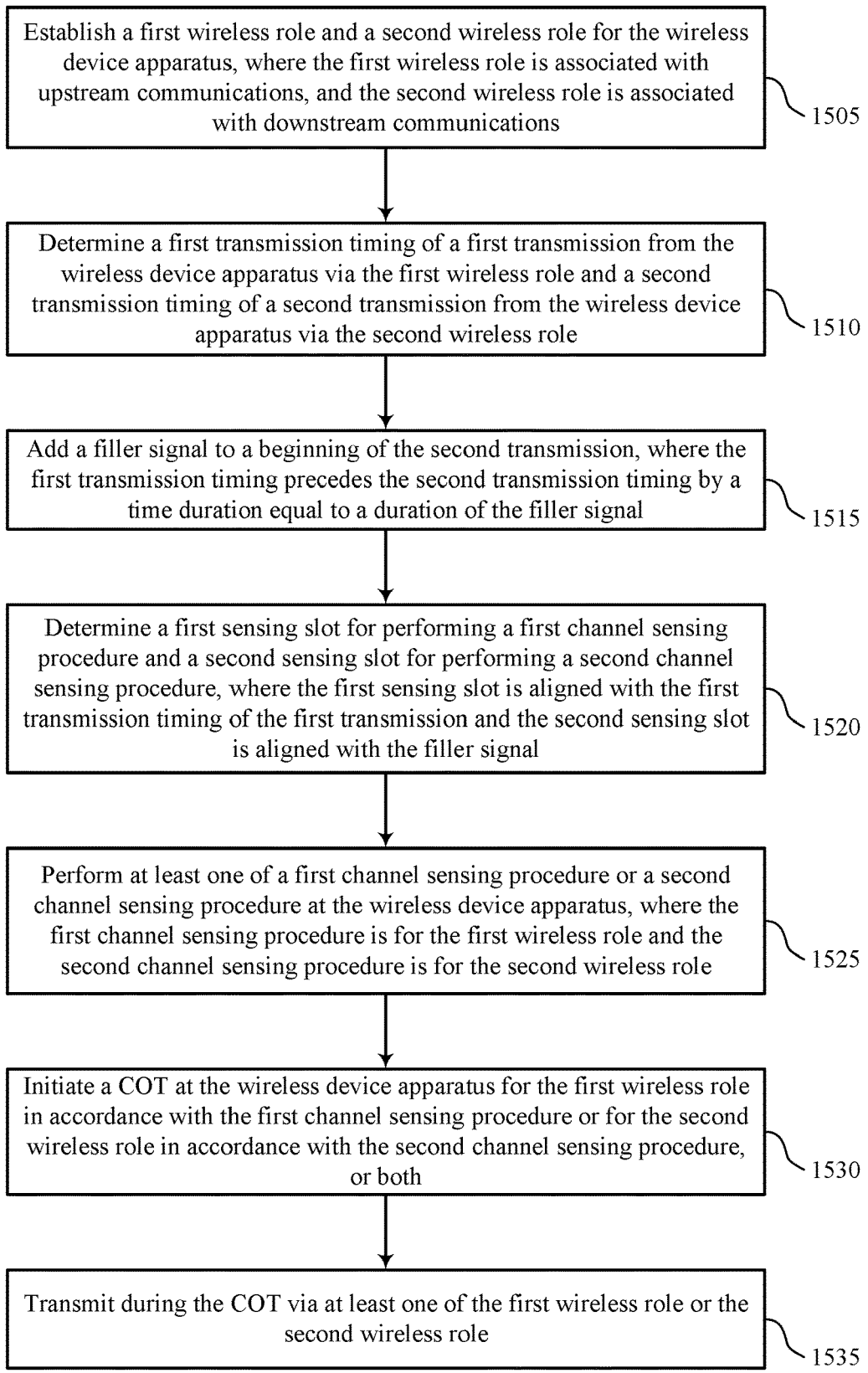

FIG. 15 shows a flowchart illustrating an example method 1500 that supports channel sensing procedures for communications at an IAB node. The operations of method 1500 may be implemented by a device or its components as described herein. For example, the operations of method 1500 may be performed by a communications manager as described with reference to FIG. 9. In some examples, a device may execute a set of instructions to control the functional elements of the device to perform the functions described below. Additionally, or alternatively, a device may perform aspects of the functions described below using special-purpose hardware.

At 1505, the device may establish a first wireless role and a second wireless role for the wireless device apparatus, where the first wireless role is associated with upstream communications, and the second wireless role is associated with downstream communications. The operations of 1505 may be performed according to the methods described herein.

At 1510, the device may determine a first transmission timing of a first transmission from the wireless device apparatus via the first wireless role and a second transmission timing of a second transmission from the wireless device apparatus via the second wireless role. The operations of 1510 may be performed according to the methods described herein.

At 1515, the device may add a filler signal to a beginning of the second transmission, where the first transmission timing precedes the second transmission timing by a time duration equal to a duration of the filler signal. The operations of 1515 may be performed according to the methods described herein.

At 1520, the device may determine a first sensing slot for performing a first channel sensing procedure and a second sensing slot for performing a second channel sensing procedure, where the first sensing slot is aligned with the first transmission timing of the first transmission and the second sensing slot is aligned with the filler signal. The operations of 1520 may be performed according to the methods described herein.

At 1525, the device may perform at least one of the first channel sensing procedure or the second channel sensing procedure at the wireless device apparatus, where the first channel sensing procedure is for the first wireless role and the second channel sensing procedure is for the second wireless role. The operations of 1525 may be performed according to the methods described herein.

At 1530, the device may initiate a COT at the wireless device apparatus for the first wireless role in accordance with the first channel sensing procedure or for the second wireless role in accordance with the second channel sensing procedure, or both. The operations of 1530 may be performed according to the methods described herein.

At 1535, the device may transmit during the COT via at least one of the first wireless role or the second wireless role. The operations of 1535 may be performed according to the methods described herein.

Figure 16:
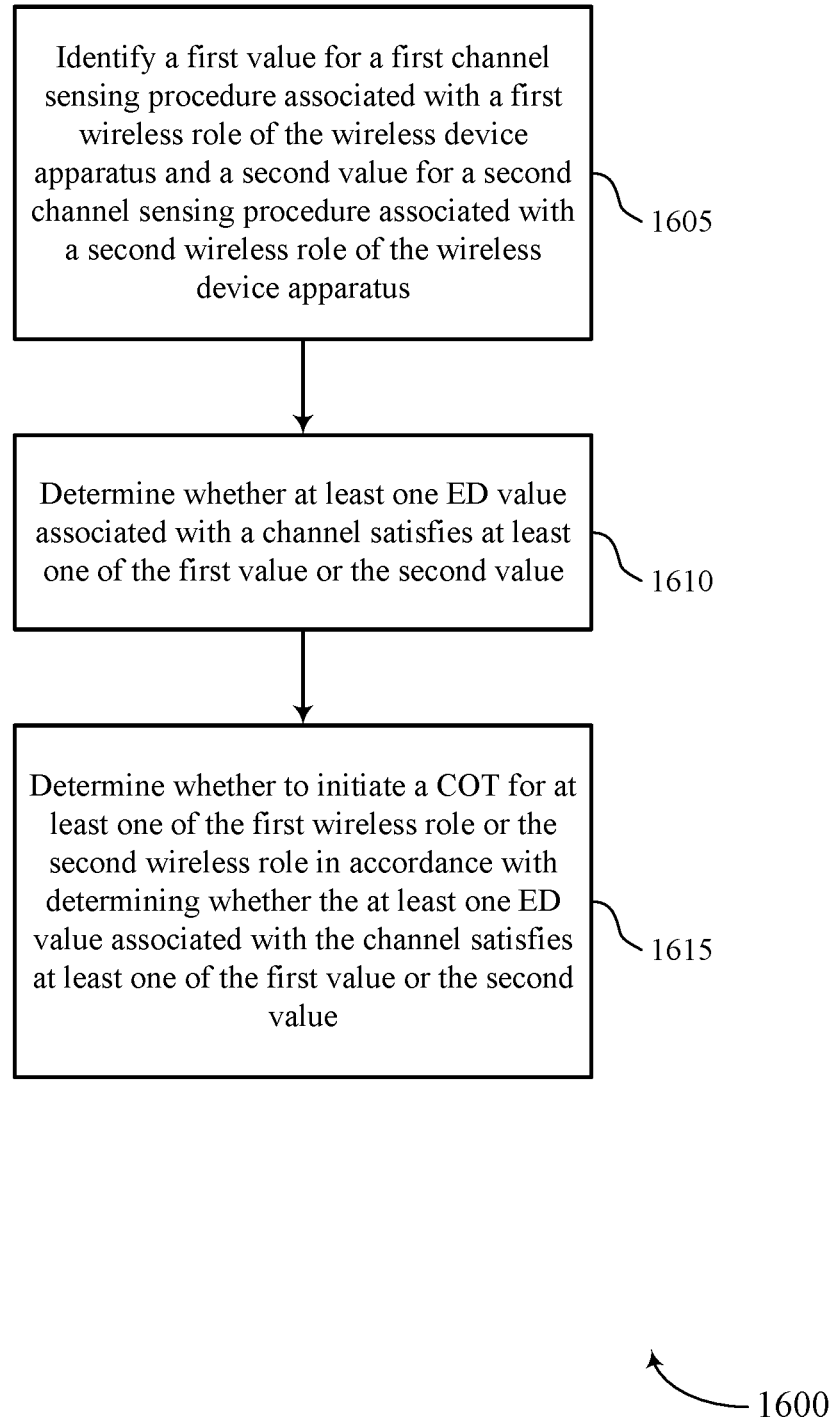

FIG. 16 shows a flowchart illustrating an example method 1600 that supports channel sensing procedures for communications at an IAB node. The operations of method 1600 may be implemented by a device or its components as described herein. For example, the operations of method 1600 may be performed by a communications manager as described with reference to FIG. 9. In some examples, a device may execute a set of instructions to control the functional elements of the device to perform the functions described below. Additionally, or alternatively, a device may perform aspects of the functions described below using special-purpose hardware.

At 1605, the device may identify a first value for a first channel sensing procedure associated with a first wireless role of the wireless device apparatus and a second value for a second channel sensing procedure associated with a second wireless role of the wireless device apparatus. The operations of 1605 may be performed according to the methods described herein.

At 1610, the device may determine whether at least one ED value associated with a channel satisfies at least one of the first value or the second value. The operations of 1610 may be performed according to the methods described herein.

At 1615, the device may determine whether to initiate a COT for at least one of the first wireless role or the second wireless role in accordance with determining whether the at least one ED value associated with the channel satisfies at least one of the first value or the second value. The operations of 1615 may be performed according to the methods described herein.

Figure 17:
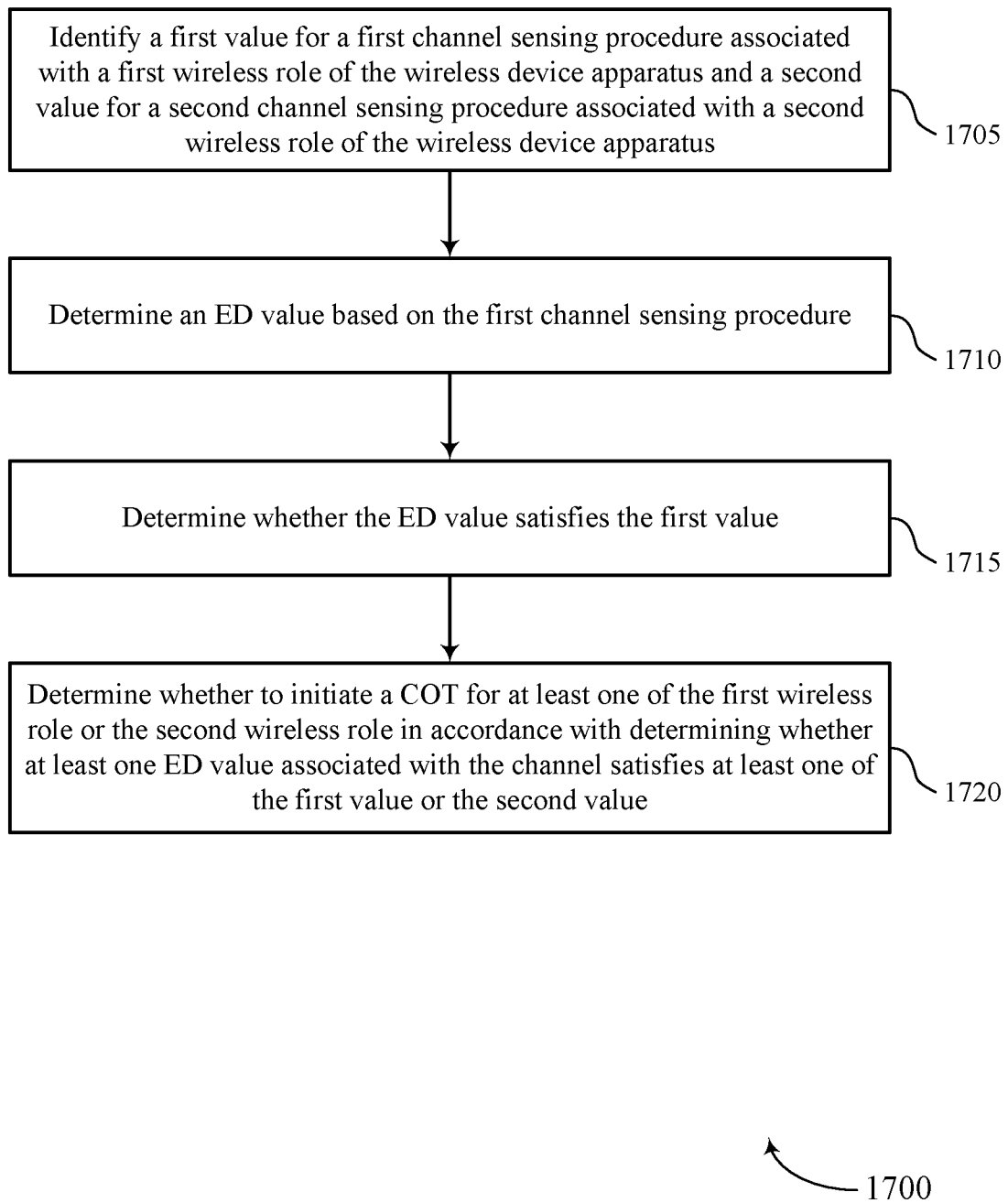

FIG. 17 shows a flowchart illustrating an example method 1700 that supports channel sensing procedures for communications at an IAB node. The operations of method 1700 may be implemented by a device or its components as described herein. For example, the operations of method 1700 may be performed by a communications manager as described with reference to FIG. 9. In some examples, a device may execute a set of instructions to control the functional elements of the device to perform the functions described below. Additionally, or alternatively, a device may perform aspects of the functions described below using special-purpose hardware.

At 1705, the device may identify a first value for a first channel sensing procedure associated with a first wireless role of the wireless device apparatus and a second value for a second channel sensing procedure associated with a second wireless role of the wireless device apparatus. The operations of 1705 may be performed according to the methods described herein.

At 1710, the device may determine an ED value based on the first channel sensing procedure. The operations of 1710 may be performed according to the methods described herein.

At 1715, the device may determine whether the ED value satisfies the first value. The operations of 1715 may be performed according to the methods described herein.

At 1720, the device may determine whether to initiate a COT for at least one of the first wireless role or the second wireless role in accordance with determining whether at least one ED value associated with the channel satisfies at least one of the first value or the second value. In some examples, determining whether to initiate the COT for the first wireless role is based on determining whether the ED value satisfies the first value. The operations of 1720 may be performed according to the methods described herein.

Figure 18:
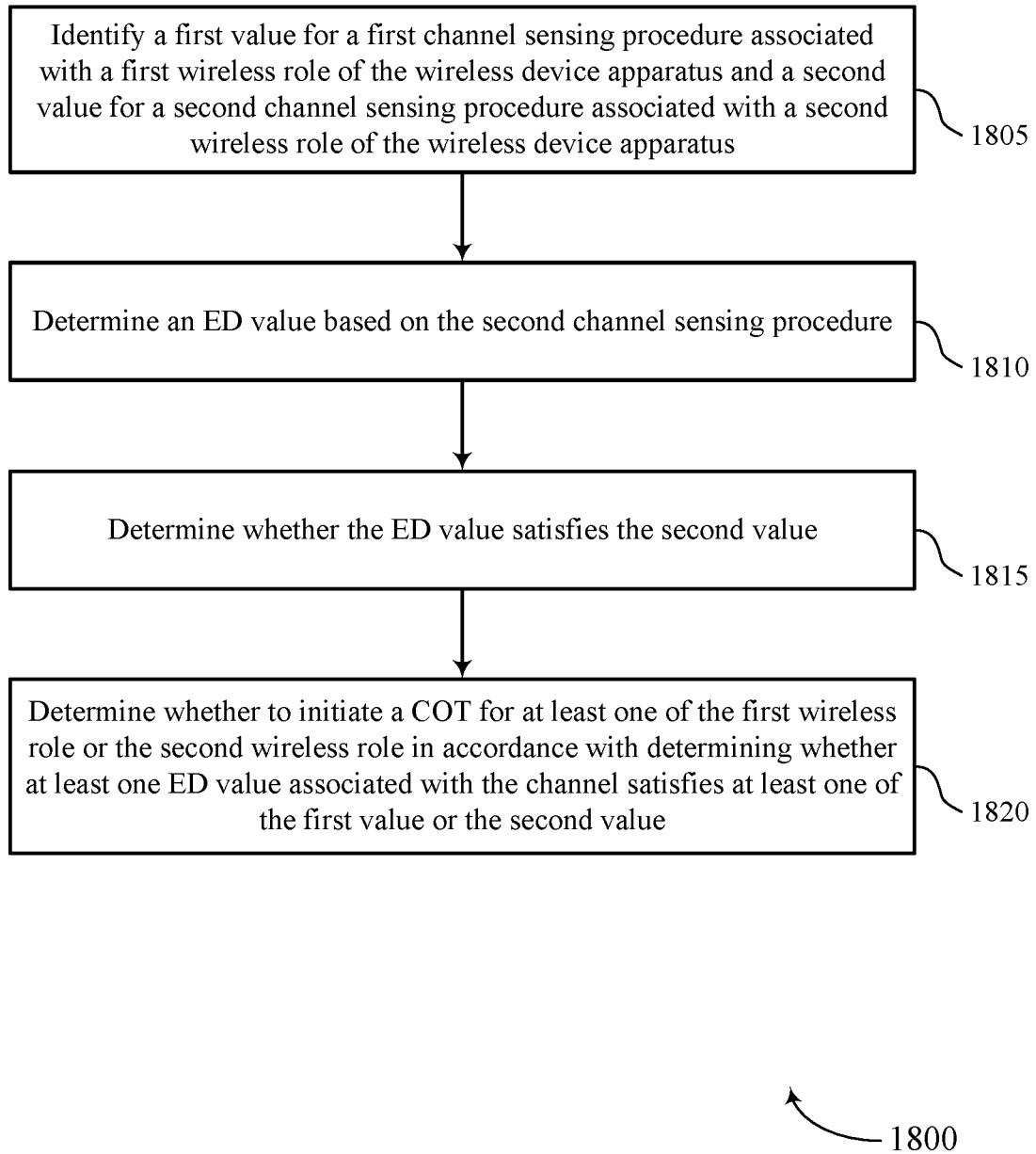

FIG. 18 shows a flowchart illustrating an example method 1800 that supports channel sensing procedures for communications at an IAB node. The operations of method 1800 may be implemented by a device or its components as described herein. For example, the operations of method 1800 may be performed by a communications manager as described with reference to FIG. 9. In some examples, a device may execute a set of instructions to control the functional elements of the device to perform the functions described below. Additionally, or alternatively, a device may perform aspects of the functions described below using special-purpose hardware.

At 1805, the device may identify a first value for a first channel sensing procedure associated with a first wireless role of the wireless device apparatus and a second value for a second channel sensing procedure associated with a second wireless role of the wireless device apparatus. The operations of 1805 may be performed according to the methods described herein.

At 1810, the device may determine an ED value based on the second channel sensing procedure. The operations of 1810 may be performed according to the methods described herein.

At 1815, the device may determine whether the ED value satisfies the second value. The operations of 1815 may be performed according to the methods described herein.

At 1820, the device may determine whether to initiate a COT for at least one of the first wireless role or the second wireless role in accordance with determining whether at least one ED value associated with the channel satisfies at least one of the first value or the second value. In some examples, determining whether to initiate the COT for the second wireless role is based on determining whether the ED value satisfies the second value. The operations of 1820 may be performed according to the methods described herein.

The following provides an overview of some aspects of the present disclosure:

Aspect 1: A method for wireless communications at a wireless device apparatus, including: establishing a first wireless role and a second wireless role for the wireless device apparatus, where the first wireless role is associated with upstream communications, and the second wireless role is associated with downstream communications; performing at least one of a first channel sensing procedure or a second channel sensing procedure at the wireless device apparatus, where the first channel sensing procedure is for the first wireless role and the second channel sensing procedure is for the second wireless role; initiating a COT at the wireless device apparatus for the first wireless role in accordance with the first channel sensing procedure or for the second wireless role in accordance with the second channel sensing procedure, or both; and transmitting during the COT via at least one of the first wireless role or the second wireless role.

Aspect 2: The method of aspect 1, where performing at least one of the first channel sensing procedure or the second channel sensing procedure at the wireless device apparatus includes: performing the first channel sensing procedure at a first antenna panel associated with the first wireless role; and performing the second channel sensing procedure at a second antenna panel associated with the second wireless role.

Aspect 3: The method of aspect 2, further including: determining a success of the first channel sensing procedure based at least in part on a first ED value associated with the first antenna panel and a first value associated with the first channel sensing procedure, where the first ED value satisfies the first value; and determining a success of the second channel sensing procedure based at least in part on a second ED value associated with the second antenna panel and a second value associated with the second channel sensing procedure, where the second ED value satisfies the second value.

Aspect 4: The method of aspect 1, where performing at least one of the first channel sensing procedure or the second channel sensing procedure at the wireless device apparatus includes: performing the first channel sensing procedure and the second channel sensing procedure at an antenna panel of the wireless device apparatus associated with the first wireless role.

Aspect 5: The method of aspect 4, further including: determining a success of the first channel sensing procedure based at least in part on an ED value associated with the antenna panel and a first value associated with the first channel sensing procedure, where the ED value satisfies the first value; and determining a success of the second channel sensing procedure based at least in part on the ED value associated with the antenna panel and a second value associated with the second channel sensing procedure, where the ED value satisfies the second value.

Aspect 6: The method of aspect 1, where performing at least one of the first channel sensing procedure or the second channel sensing procedure at the wireless device apparatus includes: performing the first channel sensing procedure and the second channel sensing procedure at an antenna panel of the wireless device apparatus associated with the second wireless role.

Aspect 7: The method of aspect 6, further including: determining a success of the first channel sensing procedure based at least in part on an ED value associated with the antenna panel and a first value associated with the first channel sensing procedure, where the ED value satisfies the first value; and determining a success of the second channel sensing procedure based at least in part on the ED value associated with the antenna panel and a second value associated with the second channel sensing procedure, where the ED value satisfies the second value.

Aspect 8: The method of any of aspects 1-7, where performing at least one of the first channel sensing procedure or the second channel sensing procedure at the wireless device apparatus includes: determining one or more sensing beams associated with at least one of the first channel sensing procedure or the second channel sensing procedure; and performing at least one of the first channel sensing procedure or the second channel sensing procedure using the one or more sensing beams.

Aspect 9: The method of aspect 8, where the one or more sensing beams correspond to one or more transmit beams and where transmitting, by the wireless device apparatus, via at least one of the first wireless role or the second wireless role during the COT includes: transmitting via the one or more transmit beams.

Aspect 10: The method of any of aspects 1-9, further including: transmitting, by the wireless device apparatus to a parent node or a central unit, a sensing capability, where performing the first channel sensing procedure for the first wireless role and the second channel sensing procedure for the second wireless role is based at least in part on the sensing capability.

Aspect 11: The method of aspect 10, where the sensing capability includes an indication that the wireless device apparatus performs the first channel sensing procedure for the first wireless role and the second channel sensing procedure for the second wireless role as multiple nodes.

Aspect 12: The method of any of aspects 10 or 11, where the sensing capability includes an indication of whether the wireless device apparatus is capable of performing at least one of the first channel sensing procedure while transmitting via the second wireless role or the second channel sensing procedure while transmitting via the first wireless role.

Aspect 13: The method of any of aspects 10-12, where the sensing capability is transmitted as one or more of an F1-AP message, an RRC message, or a MAC-CE.

Aspect 14: The method of any of aspects 1-13, where transmitting during the COT via at least one of the first wireless role or the second wireless role includes: determining a duplex capability of the wireless device apparatus, a success of the first channel sensing procedure, and a success of the second channel sensing procedure; and determining whether to transmit at least one of a first transmission from the wireless device apparatus via the first wireless role or a second transmission from the wireless device apparatus via the second wireless role based at least in part on the duplex capability of the wireless device apparatus, the success of the first channel sensing procedure, and the success of the second channel sensing procedure.

Aspect 15: The method of any of aspects 1-14, further including: determining a first transmission timing of a first transmission from the wireless device apparatus via the first wireless role and a second transmission timing of a second transmission from the wireless device apparatus via the second wireless role; and determining a first sensing slot for performing the first channel sensing procedure and a second sensing slot for performing the second channel sensing procedure, where the first sensing slot is aligned with the first transmission timing of the first transmission and the second sensing slot is aligned with the second transmission timing of the second transmission.

Aspect 16: The method of aspect 15, further including: determining that the wireless device apparatus satisfies an interference metric.

Aspect 17: The method of aspect 16, where determining that the wireless device apparatus satisfies the interference metric includes: applying a signal processing technique to at least one of the first sensing slot or the second sensing slot.

Aspect 18: The method of any of aspects 15-17, where performing at least one of the first channel sensing procedure or the second channel sensing procedure at the wireless device apparatus includes: performing the first channel sensing procedure during a first measurement area within the first sensing slot, where the first measurement area has a first time duration; and performing the second channel sensing procedure during a second measurement area within the second sensing slot, where the second measurement area has a second time duration less than the first time duration.

Aspect 19: The method of aspect 18, where the first time duration is equal to four microseconds and the second time duration is less than four microseconds.

Aspect 20: The method of any of aspects 18 or 19, where the first measurement area and the second measurement area are aligned in time.

Aspect 21: The method of any of aspects 15-20, where performing at least one of the first channel sensing procedure or the second channel sensing procedure at the wireless device apparatus includes: performing the first channel sensing procedure during a first measurement area of a first sensing window, where the first sensing window includes the first sensing slot, and where the first sensing slot includes a first portion of the first measurement area; and performing the second channel sensing procedure during a second measurement area of a second sensing window, where the second sensing window includes the second sensing slot, and where the second sensing slot includes a second portion of the second measurement area, the second portion of the second measurement area including a smaller time duration than the first portion of the first measurement area.

Aspect 22: The method of aspect 21, where the first portion of the first measurement area includes at least four microseconds and the second portion of the second measurement area includes less than four microseconds.

Aspect 23: The method of any of aspects 15-22, where the first sensing slot at least partially overlaps with the second sensing slot.

Aspect 24: The method of any of aspects 1-14, further including: determining a first transmission timing of a first transmission from the wireless device apparatus via the first wireless role and a second transmission timing of a second transmission from the wireless device apparatus via the second wireless role; and determining a first sensing slot for performing the first channel sensing procedure and a second sensing slot for performing the second channel sensing procedure, where the first sensing slot is aligned with the first transmission timing of the first transmission and the second sensing slot is offset from the second transmission timing of the second transmission based at least in part on the first transmission timing of the first transmission.

Aspect 25: The method of aspect 24, further including: determining that the wireless device apparatus fails to satisfy an interference metric, where the second sensing slot being offset from the second transmission timing of the second transmission based at least in part on the first transmission timing of the first transmission is based at least in part on determining that the wireless device apparatus fails to satisfy the interference metric.

Aspect 26: The method of any of aspects 24 or 25, where the first transmission timing of the first transmission is within a threshold time duration of the second transmission timing of the second transmission.

Aspect 27: The method of any of aspects 24-26, where the first sensing slot and the second sensing slot avoid overlapping with either of the first transmission or the second transmission.

Aspect 28: The method of any of aspects 1-14, further including: determining a first transmission timing of a first transmission from the wireless device apparatus via the first wireless role and a second transmission timing of a second transmission from the wireless device apparatus via the second wireless role; determining a first sensing slot for performing the first channel sensing procedure; and refraining from performing the second channel sensing procedure.

Aspect 29: The method of aspect 28, where the first transmission timing of the first transmission is within a threshold time duration of the second transmission timing of the second transmission.

Aspect 30: The method of any of aspects 28 or 29, where the second transmission is less than a threshold time duration.

Aspect 31: The method of any of aspects 1-14, further including: determining a first transmission timing of a first transmission from the wireless device apparatus via the first wireless role and a second transmission timing of a second transmission from the wireless device apparatus via the second wireless role; adding a filler signal to a beginning of the second transmission, where the first transmission timing precedes the second transmission timing by a time duration equal to a duration of the filler signal; and determining a first sensing slot for performing the first channel sensing procedure and a second sensing slot for performing the second channel sensing procedure, where the first sensing slot is aligned with the first transmission timing of the first transmission and the second sensing slot is aligned with the filler signal.

Aspect 32: The method of any of aspects 1-31, further including: receiving a configuration for performing the first channel sensing procedure and the second channel sensing procedure at the wireless device apparatus.

Aspect 33: The method of aspect 32, where the configuration is received as one or more of an F1-AP message, an RRC message, a MAC-CE, or DCI.

Aspect 34: The method of any of aspects 1-33, where the wireless device apparatus is an IAB node and the first wireless role includes an MT role and the second wireless role includes a DU role.

Aspect 35: A method for wireless communications at a wireless device apparatus, including: identifying a first value for a first channel sensing procedure associated with a first wireless role of the wireless device apparatus and a second value for a second channel sensing procedure associated with a second wireless role of the wireless device apparatus; determining whether at least one ED value associated with a channel satisfies at least one of the first value or the second value; and determining whether to initiate a COT for at least one of the first wireless role or the second wireless role in accordance with determining whether the at least one ED value associated with the channel satisfies at least one of the first value or the second value.

Aspect 36: The method of aspect 35, where determining whether the at least one ED value associated with the channel satisfies at least one of the first value or the second value includes: determining an ED value based at least in part on the first channel sensing procedure; and determining whether the ED value satisfies the first value, where determining whether to initiate the COT for the first wireless role is based at least in part on determining whether the ED value satisfies the first value.

Aspect 37: The method of any of aspects 35 or 36, where determining whether the at least one ED value associated with the channel satisfies at least one of the first value or the second value includes: determining an ED value based at least in part on the second channel sensing procedure; and determining whether the ED value satisfies the second value, where determining whether to initiate the COT for the second wireless role is based at least in part on determining whether the ED value satisfies the second value.

Aspect 38: The method of any of aspects 35-37, further including: determining an ED value based at least in part on the first channel sensing procedure; determining that the ED value satisfies the first value; initiating the COT for the first wireless role based at least in part on determining that the ED value satisfies the first value; determining that the ED value satisfies the second value; and including, within the COT initiated for the first wireless role, one or more transmissions from the wireless device apparatus via the second wireless role based at least in part on determining that the ED value satisfies the second value.

Aspect 39: The method of any of aspects 35-37, further including: determining an ED value based at least in part on the second channel sensing procedure; determining that the ED value satisfies the second value; initiating the COT for the second wireless role based at least in part on determining that the ED value satisfies the second value; determining that the ED value satisfies the first value; and including, within the COT initiated for the second wireless role, one or more transmissions from the wireless device apparatus via the first wireless role based at least in part on determining that the ED value satisfies the first value.

Aspect 40: The method of any of aspects 35-39, where determining whether the at least one ED value associated with the channel satisfies at least one of the first value or the second value includes: performing the first channel sensing procedure using a set of sensing beams; determining an ED value based at least in part on performing the first channel sensing procedure using the set of sensing beams; and determining whether the ED value satisfies the first value, where the first value is for the first channel sensing procedure using the set of sensing beams.

Aspect 41: The method of any of aspects 35-40, where determining whether the at least one ED value associated with the channel satisfies at least one of the first value or the second value includes: performing the second channel sensing procedure using a set of sensing beams; determining an ED value based at least in part on performing the second channel sensing procedure using the set of sensing beams; and determining whether the ED value satisfies the second value, where the second value is for the second channel sensing procedure using the set of sensing beams.

Aspect 42: The method of any of aspects 35-41, where determining whether the at least one ED value associated with the channel satisfies at least one of the first value or the second value includes: performing the first channel sensing procedure using a beam pair; determining an ED value based at least in part on performing the first channel sensing procedure using the beam pair; and determining whether the ED value satisfies the first value, where the first value is for the first channel sensing procedure using the beam pair.

Aspect 43: The method of any of aspects 35-42, where determining whether the at least one ED value associated with the channel satisfies at least one of the first value or the second value includes: performing the second channel sensing procedure using a beam pair; determining an ED value based at least in part on performing the second channel sensing procedure using the beam pair; and determining whether the ED value satisfies the second value, where the second value is for the second channel sensing procedure using the beam pair.

Aspect 44: The method of any of aspects 35-43, where determining whether the at least one ED value associated with the channel satisfies at least one of the first value or the second value includes: performing at least one of the first channel sensing procedure or the second channel sensing procedure during a sensing slot absent of transmissions from the wireless device apparatus; determining the at least one ED value based at least in part on performing at least one of the first channel sensing procedure or the second channel sensing procedure during the sensing slot absent of transmissions from the wireless device apparatus; and determining whether the at least one ED value satisfies at least one of the first value or the second value, where the first value is for the first channel sensing procedure during the sensing slot absent of transmissions from the wireless device apparatus and the second value is for the second channel sensing procedure during the sensing slot absent of transmissions from the wireless device apparatus.

Aspect 45: The method of any of aspects 35-43, where determining whether the at least one ED value associated with the channel satisfies at least one of the first value or the second value includes: performing at least one of the first channel sensing procedure during a first sensing slot including transmissions via the second wireless role of the wireless device apparatus or the second channel sensing procedure during a second sensing slot including transmissions via the first wireless role of the wireless device apparatus; determining the at least one ED value based at least in part on performing at least one of the first channel sensing procedure during the first sensing slot including transmissions via the second wireless role of the wireless device apparatus or the second channel sensing procedure during the second sensing slot including transmissions via the first wireless role of the wireless device apparatus; and determining whether the at least one ED value satisfies at least one of the first value or the second value, where the first value is for the first channel sensing procedure during the first sensing slot including transmissions via the second wireless role of the wireless device apparatus and the second value is for the second channel sensing procedure during the second sensing slot including transmissions via the first wireless role of the wireless device apparatus.

Aspect 46: The method of any of aspects 35-45, further including: identifying the first value based at least in part on a first class of the first wireless role and the second value based at least in part on a second class of the second wireless role.

Aspect 47: The method of aspect 46, where the first class of the first wireless role includes at least one of a wide-area class or a local-area class.

Aspect 48: The method of any of aspects 35-47, where identifying the first value and the second value includes: receiving an indication of the first value and the second value as one or more of: an F1-AP message, an RRC message, a MAC-CE, or DCI.

Aspect 49: The method of any of aspects 35-48, where identifying the first value and the second value includes: receiving an indication of the first value and the second value as absolute values.

Aspect 50: The method of any of aspects 35-48, where identifying the first value and the second value includes: receiving an indication of at least one of the first value or the second value as offset values relative to a default value; and determining at least one of the first value or the second value based at least in part on the offset values and the default value.

Aspect 51: The method of any of aspects 35-48, where identifying the first value and the second value includes: receiving an indication of at least one of the first value or the second value as offset values relative to an indicated parameter; and determining at least one of the first value or the second value based at least in part on the offset values and the indicated parameter.

Aspect 52: The method of any of aspects 35-51, where the wireless device apparatus is an IAB node and the first wireless role includes an MT role and the second wireless role includes a DU role.

Aspect 53: An apparatus for wireless communication at a wireless device apparatus, including at least a first interface, a processing system, and a second interface configured to cause the apparatus to perform a method of any of aspects 1-34.

Aspect 54: An apparatus for wireless communications at a wireless device apparatus, including a processor; memory coupled with the processor; and instructions stored in the memory and executable by the processor to cause the apparatus to perform a method of any of aspects 1-34.

Aspect 55: An apparatus for wireless communications at a wireless device apparatus, including at least one means for performing a method of any of aspects 1-34.

Aspect 56: A non-transitory computer-readable medium storing code for wireless communications at a wireless device apparatus, the code including instructions executable by a processor to perform a method of any of aspects 1-34.

Aspect 57: An apparatus for wireless communication at a wireless device apparatus, including at least a first interface, a processing system, and a second interface configured to cause the apparatus to perform a method of any of aspects 35-52.

Aspect 58: An apparatus for wireless communications at a wireless device apparatus, including a processor; memory coupled with the processor; and instructions stored in the memory and executable by the processor to cause the apparatus to perform a method of any of aspects 35-52.

Aspect 59: An apparatus for wireless communications at a wireless device apparatus, including at least one means for performing a method of any of aspects 35-52.

Aspect 60: A non-transitory computer-readable medium storing code for wireless communications at a wireless device apparatus, the code including instructions executable by a processor to perform a method of any of aspects 35-52.

As used herein, the term "determine" or "determining" encompasses a wide variety of actions and, therefore, "determining" can include calculating, computing, processing, deriving, investigating, looking up (such as via looking up in a table, a database or another data structure), ascertaining and the like. Also, "determining" can include receiving (such as receiving information), accessing (such as accessing data in a memory) and the like. Also, "determining" can include resolving, selecting, choosing, establishing and other such similar actions.

As used herein, a phrase referring to "at least one of" a list of items refers to any combination of those items, including single members. As an example, "at least one of: a, b, or c" is intended to cover: a, b, c, a-b, a-c, b-c, and a-b-c.

The various illustrative logics, logical blocks, modules, circuits and algorithm processes described in connection with the implementations disclosed herein may be implemented as electronic hardware, computer software, or combinations of both. The interchangeability of hardware and software has been described generally, in terms of functionality, and illustrated in the various illustrative components, blocks, modules, circuits and processes described above. Whether such functionality is implemented in hardware or software depends upon the particular application and design constraints imposed on the overall system.

The hardware and data processing apparatus used to implement the various illustrative logics, logical blocks, modules and circuits described in connection with the aspects disclosed herein may be implemented or performed with a general purpose single- or multi-chip processor, a digital signal processor (DSP), an application-specific integrated circuit (ASIC), a field-programmable gate array (FPGA) or other programmable logic device, discrete gate or transistor logic, discrete hardware components, or any combination thereof designed to perform the functions described herein. A general-purpose processor may be a microprocessor, or, any conventional processor, controller, microcontroller, or state machine. A processor also may be implemented as a combination of computing devices, such as a combination of a DSP and a microprocessor, a plurality of microprocessors, one or more microprocessors in conjunction with a DSP core, or any other such configuration. In some implementations, particular processes and methods may be performed by circuitry that is specific to a given function.

In one or more aspects, the functions described may be implemented in hardware, digital electronic circuitry, computer software, firmware, including the structures disclosed in this specification and their structural equivalents thereof, or in any combination thereof. Implementations of the subject matter described in this specification also can be implemented as one or more computer programs, i.e., one or more modules of computer program instructions, encoded on a computer storage media for execution by, or to control the operation of, data processing apparatus.

If implemented in software, the functions may be stored on or transmitted over as one or more instructions or code on a computer-readable medium. The processes of a method or algorithm disclosed herein may be implemented in a processor-executable software module which may reside on a computer-readable medium. Computer-readable media includes both computer storage media and communication media including any medium that can be enabled to transfer a computer program from one place to another. A storage media may be any available media that may be accessed by a computer. By way of example, and not limitation, such computer-readable media may include RAM, ROM, electrically erasable programmable ROM (EEPROM), compact disc (CD)-ROM or other optical disk storage, magnetic disk storage or other magnetic storage devices, or any other medium that may be used to store desired program code in the form of instructions or data structures and that may be accessed by a computer. Also, any connection can be properly termed a computer-readable medium. Disk and disc, as used herein, includes CD, laser disc, optical disc, digital versatile disc (DVD), floppy disk, and Blu-ray disc where disks usually reproduce data magnetically, while discs reproduce data optically with lasers. Combinations of the above should also be included within the scope of computer-readable media. Additionally, the operations of a method or algorithm may reside as one or any combination or set of codes and instructions on a machine readable medium and computer-readable medium, which may be incorporated into a computer program product.

Various modifications to the implementations described in this disclosure may be readily apparent to those skilled in the art, and the generic principles defined herein may be applied to other implementations without departing from the spirit or scope of this disclosure. Thus, the claims are not intended to be limited to the implementations shown herein, but are to be accorded the widest scope consistent with this disclosure, the principles and the novel features disclosed herein.

Additionally, a person having ordinary skill in the art will readily appreciate, the terms "upper" and "lower" are sometimes used for ease of describing the figures, and indicate relative positions corresponding to the orientation of the figure on a properly oriented page, and may not reflect the proper orientation of any device as implemented.

Certain features that are described in this specification in the context of separate implementations also can be implemented in combination in a single implementation. Conversely, various features that are described in the context of a single implementation also can be implemented in multiple implementations separately or in any suitable subcombination. Moreover, although features may be described above as acting in certain combinations and even initially claimed as such, one or more features from a claimed combination can in some examples be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. Further, the drawings may schematically depict one more example processes in the form of a flow diagram. However, other operations that are not depicted can be incorporated in the example processes that are schematically illustrated. For example, one or more additional operations can be performed before, after, simultaneously, or between any of the illustrated operations. In certain circumstances, multitasking and parallel processing may be advantageous. Moreover, the separation of various system components in the implementations described above should not be understood as requiring such separation in all implementations, and it should be understood that the described program components and systems can generally be integrated together in a single software product or packaged into multiple software products. Additionally, other implementations are within the scope of the following claims. In some examples, the actions recited in the claims can be performed in a different order and still achieve desirable results.

What is claimed is:

1. An apparatus for wireless communications at an integrated access and backhaul (IAB) node, comprising:
  a processing system configured to:
    establish a first wireless role and a second wireless role for the IAB node, the first wireless role being a mobile termination role, and the second wireless role being a distributed unit role;
    perform a first channel sensing procedure and a second channel sensing procedure at the IAB node, the first channel sensing procedure being for the first wireless role and the second channel sensing procedure being for the second wireless role, wherein the first channel sensing procedure is different from the second channel sensing procedure; and
    initiate a channel occupancy time (COT) at the IAB node for the first wireless role in accordance with the first channel sensing procedure or for the second wireless role in accordance with the second channel sensing procedure, or both; and
  a first interface configured to:
    output signaling for transmission during the COT via at least one of the first wireless role or the second wireless role.

2. The apparatus of claim 1, wherein, to perform the first channel sensing procedure and the second channel sensing procedure at the IAB node, the processing system is further configured to:
  perform the first channel sensing procedure at a first antenna panel associated with the first wireless role; and
  perform the second channel sensing procedure at a second antenna panel associated with the second wireless role.

3. The apparatus of claim 2, wherein the processing system is further configured to:
  determine a success of the first channel sensing procedure in accordance with a first energy detection (ED) value associated with the first antenna panel and a first value associated with the first channel sensing procedure, the success of the first channel sensing procedure being associated with the first ED value satisfying the first value, and the first value being associated with the first wireless role; and
  determine a success of the second channel sensing procedure in accordance with a second ED value associated with the second antenna panel and a second value associated with the second channel sensing procedure, the success of the second channel sensing procedure being associated with the second ED value satisfying the second value, and the second value being associated with the second wireless role.

4. The apparatus of claim 1, wherein, to perform the first channel sensing procedure and the second channel sensing procedure at the IAB node, the processing system is further configured to:
  perform the first channel sensing procedure and the second channel sensing procedure at an antenna panel of the IAB node associated with the first wireless role.

5. The apparatus of claim 4, wherein the processing system is further configured to:
  determine a success of the first channel sensing procedure in accordance with an energy detection (ED) value associated with the antenna panel and a first value associated with the first channel sensing procedure, the success of the first channel sensing procedure being associated with the ED value satisfying the first value, and the first value being associated with the first wireless role; and
  determine a success of the second channel sensing procedure in accordance with the ED value associated with the antenna panel and a second value associated with the second channel sensing procedure, the success of the second channel sensing procedure being associated with the ED value satisfying the second value, and the second value being associated with the second wireless role.

6. The apparatus of claim 1, wherein, to perform the first channel sensing procedure and the second channel sensing procedure at the IAB node, comprises the processing system is further configured to:
  perform the first channel sensing procedure and the second channel sensing procedure at an antenna panel of the IAB node associated with the second wireless role.

7. The apparatus of claim 6, wherein the processing system is further configured to:
  determine a success of the first channel sensing procedure in accordance with an energy detection (ED) value associated with the antenna panel and a first value associated with the first channel sensing procedure, the success of the first channel sensing procedure being associated with the ED value satisfying the first value, and the first value being associated with the first wireless role; and
  determine a success of the second channel sensing procedure in accordance with the ED value associated with the antenna panel and a second value associated with the second channel sensing procedure, the success of the second channel sensing procedure being associated with the ED value satisfying the second value, and the second value being associated with the second wireless role.

8. The apparatus of claim 1, wherein, to perform the first channel sensing procedure and the second channel sensing procedure at the IAB node, the processing system is further configured to:

identify one or more sensing beams associated with the first channel sensing procedure and the second channel sensing procedure; and perform the first channel sensing procedure and the second channel sensing procedure using the one or more sensing beams.

9. The apparatus of claim 1, wherein the first interface is further configured to:

output a sensing capability for transmission to a parent node or a central unit, and the processing system performing the first channel sensing procedure for the first wireless role and the second channel sensing procedure for the second wireless role is in accordance with the sensing capability.

10. The apparatus of claim 9, wherein:

the sensing capability comprises an indication that the IAB node performs the first channel sensing procedure for the first wireless role and the second channel sensing procedure for the second wireless role as multiple nodes.

11. The apparatus of claim 9, wherein:

the sensing capability comprises an indication of whether the IAB node is capable of performing at least one of the first channel sensing procedure while transmitting via the second wireless role or the second channel sensing procedure while transmitting via the first wireless role.

12. The apparatus of claim 1, wherein, to output signaling for transmission during the COT via at least one of the first wireless role or the second wireless role, the processing system is further configured to:

identify a duplex capability of the IAB node, a success of the first channel sensing procedure, and a success of the second channel sensing procedure; and output at least one of a first transmission for transmission from the IAB node via the first wireless role or a second transmission for transmission from the IAB node via the second wireless role in accordance with the duplex capability of the IAB node, the success of the first channel sensing procedure, and the success of the second channel sensing procedure.

13. The apparatus of claim 1, wherein the processing system is further configured to:

determine a first transmission timing of a first transmission from the IAB node via the first wireless role and a second transmission timing of a second transmission from the IAB node via the second wireless role; and select a first sensing slot for performing the first channel sensing procedure and a second sensing slot for performing the second channel sensing procedure, the first sensing slot being aligned with the first transmission timing of the first transmission and the second sensing slot being aligned with the second transmission timing of the second transmission.

14. The apparatus of claim 13, wherein the processing system is further configured to:

determine that the IAB node satisfies an interference metric.

15. The apparatus of claim 13, wherein, to perform the first channel sensing procedure and the second channel sensing procedure at the IAB node, the processing system is further configured to:

perform the first channel sensing procedure during a first measurement area within the first sensing slot, the first measurement area having a first time duration; and perform the second channel sensing procedure during a second measurement area within the second sensing slot, the second measurement area having a second time duration less than the first time duration.

16. The apparatus of claim 13, wherein, to perform the first channel sensing procedure and the second channel sensing procedure at the IAB node, the processing system is further configured to:

perform the first channel sensing procedure during a first measurement area of a first sensing window, the first sensing window comprising the first sensing slot, and the first sensing slot comprising a first portion of the first measurement area; and perform the second channel sensing procedure during a second measurement area of a second sensing window, the second sensing window comprising the second sensing slot, and the second sensing slot comprising a second portion of the second measurement area, and the second portion of the second measurement area comprising a smaller time duration than the first portion of the first measurement area.

17. The apparatus of claim 1, wherein the processing system is further configured to:

determine a first transmission timing of a first transmission from the IAB node via the first wireless role and a second transmission timing of a second transmission from the IAB node via the second wireless role; and select a first sensing slot for performing the first channel sensing procedure and a second sensing slot for performing the second channel sensing procedure, the first sensing slot being aligned with the first transmission timing of the first transmission and the second sensing slot being offset from the second transmission timing of the second transmission in accordance with the first transmission timing of the first transmission.

18. The apparatus of claim 17, wherein the processing system is further configured to:

determine that the IAB node fails to satisfy an interference metric, the second sensing slot being offset from the second transmission timing of the second transmission in accordance with the first transmission timing of the first transmission being associated with determining that the IAB node fails to satisfy the interference metric.

19. The apparatus of claim 1, wherein the processing system is further configured to:

determine a first transmission timing of a first transmission from the IAB node via the first wireless role and a second transmission timing of a second transmission from the IAB node via the second wireless role, the first transmission timing of the first transmission being within a threshold time duration of the second transmission timing of the second transmission or the second transmission being less than a threshold time duration;

select a first sensing slot for performing the first channel sensing procedure; and perform the second channel sensing procedure during a second sensing slot that does not overlap with the first sensing slot in accordance with the first transmission timing of the first transmission being within the threshold time duration of the second transmission timing of the second transmission or the second transmission being less than the threshold time duration.

20. The apparatus of claim 1, wherein the processing system is further configured to:

determine a first transmission timing of a first transmission from the IAB node via the first wireless role and a second transmission timing of a second transmission from the IAB node via the second wireless role;
add a filler signal to a beginning of the second transmission, the first transmission timing preceding the second transmission timing by a time duration equal to a duration of the filler signal; and
select a first sensing slot for performing the first channel sensing procedure and a second sensing slot for performing the second channel sensing procedure, the first sensing slot being aligned with the first transmission timing of the first transmission and the second sensing slot being aligned with the filler signal.

21. A method for wireless communications at an integrated access and backhaul (IAB) node, comprising:
establishing a first wireless role and a second wireless role for the IAB node, the first wireless role being a mobile termination role, and the second wireless role being a distributed unit role;
performing a first channel sensing procedure and a second channel sensing procedure at the IAB node, the first channel sensing procedure being for the first wireless role and the second channel sensing procedure being for the second wireless role, wherein the first channel sensing procedure is different from the second channel sensing procedure;
initiating a channel occupancy time (COT) at the IAB node for the first wireless role in accordance with the first channel sensing procedure or for the second wireless role in accordance with the second channel sensing procedure, or both; and
transmitting during the COT via at least one of the first wireless role or the second wireless role.

22. The method of claim 21, wherein performing the first channel sensing procedure and the second channel sensing procedure at the IAB node comprises:
performing the first channel sensing procedure at a first antenna panel associated with the first wireless role; and
performing the second channel sensing procedure at a second antenna panel associated with the second wireless role.

23. The method of claim 22, further comprising:
determining a success of the first channel sensing procedure in accordance with a first energy detection (ED) value associated with the first antenna panel and a first value associated with the first channel sensing procedure, the success of the first channel sensing procedure being associated with the first ED value satisfying the first value, and the first value being associated with the first wireless role; and
determining a success of the second channel sensing procedure in accordance with a second ED value associated with the second antenna panel and a second value associated with the second channel sensing procedure, the success of the second channel sensing procedure being associated with the second ED value satisfying the second value, and the second value being associated with the second wireless role.

24. The method of claim 21, wherein performing the first channel sensing procedure and the second channel sensing procedure at the IAB node comprises:
performing the first channel sensing procedure and the second channel sensing procedure at an antenna panel of the IAB node associated with the first wireless role.

25. The method of claim 24, further comprising:
determining a success of the first channel sensing procedure in accordance with an energy detection (ED) value associated with the antenna panel and a first value associated with the first channel sensing procedure, the success of the first channel sensing procedure being associated with the ED value satisfying the first value, and the first value being associated with the first wireless role; and
determining a success of the second channel sensing procedure in accordance with the ED value associated with the antenna panel and a second value associated with the second channel sensing procedure, the success of the second channel sensing procedure being associated with the ED value satisfying the second value, and the second value being associated with the second wireless role.

26. The method of claim 21, wherein performing the first channel sensing procedure and the second channel sensing procedure at the IAB node comprises:
performing the first channel sensing procedure and the second channel sensing procedure at an antenna panel of the IAB node associated with the second wireless role.

27. The method of claim 26, further comprising:
determining a success of the first channel sensing procedure in accordance with an energy detection (ED) value associated with the antenna panel and a first value associated with the first channel sensing procedure, the success of the first channel sensing procedure being associated with the ED value satisfying the first value, and the first value being associated with the first wireless role; and
determining a success of the second channel sensing procedure in accordance with the ED value associated with the antenna panel and a second value associated with the second channel sensing procedure, the success of the second channel sensing procedure being associated with the ED value satisfying the second value, and the second value being associated with the second wireless role.

28. The method of claim 21, wherein performing the first channel sensing procedure and the second channel sensing procedure at the IAB node comprises:
identifying one or more sensing beams associated with the first channel sensing procedure and the second channel sensing procedure; and
performing the first channel sensing procedure and the second channel sensing procedure using the one or more sensing beams.

29. An apparatus for wireless communications at an integrated access and backhaul (IAB) node, comprising:
means for establishing a first wireless role and a second wireless role for the IAB node, the first wireless role being a mobile termination role, and the second wireless role being a distributed unit role;
means for performing a first channel sensing procedure and a second channel sensing procedure at the IAB node, the first channel sensing procedure being for the first wireless role and the second channel sensing procedure being for the second wireless role, wherein the first channel sensing procedure is different from the second channel sensing procedure;
means for initiating a channel occupancy time (COT) at the IAB node for the first wireless role in accordance with the first channel sensing procedure or for the second wireless role in accordance with the second channel sensing procedure, or both; and
means for transmitting during the COT via at least one of the first wireless role or the second wireless role.

30. A non-transitory computer-readable medium storing code for wireless communications at an integrated access and backhaul (IAB) node, the code comprising instructions executable by a processor to:
- establish a first wireless role and a second wireless role for the IAB node, the first wireless role being a mobile termination role, and the second wireless role being a distributed unit role;
- perform a first channel sensing procedure and a second channel sensing procedure at the IAB node, the first channel sensing procedure being for the first wireless role and the second channel sensing procedure being for the second wireless role, wherein the first channel sensing procedure is different from the second channel sensing procedure;
- initiate a channel occupancy time (COT) at the IAB node for the first wireless role in accordance with the first channel sensing procedure or for the second wireless role in accordance with the second channel sensing procedure, or both; and
- transmit during the COT via at least one of the first wireless role or the second wireless role.

\* \* \* \* \*